(12) United States Patent
Chen et al.

(10) Patent No.: US 11,522,865 B2
(45) Date of Patent: Dec. 6, 2022

(54) AUTOMATED IOT DEVICE CONFIGURATION USING USER PROFILE

(71) Applicant: CONVIDA WIRELESS, LLC, Wilmington, DE (US)

(72) Inventors: Zhuo Chen, Claymont, DE (US); Dale N. Seed, Allentown, PA (US); Quang Ly, North Wales, PA (US); William Robert Flynn, IV, Schwenksville, PA (US); Catalina Mihaela Mladin, Hatboro, PA (US); Jiwan L. Ninglekhu, Conshohocken, PA (US); Lu Liu, Conshohocken, PA (US)

(73) Assignee: Convida Wireless, LLC, Wilmington, DE (US)

( * ) Notice: Subject to any disclaimer, the term of this patent is extended or adjusted under 35 U.S.C. 154(b) by 0 days.

(21) Appl. No.: 17/252,516

(22) PCT Filed: Jun. 20, 2019

(86) PCT No.: PCT/US2019/038244
§ 371 (c)(1),
(2) Date: Dec. 15, 2020

(87) PCT Pub. No.: WO2019/246402
PCT Pub. Date: Dec. 26, 2019

(65) Prior Publication Data
US 2021/0266326 A1 Aug. 26, 2021

Related U.S. Application Data

(60) Provisional application No. 62/687,647, filed on Jun. 20, 2018, provisional application No. 62/768,305, filed on Nov. 16, 2018.

(51) Int. Cl.
*H04L 29/06* (2006.01)
*H04L 29/08* (2006.01)
(Continued)

(52) U.S. Cl.
CPC .......... *H04L 63/102* (2013.01); *G16Y 30/10* (2020.01); *H04L 67/52* (2022.05)

(58) Field of Classification Search
CPC ....... H04L 63/102; H04L 67/18; G16Y 30/10; H01R 13/6675; G06Q 30/0201; G06Q 50/12; H04W 84/12
See application file for complete search history.

(56) References Cited

U.S. PATENT DOCUMENTS

| 2015/0031335 A1* | 1/2015 | Dong | H04W 12/02 |
| | | | 455/411 |
| 2017/0289271 A1* | 10/2017 | Seed | H04L 67/34 |

(Continued)

FOREIGN PATENT DOCUMENTS

WO    2018/067947 A1    4/2018

OTHER PUBLICATIONS

Convida et al., "TR-0001_Use_Cases_Collection_Draft_V4_2_0", REQ-2018-0041-TR-0001 Use Cases Collection _Draft_V4_2_0. ZIP, ONEM2M, vol. WGI—Requirements, REQ, Jun. 19, 2018, pp. 1-154.

*Primary Examiner* — Muhammad Raza
(74) *Attorney, Agent, or Firm* — BakerHostetler

(57) ABSTRACT

A service layer (SL) function may be used for managing a user profile that is associated with a SL user and using this profile to automatically configure different types of devices connected to an IoT service provider's platform. A SL function may be used to support user data privacy and security when data is imported and exported between gateways or servers temporarily.

13 Claims, 48 Drawing Sheets

(51) Int. Cl.
  *G16Y 30/10* (2020.01)
  *H04L 9/40* (2022.01)
  *H04L 67/52* (2022.01)

(56) References Cited

U.S. PATENT DOCUMENTS

| | | |
|---|---|---|
| 2018/0020505 A1 | 1/2018 | Deros et al. |
| 2018/0034656 A1* | 2/2018 | Balasubramanian ........................ H04L 12/2807 |
| 2018/0159954 A1* | 6/2018 | Lu ........................... H04L 67/63 |
| 2019/0138318 A1* | 5/2019 | Yang ......................... G06F 8/60 |
| 2019/0306024 A1* | 10/2019 | Petria ...................... H04L 12/66 |

\* cited by examiner

| Application(s) | Service Layer (SL) | Application Protocols (e.g. HTTP, COAP, MQTT) | Transport Protocols (e.g. TCP, UDP) | Network Protocols (e.g. IPv4/IPv6) | Access Network Protocols (e.g. Ethernet, Cellular, Wi-Fi) |

FIG. 1

Service User Profile Information

User 1:
    Allowed Device:
        Device 1:
                Type: Thermostat
                Relationship: Own
                Status: In Use
                Registrar Entity: Gateway 1
                Duration: until registered
                Description: Thermostat at home Profile Data:
        Home Temperature: 70F
        Wakeup Time: 6:30am
        Sleep Time: 11:00pm

FIG. 14

AUTOMATED IOT DEVICE CONFIGURATION USING USER PROFILE

CROSS-REFERENCE TO RELATED APPLICATIONS

This application is the National Stage of International Patent Application No. PCT/US2019/038244, filed Jun. 20, 2019, which claims the benefit of U.S. Provisional Patent Application Nos. 62/687,647, filed Jun. 20, 2018 and 62/768,305, filed Nov. 16, 2018; the disclosures of which are incorporated herein by reference in their entireties.

BACKGROUND

Machine-to-Machine (M2M) Communication is a form of data communication between entities that, when deployed, do not necessarily require direct human interaction. One challenge of M2M Communication is establishing a protocol so that that deployed equipment may be managed efficiently.

M2M technologies have enabled various applications in different areas such as system status monitoring; automatic energy metering, home automation, wireless monitoring in intelligent buildings, personal area networks, monitoring of parameters, positioning, and real time location in medical technology, among other things.

A machine-to-machine (M2M) or Internet of Things (IoT) M2M/IoT Service Layer (SL) is a technology specifically targeted towards providing value-added services for M2M/IoT Devices, IoT Applications and IoT data. Recently, several industry standard bodies (e.g., oneM2M, ETSI, OCF, and LWM2M) have been developing M2M/IoT SLs to address the challenges associated with the integration of M2M/IoT devices, applications, and data into deployments with the Internet/Web, cellular, enterprise, and home network.

An M2M/IoT SL can provide applications and devices access to a collection of M2M/IoT oriented capabilities. A few examples include security, charging, data management, Device management, discovery, provisioning, and connectivity management. These capabilities are made available to Applications via APIs which make use of message formats, resource structures, and resource representations supported by the M2M/IoT SL.

FIG. 1 shows an exemplary service layer between the application protocols and applications. From a protocol stack perspective, SLs are typically situated above the Application Protocol Layer and provide value added services to Applications they support. Hence SLs are often categorized as 'middleware' services.

FIG. 2 illustrates an exemplary M2M/IoT SL deployed on various types of network nodes. From a deployment perspective, an M2M/IoT SL can be deployed on various types of network nodes including servers, gateways, and devices, as shown in FIG. 2.

The oneM2M TS-0001 oneM2M Functional Architecture-V-3.5.0 defines a M2M/IoT SL. The purpose of the SL is to provide "horizontal" services that can be utilized by different "vertical" M2M systems and Applications, such as e-Health, fleet management, and smart homes. The architecture of the oneM2M SL, as shown in FIG. 3, defines a Common Service Entity (CSE) that supports four reference points. The Mca reference point interfaces with the Application Entity (AE). The Mcc reference point interfaces with another CSE within the same service provider domain and the Mcc' reference point interfaces with another CSE in a different service provider domain. The Mcn reference point interfaces with the underlying network service entity (NSE). An NSE provides underlying network services to the CSEs, such as Device management, location services and Device triggering. A CSE may include multiple logical functions called "Common Service Functions (CSFs)", such as "Discovery", "Data Management & Repository". FIG. 4 illustrates the CSFs supported by oneM2M.

The oneM2M architecture is a distributed architecture and supports deploying IoT services in a distributed manner across the following types of Nodes. An Application Service Node (ASN) is a Node that contains one CSE and contains at least one Application Entity (AE). Example of physical mapping: an ASN could reside in an IoT Device. An Application Dedicated Node (ADN) is a Node that contains at least one AE and does not contain a CSE. Example of physical mapping: An Application Dedicated Node could reside in a constrained IoT Device. A Middle Node (MN) is a Node that contains one CSE and contains zero or more AEs. Example of physical mapping: a MN could reside in an IoT Gateway. An Infrastructure Node (IN) is a Node that contains one CSE and contains zero or more AEs. A CSE in an IN may contain CSE functions not applicable to other node types. Example of physical mapping: an IN could reside in an IoT Service Infrastructure. A Non-oneM2M Node (NoDN) is a Node that does not contain oneM2M Entities (neither AEs nor CSEs). Such Nodes represent devices attached to the oneM2M system for interworking purposes, including management. The possible configurations of inter-connecting the various entities supported within the oneM2M system are illustrated in FIG. 16.

The possible configurations of inter-connecting the various entities supported within the oneM2M system are illustrated in FIG. 5.

This disclosure pertains to the management of data in Internet-of-Things (IoT), machine-to-machine (M2M), and Web-of-Things (WoT) environments, including environments described in, for example: the oneM2M-TS-0001 oneM2M Functional Architecture-V-2.10.1; the Machine-to-Machine communications (M2M) Functional Architecture, Draft ETSI TS 102 690 1.1.1 (2011-10); the OMA Lightweight M2M (LWM2M) Technical Specification, Draft Version 1.0.2—9 Feb. 2018; and the oneM2M-TS-0003 Security Solutions-V-3.0.6.8.

SUMMARY

A service layer (SL) function may be used for managing a user profile that is associated with a SL user and using this profile to automatically configure different types of devices connected to an IoT service provider's platform.

A SL function may be used to support user data privacy and security when data is imported and exported between gateways or servers temporarily. For example, a user who is away from her home M2M/IoT gateway or server may temporarily use a foreign M2M/IoT gateway or server. The user further may desire to import her customized personal data from her home M2M/IoT gateway or server so that the foreign M2M/IoT environment may behave like her home M2M/IoT environment.

A SL function may be provided with a number of capabilities to facilitate such operations. For example, a SL function may be capable of securely importing user profile data from a home gateway or server to a foreign gateway or server, where user data may temporarily live.

A SL function may be capable of integrating selected user profile data from the user's home gateway or server into a generic user profile (GUP) in the foreign gateway or server.

A SL function may be capable of securely exporting an aliased user profile (AUP) from a home gateway or server to a foreign gateway or server.

A SL function may be capable of integrating an aliased user profile (AUP) created at the user's home gateway or server into a temporary user account (TUA) in a foreign gateway or server with a mapped device, application, and/or service layer data.

A SL function may be capable of supporting extended attribute-based access control policies (EABAC), wherein the access control policies (ACPs) may include extended parameters that may allow or limit access of user profile data based on a custom request.

A SL function may be capable of supporting access control policies (ACPs) to protect a user's personally identifiable information (PII) in the foreign gateway or server at the granularity of selected resources and attributes.

A SL function may be capable of confining user profiles from one another in the foreign gateway or server by associating each user profile with a TUA.

A SL function may be capable of securely supplying each user with a temporary access code (TAC) that represents the TUA.

A SL function may be capable of protecting at-rest user profile data within each TUA in a foreign gateway or server by encrypting it with a user entered password.

A SL function may be capable of securing communication between a TUA at the foreign gateway or server and a home gateway or server using symmetric key cryptography.

A SL function may be capable of allowing a participating user to provision a shared secret between a TUA in a foreign gateway or server and a home gateway or server.

A SL function may be capable of supporting a Data Erasure Management Function (DEMF). For example, a SL function may be capable of providing data privacy and security by the process of data erasure when the user has completed data utilization in the server.

A SL function may be capable of multiple data erasure operations, such as: Data Erasure Policy (DEP) provisioning; user profile erasure; TUA erasure; and resetting/rebooting of IoT devices. A SL function may be capable data erasure by intention, wherein an authorized user triggers the data erasure procedure. Similarly, a SL function may be capable of data erasure by trigger, wherein a condition is met as per DEPs that enables data erasure procedure.

A SL function may be capable of sending a notification via text, email or other mediums to the authentic user about the successful completion of data erasure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not constrained to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein:

FIG. 1 illustrates an exemplary protocol stack supporting a service layer

FIG. 14 illustrates an exemplary Service User Interface for M2M/IoT Server and/or Gateways that has AUM-S to Display Service Layer User Profile Information;

DETAILED DESCRIPTION

Figure 6:
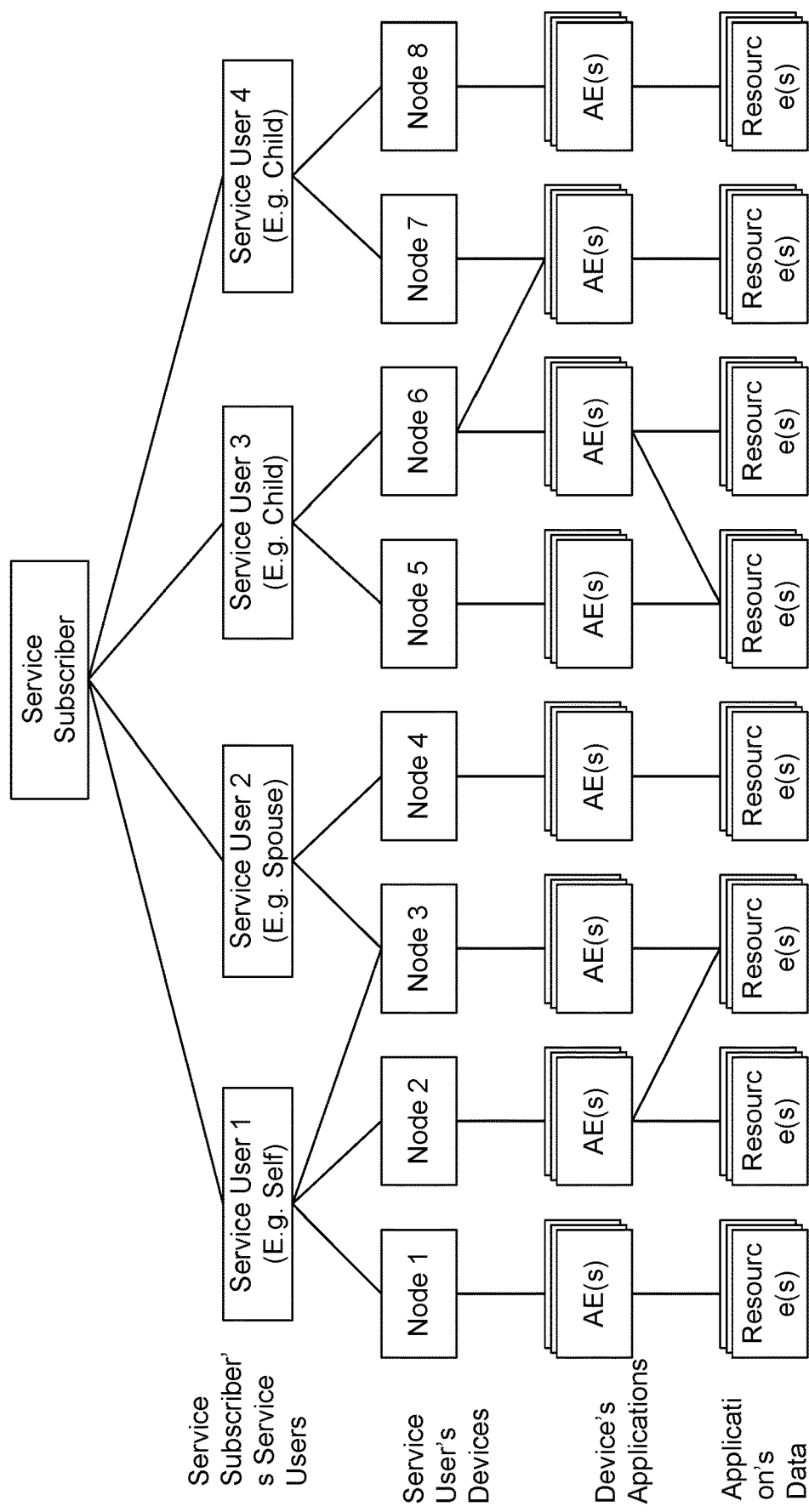
FIG. 6 illustrates exemplary IoT Service Enrollee Relationships.

IoT service enrollment enables a platform of an IoT service provider to be informed of the relationships that exist between a service user and its IoT devices, applications, and data as shown in FIG. 6. The data generated from a device may associate with a user and that data may reflect a property associated with the user. For example, if a smart watch is used, the heart rate data collected from the watch is the wearer's heart rate data. An IoT service user can associate with multiple IoT Devices. These IoT Devices may host IoT Applications. The IoT applications may produce as well as consume data. Each user can have one or more IoT devices, applications, and data sets associated with it. The current oneM2M architecture defines an M2M Enrollment Function (MEF). This function supports provisioning of individual oneM2M devices (e.g., nodes) and applications (e.g., AEs) with identifiers and credentials. Once enrolled, applications may then securely and individually register to a service layer entity (e.g., CSE). The oneM2M architecture also defines an M2M service subscription. An M2M service subscription may define which applications or devices are allowed to register to a CSE. However, it is worth noting, that oneM2M does not define the process for how a M2M service subscription is established. This process is assumed to take place in an out-of-band manner. Hence the oneM2M architecture does not support the concept of a service subscriber having ownership or administrative rights to one or more IoT devices, applications, data sets, or authorized users and enrolling itself as well as these entities to a service provider.

A use case is presented below. A hotel may deploy smart IoT devices in hotel rooms to improve the service they offer their guests. Consider a scenario when a guest uses his personal device to check-in before his arrival. A hotel room will be assigned to the guest by the hotel. The hotel owner may want to make the hotel room feel like the guest's home when the guest arrives at the hotel. For example, the temperature and humidity of the room is set to the same as the guest's home, the TV set-top box is set to the guest's favorite channels, or a bed alarm is set based on the guest's habit and calendar. Conventionally, during check-in, it may be too complicated for the guest to configure all the smart IoT devices in the hotel room one by one. Moreover, the guest may not even know the values to configure these devices. For example, the guest may not know his comfortable room temperature since the information is stored in the smart thermostat in his home.

In a conventional IoT ecosystem, when an IoT device is shipped from the manufacture, the manufacture may not know who will use the device and how the device will be used. When a consumer purchases a new IoT device, the consumer may use a dedicated management application to enroll the new IoT device to the service provider. During the enrollment, the consumer may specify the users who are authorized to use the device. Similarly, when a consumer purchases a new IoT application, the consumer may enroll the new application with the service provider. During the enrollment, the consumer may also specify the users who are authorized to use this application. However, during the enrollment, the consumer may not be able to specify the user who is using a device or applications hosted on that device. For example, a body weight scale may be used by the consumer himself or by family members at different times. Moreover, even if the device is associated with a user during the enrollment, how the new device will be used may not be determined during the enrollment. For example, after the consumer purchases a temperature sensor and enrolls it into the service platform, the user may put the temperature sensor in his home and connect it to his home gateway. In this scenario, the temperature sensor reflects his home temperature. If the user put the temperature sensor in his office, the temperature sensor reflects his office temperature.

Furthermore, even if the context information of an application is determined during the enrollment, the place to store this information may dynamically change, since the application may register to different devices and store the user's data at different locations. Without the capability to dynamically manage the relationship between IoT applications and users, such as the context information of the data generated by the application, or the location where the data is stored, an IoT service layer may not build a SL user profile (also referred herein as a service layer profile or user profile) that manages users' personalized data accurately. Thus, without an accurate SL user profile that captures when a user is authorized to use new devices, SL cannot automatically configure different types of these IoT devices to provide better service to the user as described in the smart hotel use case. The relationship between IoT devices or applications associated with a user may be managed more dynamically, as disclosed herein, than in conventional deployment schemes.

Disclosed herein is a service layer capability to manage data that is associated with a SL user, which is generated from multiple IoT devices and applications that may be dynamically associated with a SL user. A user profile that is maintained by a SL is disclosed to capture service user information and preferences of the user as well as information regarding his IoT devices, applications, data sets, and the dynamic relationship that exist between them. When a user is authorized to use new devices, a SL may use the user's profile to automatically configure different type of devices connected with an IoT service provider's IoT platform.

Disclosed herein are multiple system, methods, and apparatuses that may be used for IoT user management (also known herein after as SL user profile management). For example, an automated SL user management architecture is disclosed to support automated SL user management service. In another example, a method is disclosed for automating the association process between IoT service users and IoT devices, applications, and data sets. In another example, a SL user profile is defined that includes information about a user's IoT devices (e.g., configuration settings, schedules, etc.). This information may be collected by the SL based on monitoring a user's IoT devices and observing this information over time. In another example, an IoT service capability and method may enable IoT devices and applications to query and discover available service layer user profiles that are published by a service provider via its IoT service platform. In another example, an IoT service capability or method may apply a user's preferred IoT device settings contained within the user's SL user profile to one or more new IoT devices that are of similar type or similar function.

Automated IoT Service User Management Architecture—The Automated User Management (AUM) capability can be realized as two logical functions. The first function is an AUM Server (AUM-S) function. The second function is an AUM Client (AUM-C) function. The AUM-S function may track the near-real time association relationship between devices, applications, and users. For example, devices and applications that a user is currently using. The AUM-S may also manage the data that is generated by the devices and applications associated with a user.

Figure 7:
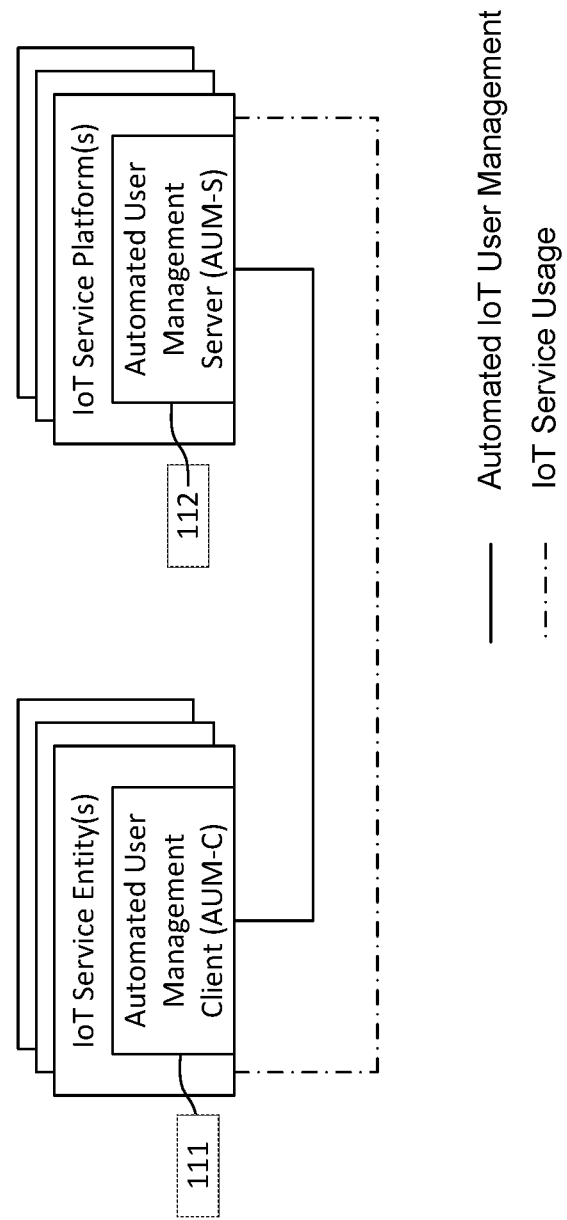
FIG. 7 illustrates exemplary Deployment Option of Automated IoT Service User Management Capability.

There are multiple deployment options for AUM-C and AUM-S. FIG. 7 illustrates exemplary deployment option of Automated IoT Service User Management capability. For example, as shown in FIG. 7, AUM-C 111 may be integrated as a function into an IoT SL entity (e.g. Gateway or Server) and AUM-S 112 may be integrated as a function within an IoT service platform. Alternatively, AUM-S 112 may be deployed as its own standalone service. AUM-Cs 111 in the IoT service platform may be used to communicate with the standalone AUM-S 112. Note, the division of functionality of an AUM into a client (AUM-C) and server (AUM-S) is just one example of a way to divide the AUM logic between components and other configurations are possible.

For AUM, AUM-S 112 may store a SL User Profile for each SL user. Table 1 is an exemplary table of a SL user profile entry in AUM-S 112. The User ID field stores the ID of a user that is assigned by the AUM-S 112 or by a Service Provider (e.g., phone service provider may generate a user-id—phone number). As shown in Table 1, there is a section for information about the devices that the user is authorized to use. The detailed information may include the SL ID of the device, the relationship between the device and the user. For example, the device is owned by the user or the device is temporarily used by the user. The time duration about the relationship between the device and the user. The semantic information about data provided by the device. For example, the location and units of the data. As shown in the table, there may be information about the application that the user is authorized to use. The detailed application information may include the SL ID of the application or the relationship between the application and the user. For example, the application is owned by the user or the application is temporarily used by the user. The time duration about the relationship between the application and the user. The semantic information about data provided by the Application. For example, the location and units of the data.

With continued reference to Table 1, there may be profile data that stores personalized data that is associated with a user, and the source devices or applications that provide the data. For example, preferred temperature (e.g., in a hotel room or driverless car), wake schedule (of a person for setting alarms or for a device for power savings, for example), sleep schedule (of the person for setting alarms or for a device for power savings, for example), meal preference (of the person checking into a hotel or entering a restaurant, for example), or seating preference (of the person booking a flight or booking a concert) as shown in Table 1. The data may be collected by the SL via monitoring a user's IoT devices or application, which may be observed over time. The data may also be obtained via retrieving information from a user's IoT devices or applications in near real-time. AUM-S 112 may store the value of the data or a link to resource(s) if hosted at devices or applications, or the like.

TABLE 1

A User Profile Entry in AUM-S

| Field Name | | Description |
| --- | --- | --- |
| User ID | | The ID of user assigned by the Service Provider. |
| Authorized Devices Information | SL ID | The SL ID of the Device |
| | Type | The type of the Device. For example, the Device is a thermostat |
| | AUM-C ID | The SL ID of the AUM-C that manages the Device |
| | Device Configuration | The protocols or data models to configure the Device. |
| | Registrar Entity ID | The SL ID of the entity that the Device registers to or is allowed to register to. |
| | Relationship | The relationship between the Device and the user. For example, the user owns the Device, or the user does not own the Device but is temporarily authorized to use the Device. |
| | Status | The status of the association relationship. For example, the active status is defined as the Device is currently used by the user and the inactive status is defined as the Device is not currently used by the user. |
| | Duration | The time duration allowed for the association relationship between the Device and the user. |
| | Description | The information about data provided by the Device. For example, the location and unit about the data. |
| Authorized Applications Information | SL ID | The SL ID of the Application |
| | Type | The type of the Application. For example, the Application is a sensor |
| | AUM-C ID | The SL ID of the AUM-C that manages the Application |
| | Application Configuration | The protocols or data models to configure the Application. |

TABLE 1-continued

A User Profile Entry in AUM-S

| Field | Name | Description |
|---|---|---|
| | Registrar Entity ID | The SL ID of the entity that the Application registers to or is allowed to register to. |
| | Relationship | The relationship between the Application and the user. For example, the user owns the Application, or the user does not own the Application but is temporarily authorized to use the Application. |
| | Status | The status of the association relationship. For example, the active status is defined as the Application is currently used by the user and the inactive status is defined as the Application is not currently used by the user. |
| | Duration | The time duration about the relationship between the Application and the user. |
| | Description | The information about data provided by the Application. For example, the location and units of the data. |
| Profile Data | Home Temperature | The value of the user's home temperature or a link to the user's thermostat at home. |
| | Office Temperature | The value of the user's office temperature or a link to the user's thermostat at his office. |
| | Wake Up Time | The value of the user's wake up time or a link to the user's alarm at home. |
| | Bedtime | The value of the user's bedtime or a link to pressure sensor in the mattress. |

AUM-C 111 may have multiple functions as described below. AUM-C 111 may manage the association relationship between SL users and devices or applications that register to the SL entity. When a device or application registers to the SL entity, AUM-C 111 may report this information to AUM-S 112, and then associate the device or application with one or more SL users based on the response from AUM-S 112. Table 2 shows an example user management entry that the AUM-C 111 manages. AUM-C 111 may update user profile that is stored at AVM-S 112 when the content or context of the data that is associated with the user is changed. AUM-C 111 may retrieve user profile that is stored at the AUM-S 112 and parse and use this information to configure devices and applications that are registered to the SL entity.

TABLE 2

A User Management Entry in AUM-C

| Field Name | Description |
|---|---|
| User ID | The ID of user assigned by the Service Layer |
| AUM-S | The SL ID of the SL entity that hosts the AUM-S that manages the user profile |
| Associated Devices | A list of Devices associated with the user. |
| Associated Applications | A list of Applications associated with the user. |

The user profile may be created by AUM-S 112 when a new user is created by the SL enrollee or service provider. The contents in a user profile may be managed by the service layer. Disclosed herein are methods to manage the User Profile. As disclosed above, there may be multiple categories of information in the User Profile as shown in Table 1. A first category of information may be about devices and applications that are authorized to be used by the SL user. The second category is the user's personalized data, which is generated based on the information provided by devices and applications that the user is using. Accordingly, a method for managing the association between SL users and devices or applications is disclosed. After a new device or application registers and associates with one or more SL users, a method to collect personalized data automatically via monitoring registered IoT devices and applications is disclosed.

Figure 8:
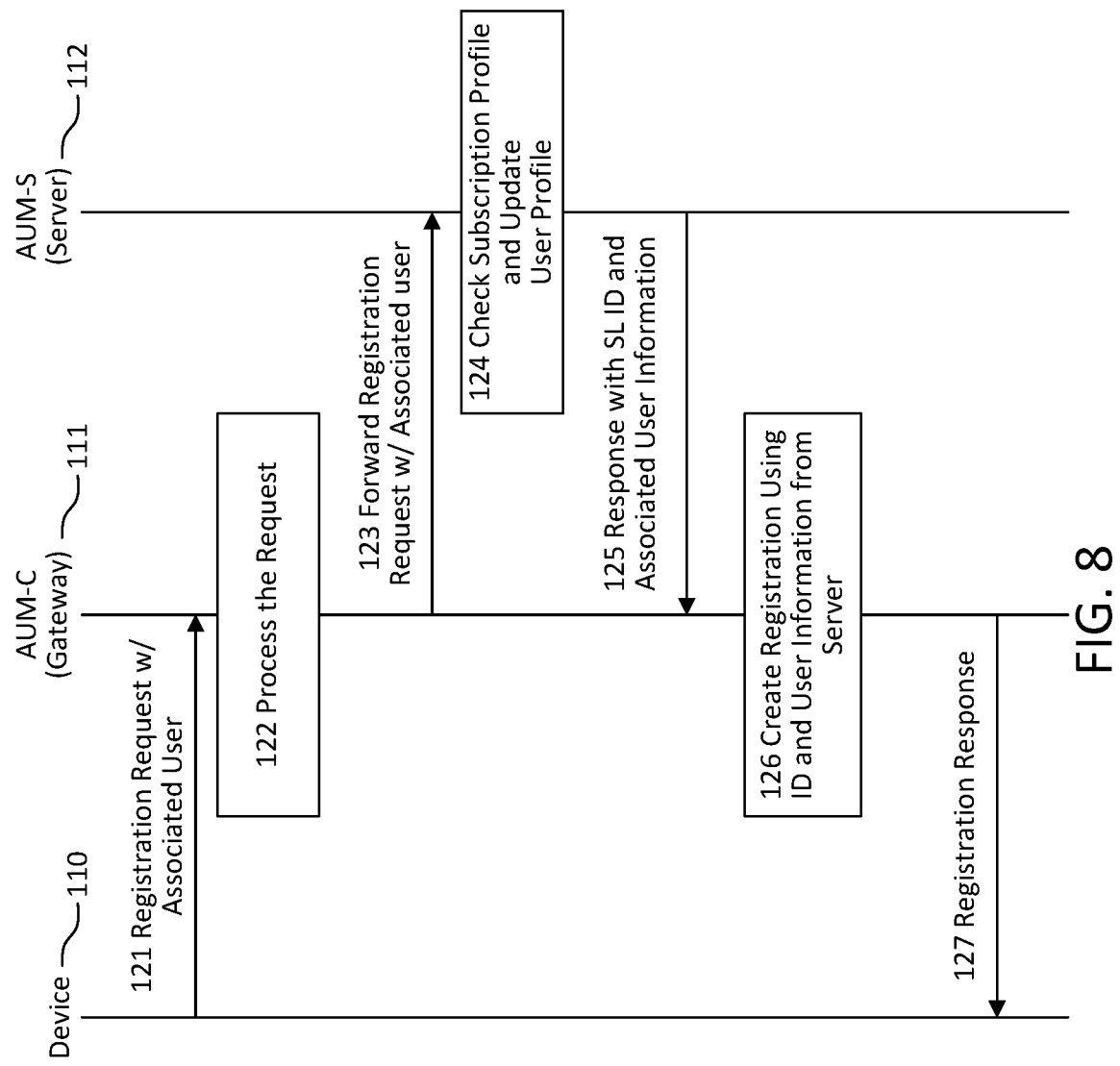
FIG. 8 illustrates exemplary Automated Association Process via SL Registration.

It is understood that the entities performing the steps illustrated herein, such as FIG. 8-FIG. 10, FIG. 12, and FIG. 13, may be logical entities. The steps may be stored in a memory of, and executing on a processor of, a device, server, or computer system such as those illustrated in FIG. 42C or FIG. 42D. In an example, with further detail below with regard to the interaction of M2M devices, AE 170 of FIG. 12 may reside on M2M terminal device 18 of FIG. 42A, while MN-CSE 171 of FIG. 12 may reside on M2M gateway device 14 of FIG. 42A. Skipping steps, combining steps, or adding steps between exemplary methods disclosed herein (e.g., FIG. 8-FIG. 10) is contemplated FIG. 8 illustrates exemplary Automated Association Process via SL Registration. During the SL device and application (e.g., device 110) enrollment process, the enrollee may authorize one or more SL users to use device 110 by adding a new entry in the enrollee's subscription profile. During the SL enrollment, the enrollee may also add the information about device 110 as shown in Table 1. However, managing the association process only via the enrollment process may be inflexible and coarse-grained. For example, if the enrollee configured the Registrar SL Entity (e.g., AUM-C 111) for device 110 during the enrollment, device 110 may only register to the assigned Registrar SL entity and lose the flexibility to register to different SL entities at different times. For further context, if a first user owns a body weight scale it may be used by the first user (the owner) or by a second user (e.g., family member of the first user) at different times. Enrollment does not have that granularity about who are using the body weight scale. As another example, device 110 may be used by multiple authorized SL users after enrollment, but enrollee's may only provide personalized data for SL users who are using the device 110 after the enrollment process. Therefore, herein an automated association process is disclosed, in which a SL entity registers to another SL Entity. When an entity registers to a SL system, the SL will automatically manage the association relationship between a SL user and the new entity. To describe the disclosed procedure, SL node (e.g., AUM-C 111 or AUM-S 112) and Application entity (e.g., device 110) are used as an example. In the FIG. 8, AUM-C 111 may be a gateway and AUM-S may be a M2M/IoT Server. Device 110 (e.g., Registree Entity) may start registering to AUM-C 111 (Registrar Entity) using the disclosed procedure as shown in FIG. 8. Note that, although shown for the case of device 110 registering, the method associated with FIG. 8 may also apply to a case in which a SL node (gateways and servers, such as AUM-C 111 or AUM-S 112) registers to a SL system.

With continued reference to FIG. 8, at step 121, device 110 (e.g., Registree Entity) may send a registration request message to AUM-C 111 (e.g., Registrar Entity). In the request, device 110 may indicate the type of the device 110, e.g. a temperature sensor. The request may also include the SL ID and User IDs that are assigned by the service layer when the device 110 is enrolled, as described in Table 3.

TABLE 3

Information in a Registration Request

| Field Name | Description |
| --- | --- |
| Type | The type of the Entity. For example, the Device is a sensor |
| SL ID | The ID assigned by the Service Layer when the Device enrolled |
| User ID List | A list that may include SL ID of the users that are assigned by the Service Layer when the Device enrolled |

At step 122, after receiving the registration request message, AUM-C 111 checks whether device 110 is allowed to register and whether the user is authorized to associate with device 110. If not, at step 123, AUM-C 111 sends a request to report this registration to AUM-S 112 (e.g., M2M/IoT Server), which may include the SL ID of AUM-C 111. AUM-C 111 also includes information in the request about the type of device 110 and user ID that is assigned by the SL when the device 110 is enrolled.

At step 124, AUM-S 112 checks its service subscription profile to find whether device 110 is allowed to register to AUM-C 111. AUM-S 112 finds the authorized users of AUM-C 111 and checks the user profile in Table 1 to find whether these authorized users may use the device 110. In other words, if we define an allowed user as a user who is an authorized user for both AUM-C 111 and device 110, device 110 is allowed to register to AUM-C 111 if there is an allowed user in SL user profile. After the registration approval, if the user ID contained in the request is an allowed user, AUM-S 112 records that the user is using device 110 and AUM-C 111 in Table 1. Alternatively, AUM-S 112 may record that all allowed users who are currently using AUM-C 111 are using the device 110. AUM-S 112 may generate a new unique SL ID within the service provider domain for the Device. AUM-S 112 then updates profile of the users who are using device 110 in Table 1 as shown in Table 4. Note that, some information about device 110 in Table 4 may have been generated already when device 110 is enrolled in the service layer. However, AUM-S 112 may add extra information about the Device. For example, if device 110 is registered at user's home gateway, AUM-S 112 may also add the description about device 110. For further context, the reason registration and enrollment are different. A device usually enrolled with service provider. For example, you enrolled the cell phone service with mobile phone service provider. However, when the user uses the cell phone, it registers to a base station. The based station needs to go to the server to know whether the user is enrolled user.

TABLE 4

New Information added in SL User Profile

| Field Name | Description |
| --- | --- |
| SL ID | Device 110 |
| Type | Temperature Sensor |
| Registrar Entity ID | AUM-C 111 |
| Relationship | Owner |
| Status | Using |
| Duration | Until unenrolled |
| Description | Temperature sensor in User 1's home |

At step 125, AUM-S 112 sends a response to the registrar entity, e.g., AUM-C 111. The response message may include the unique ID for the Registree Entity. The response may indicate the SL users who are currently using device 110. At step 126, based on the response of step 125, the Registrar Entity, e.g., AUM-C 111, creates the SL registration for the Registree Entity, e.g., device 110. Based on the response, AUM-C 111 updates the user management entry of users who are currently using device 110 by adding information of device 110 into Table 2. At step 127, AUM-C 111 sends a response to the Registree Entity (device 110) that the registration has been created.

When a new device (or application) registers and is used by one or more SL users, AUM-S 112 may update personalized data that is associated with a user who owns the new device. For example, when a temperature sensor in a user's home registers to AUM-C 111, AUM-S 112 may add a new entry in the user's data profile about his home temperature as shown in Table 1. AUM-S 112 may store the address of the resource that stores the temperature sensor reading on AUM-C 111. AUM-S 112 may also subscribe to the resource that stores the temperature sensor reading, such that AUM-C 111 may notify AUM-S 112 when the temperature in the user's home changes. Thus, AUM-S 112 may obtain comprehensive temperature data of the user's home. When there are multiple IoT Devices (e.g. a smart lock, motion sensor, detect user's mobile device) in a user's home, AUM-S 112 may obtain the user's preferred temperature when the user is detected to be at home (or away).

Automated IoT Service Configuration using the Service Layer User Profile. For example, when a user owns a new device 113, or is authorized to use a new device 113, this method may be employed to configure SL related information on device 113 automatically without the user's intervention. For example, in the smart hotel use case described herein, when the guest checks in at the hotel, the SL of the hotel assigns hotel room to the guest. Then in the hotel room, thermostat is set to the guest's home temperature and the set-top-box is loaded with the guest's favorite channels based on the data (e.g., thermostat and favorite channel settings) contained in the guest's User Profile. To describe the disclosed methods, SL entities (AUM-C 111 or AUM-S 114) and an application entity (device 113) in the smart hotel use case are used as an example. AUM-C 111 is the Gateway in the hotel room. Device 113 is a smart IoT device that registers to AUM-C 111 in the hotel room. AUM-C 111 is managed by a hotel server (e.g., AUM-S 114). AUM-S 112 may manage the gateways (e.g., AUM-C 111) in the hotel (e.g., how the user profile associated with the guest controls AUM-C 111 that controls the IoT devices of the room). As further described with regard to FIG. 9, a user may allow AUM-S 114 to discover and query his user profiles that are stored in AUM-S 112 and then AUM-S 114 configures the devices (e.g., device 113). As further described with regard to FIG. 10, the user obtains the access to the new device 113 and enrolls device 113 into his SL, and then the AUM-S 112 directly manages AUM-C 111 and configures devices (e.g., device 113) in the hotel room.

Figure 9:
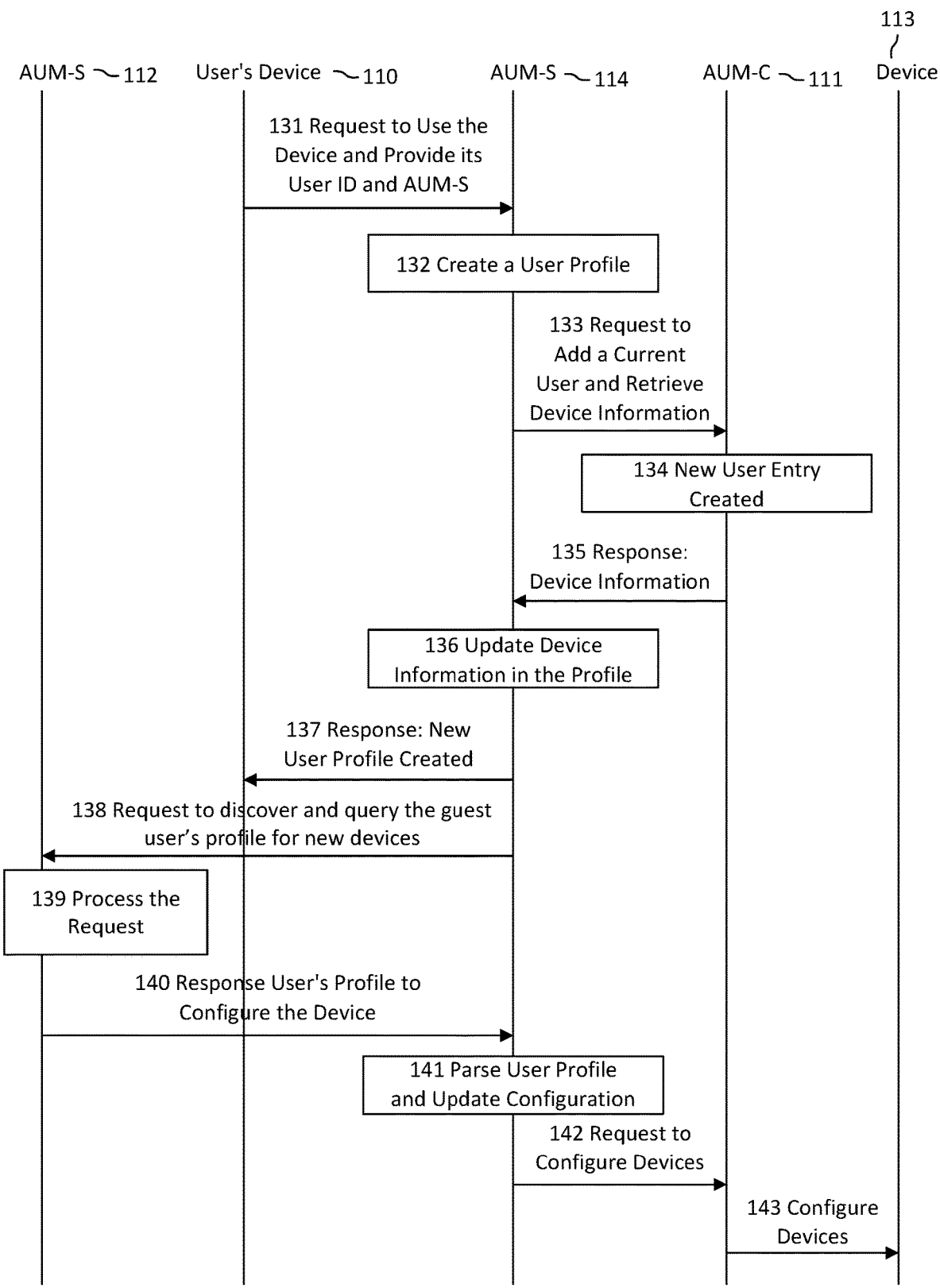
FIG. 9 illustrates an exemplary IoT Service Configuration by Discover and Query the Service Layer User Profile.

FIG. 9 illustrates an exemplary IoT Service Configuration by discovering and querying the SL User Profile, which is stored in the AUM-S 112. AUM-S 112 then uses a customized user profile to configure device 113. At step 131, when the guest uses his device 110 (e.g., end device) to check in the hotel, device 110 sends a request to AUM-S 114 (e.g., a server), to configure the devices 113 (e.g., end device) in his room. The request may include the SL ID of AUM-S 112 and its SL user ID. Alternatively (not shown), device 110 may also contact AUM-S 112 (e.g., server) to give the access right to hotel's SL to discover and query its user profile stored on AUM-S 112. For example, device 110 may obtain a temporary password from AUM-S 112 and then the request of step 131 (or another message) may include a user ID with a temporary password in the request for use by AUM-S 114 (e.g., step 138). In another example (not shown), device 110 may obtain a temporary token from AUM-S 112 and include the temporary token in the request of step 131. This temporary token may be subsequently provided in step 138 to AUM-S 112 to authorize AUM-S 114. The access of AUM-S 112 may be limited based on the token or password (e.g., not have full access).

At step 132, when AUM-S 114 receives the request, it may assign a room to the guest or find the SL entity that hosts AUM-C 111, which manages devices 113 in a hotel room. AUM-S 114 creates (or otherwise locates) a user profile for the user and adds the user as the current user of AUM-C 111. AUM-S 114 stores SL ID of the guest, credentials that may be used to access user's (e.g., guest's) profile and the SL ID of the device 110 that initiates the request. At step 133, AUM-S 114 sends a request to AUM-C 111 to create a new user entry on AUM-C 111 and retrieve device 113 information in the hotel room. At step 134, after receiving the request, AUM-C 111 creates a new user entry in Table 2. The entry may store the SL ID of the guest's AUM-S 112 and credentials that may be used to access the user's profile. AUM-C 111 may also store the SL ID of device 110 of the guest that initiates the request. At step 135, AUM-C 111 sends a response to AUM-S 114 indicating that a new user entry is created. The response also includes the SL ID of device 113. At step 136, AUM-S 114 updates the information about device 113 that is registered at AUM-C 111 as shown in Table 1. For example, the type, the protocols or data models to configure device 113, the model number with manufacture information. For example, AUM-C 111 may have a thermostat application or set-top-box application.

At step 137, AUM-S 114 sends a response to device 110 indicating a new user profile is created. Device 110 may request AUM-S 112 to give the access right to AUM-S 114 to access its user profile stored on AUM-S 112. At step 138, AUM-S 114 may send a request to AUM-S 112, to discover and query the user's profile. In the request, AUM-S 114 may include the SL ID of the user, the credential and the SL ID of the entity that provide the credential, e.g. (device 113) to access the user profile. AUM-S 114 may include the type of user profile data it requests and the information about device or applications it is authorized to use as shown in Table 1. For example, if AUM-C 111 provides management of a thermostat application for a hotel room, AUM-S 114 may request the user's preferred temperature or the configuration of the user's thermostat from AUM-S 112. The request may also include the type and the model number with manufacture information. For example, AUM-C 111 has a thermostat application and set-top-box application. Note that AUM-S 114 may to determine whether to query (or use the queried information) of AUM-S 112 based on a frequency of use. For example, there may be multiple user profiles for a particular user at multiple AUM-S's that may have information of interest for AUM-S 114. AUM-S 114 may decide which AUM-S 112 to query based on that frequency of use. Usually a user-owned site or apparatus (e.g., home or vehicle) will have the most frequency of use. Also how recent a use of the site or apparatus may also be considered alternative to or in addition to frequency of use.

At step 139, AUM-S 112 may check credentials included in the request and find whether AUM-S 114 has the authorization to update (or request information) of the user's profile. For example (not shown), AUM-S 112 may contact device 110 to authenticate the request. AUM-S 112 may find the user's profile and check the type of user profile data requested for the specified devices (or applications). If the AUM-S 112 does not store the profile data requested in the user's personalized data (e.g., user profile data includes user personalized data), AUM-S 112 may attempt to formulate the data on-the-fly. Formulated on the fly may include AUM-S 112 attempting to find the same type of device 113 by using information stored in Table 1 and retrieve the requested content from the same type of device 113, if available. In further view of the previous example, if device 113 is a thermostat application, AUM-S 112 may find the thermostat application that is currently used by the guest users in his user profile and retrieve the configuration profile. AUM-S 112 may also attempt to find the configuration of the thermostat application based on the model and manufacture information. AUM-S 112 may generate a customized user profile to configure device 113. With regard to the customized user profile, AUM-S 112 stores the user profile associate with the user. AUM-S 112 generally will not share all the user's personalized data to AUM-114. If Device 113 is a thermostat, AUM-S 112 may only send the user's preferred room temperature, but no other information. At step 140, AUM-S 112 sends the response to AUM-S 114 and includes the customized user profile. At step 141, AUM-S 114 updates user profile information in Table 1 based on the contents in response. AUM-S 114 determines whether configuration of device 113 needs to be changed based on the user profile. At step 142, based on step 141 determination, AUM-S 114 sends a request to AUM-C 111 to update the configuration of device(s) 113. AUMC-C 111 receives the request from AUM-S, and then sends a request to configure device 113. Device 113 registers to AUM-C 111, AUM-C 111 may configure device 113. At step 143, AUM-C 111 sends a request to configure device 113.

Figure 10:
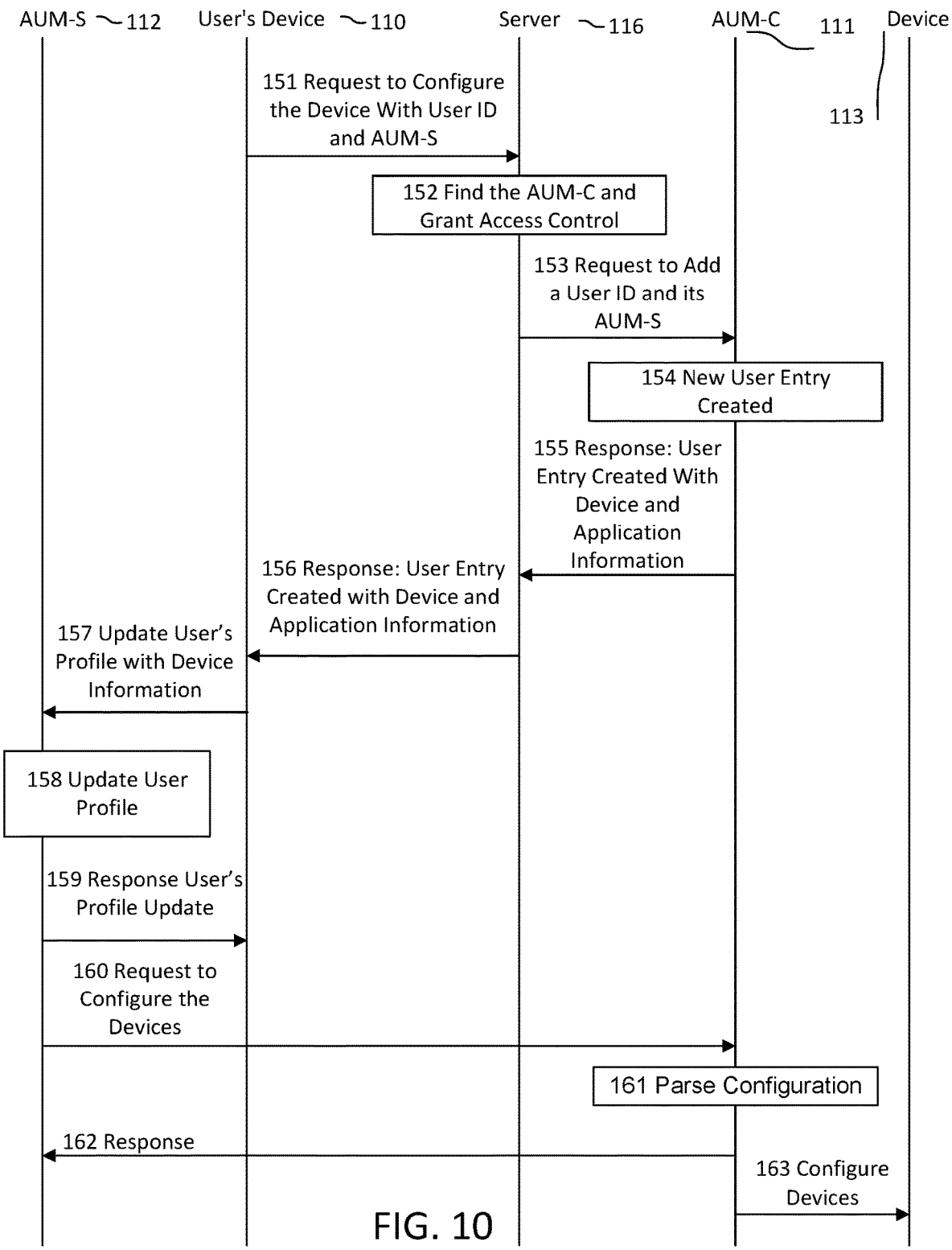
FIG. 10 illustrates an exemplary IoT Service Configuration by Server Layer Enrollment using the Service Layer User Profile.

IoT Service Configuration by Server Layer Enrollment using the Service Layer User Profile. In summary, the example of FIG. 10 provides that control may be obtained to the new devices in the hotel room and the devices may be enrolled into the SL used in a remote profile (e.g., a user's home), and then its AUM-S 112 directly manages AUM-C 111, and configures devices in the hotel room using the user profile as shown in FIG. 10. At step 151, a guest may use his device 110 (e.g., mobile device) to check in the hotel. Device 110 may send a request to the server 116 to configure the device(s) 113 in the guest's hotel room. The request may include the SL ID of AUM-S 112 and its SL user ID. At step 152, when server 116 receives the request of step 151, it assigns a room to the guest and determines the AUM-C 111 that manages device 113 in the guest's hotel room. Server 116 may also grant access control to AUM-S 112 to configure AUM-C 111. At step 153, Server 116 may send a request to AUM-C 111 to create a new user entry on AUM-C 111 in Table 2. The request may include SL ID of the AUM-S 112 that manages the guest's user profile.

At step 154, based on the request of step 153, AUM-C 111 creates a new user entry in Table 2. The entry may store the SL ID of the AUM-S 112. By creating the user entry, AUM-C 111 grants access control for AUM-S 112 to configure devices 113 registered with AUM-C 111. At step 155, AUM-C 111 may send a response to server 116 indicating that a new user entry is created. The response may include information about device 113 registered as shown in Table 1. For example, the request may include the type, the protocols or data models to configure the device 113, or the model number with manufacture information, among other things. AUM-C 111 may manage devices such as, thermostat or set-top-box. At step 156, server 116 may send a response to device 110 indicating a new user entry has been created. The response may include the SL ID of AUM-C 111 (where the new user entry exists). The response also may include information about device 113 registered as shown in Table 1. For example, the request may include the type, the protocols or data models to configure device 113, the model number with manufacture information, the time duration during which the user is allowed to use the device.

At step 157, device 110 may send a request to his AUM-S 112, to update his user profile. The request may include information about device 113 registered as shown in Table 1. For example, the request may include the type, the protocols or data models to configure device 113, the model number with manufacture information, or the time duration to allow device 113 to be used. At step 158, AUM-S 112 may update the user's profile based on the information in the request. AUM-S 112 may add the information about the device 113 that the user is authorized to use, such a thermostat. At step 159, AUM-S 112 sends the response to Device 110 that the user profile is updated. At step 160, AUM-S 112 sends a request to AUM-C 111 to update the configuration of devices 113. At step 161, AUM-C 111 may determine how to configure device 113 based on the request of step 160. For example, if device 113 is a thermostat, AUMC-C 111 may configure the temperature as the value indicated by AUM-S 112. At step 162, AUM-C 111 may send a response to AUM-S 112 indicating that the device 113 has been configured. At step 163, AUM-C 111 sends a request to configure device 113.

Figure 11:
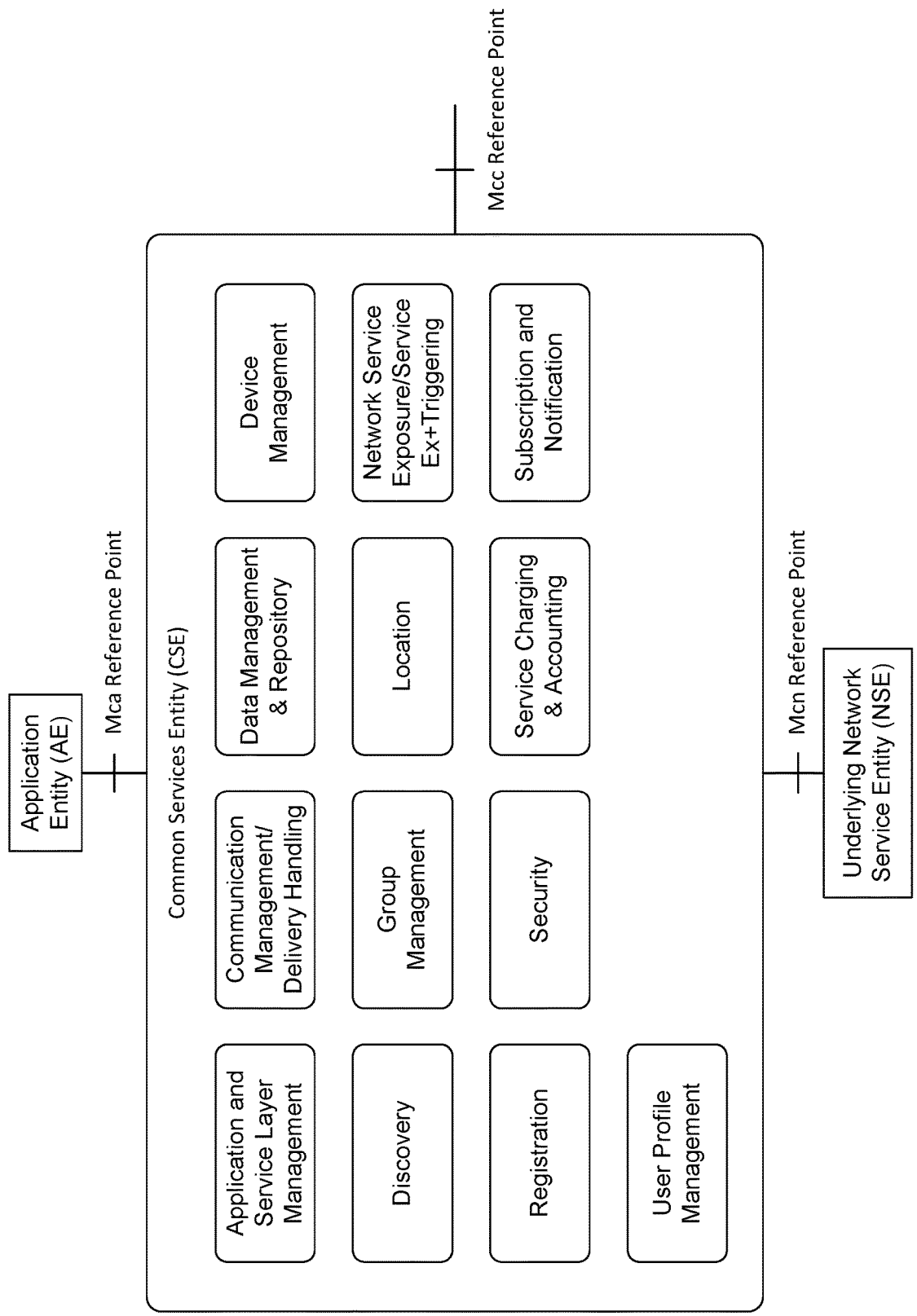
FIG. 11 illustrates an exemplary oneM2M CSF Embodiment.

FIG. 11 illustrates an exemplary oneM2M CSF. oneM2M defines the capabilities supported by the oneM2M Service Layer. The oneM2M Service Layer is instantiated as a Capability Services Entity (CSE) which comprises a set of Capability Service Functions (CSF). As one embodiment, the User Profile Management Service in this disclosure may be realized as a as shown in FIG. 11. CSEs will communicate via the Mcc and Mcc' reference point to manage registration. Application Entity (AE) may communicate via the Mca reference point to manage registration.

To support reliable and continued service, new resources and attributes are disclosed. New child resource for the <CSEBase> resource is described in Table 5.

TABLE 5

Child resource of <CSEBase> resource

| Child Resources of <CSEBase> | Child Resource Type | Description |
| --- | --- | --- |
| [variable] | <associateUser> | Information about user who are associated with the CSE |

The new <associate User> resource is disclosed under <CSEBase> to store information about user who are associated with the CSE. The <associate User> resource may include the attributes specified in Table 6.

TABLE 6

Attribute of <associateUser>

| Attributes of <associateUser> | Description |
| --- | --- |
| user-ID | This attribute may include the identifier of SL user |

TABLE 6-continued

Attribute of <associateUser>

| Attributes of <associateUser> | Description |
| --- | --- |
| associatedCSEList | This attribute may include a list of CSE-ID of CSEs that associate with the user and register to the CSE. |
| associatedAEList | This attribute may include a list of AE-ID of AEs that associate with the user and register to the CSE. |

New attributes are disclosed for a <serviceSubscribedNode> resource. Table 7 describes the new attributes of the <serviceSubscribedNode> resource.

TABLE 7

New Attributes of <serviceSubscribedNode>

| Attributes of <serviceSubscribedNode> | Description |
| --- | --- |
| ruleLinks | This attribute may include a list of links towards <serviceSubscribedUserRule> resources pertaining to this <serviceSubscribedNode>. This attribute shall exist only when the CSE-ID attribute is present. When the list is empty, it means no users are allowed to associate with the CSE which is indicated by the CSE-ID attribute. |

The new <serviceSubscribedUser> resource is disclosed under <m2mServiceSubscriptionProfile> to store information about service layer users. The <serviceSubscribedUser> resource may include the child resources specified in Table 8. The <serviceSubscribedUser> resource may include the attributes specified in Table 9.

TABLE 8

Child resource of <serviceSubscribedUser> resource

| Child Resources of <serviceSubscribedUser> | Child Resource Type | Description |
| --- | --- | --- |
| [variable] | <associatedCSE> | Information about CSEs that associate with the user |
| [variable] | <associatedAE> | Information about AEs that associate with the user |
| [variable] | <profileData> | Information about personalized data associated with the user |

TABLE 9

Attribute of <serviceSubscribedUser>

| Attributes of <serviceSubscribedUser> | Description |
| --- | --- |
| user-ID | This attribute may include the identifier of SL user |
| ruleLinks | This attribute may include a list of links towards <serviceSubscribedAppRule> resources pertaining to this <serviceSubscribedUser>. When the list is empty, it may mean no applications are allowed to associate with the user which is indicated by the user-ID attribute. |

The parent resource of a <serviceSubscribedUserRule> resource is the <CSEBase> resource of the IN-CSE hosting the <serviceSubscribedNode> resource(s) that point to the <serviceSubscribedAppRule> resource. The <serviceSubscribedUserRule> resource may include the child resource specified in Table 10.

TABLE 10

Attributes of <serviceSubscribedAppRule>

| Attributes of <diagnosticReport> | Description |
| --- | --- |
| serviceSubscribedAppRule | List of allowed User-ID to be used for the registering AEs or CSEs. This may include zero or more specific User-ID. |

The new <associatedCSE> resource is disclosed under <serviceSubscribedUser> to store information of CSEs that are associated with service users. Table 11 describes the new attributes of the <associatedCSE>.

TABLE 11

Attribute of <associatedCSE>

| Attributes of <associatedCSE> | Description |
| --- | --- |
| CSE-ID | This attribute may include the identifier CSE that is associated with the user |
| registrarCSE | This attribute may include the identifier of Registrar CSE. |
| relationship | This attribute may include the relationship between the CSE and the user. For example, the user owns the Node that associates with CSE, or the user does not own the Node that associates with CSE but is temporarily authorized to use the Node that associates with CSE. |
| status | This attribute may include the status of the association relationship. For example, the active status is defined as the Node associates with the CSE is currently used by the user and the inactive status is defined as the node associates with the CSE is not currently used by the user. |
| description | This attribute may include the information about data provided by the Device. For example, the type of the Node associates with the CSE. |

The new <associatedAE> resource is disclosed under <serviceSubscribedUser> to store information of AEs are associated with service users. Table 12 describes the new attributes of the <associatedAE>.

TABLE 12

Attribute of <associatedAE>

| Attributes of <associatedAE> | Description |
| --- | --- |
| AE-ID | This attribute may include the identifier AE that is associated with the user |
| registrarCSE | This attribute may include the identifier of Registrar CSE. |
| relationship | This attribute may include the relationship between the AE and the user. For example, the user owns the Application, or the user does not own the Application but is temporarily authorized to use the Application. |

TABLE 12-continued

Attribute of <associatedAE>

| Attributes of <associatedAE> | Description |
| --- | --- |
| status | This attribute may include the status of the association relationship. For example, the active status is defined as the Application is currently used by the user and the inactive status is defined as the Application is not currently used by the user. |
| description | This attribute may include the information about data provided by the Application. For example, the type of the Application. |

The new <profileData> resource is disclosed under <serviceSubscribedUser> to store the data information that are associated with service users. The <profileData> resource shall contain the child resources specified in Table 14 describes the new attributes of the <profileData>.

TABLE 13

Child resource of <profileData> resource

| Child Resources of <serviceSubscribedUser> | Child Resource Type | Description |
| --- | --- | --- |
| [variable] | <semanticDescriptor> | This stores a semantic description pertaining to a resource |

TABLE 14

Attribute of <profileData>

| Attributes of <profileData> | Description |
| --- | --- |
| link | This attribute may include the link to the original resource hosted by the original resource-Hosting CSE. |
| containerDefinition | This may include an identifier reference (URI) to the <flexContainer> schema definition which may be used by the CSE to validate the syntax of the <flexContainer> resource. |

Figure 12:
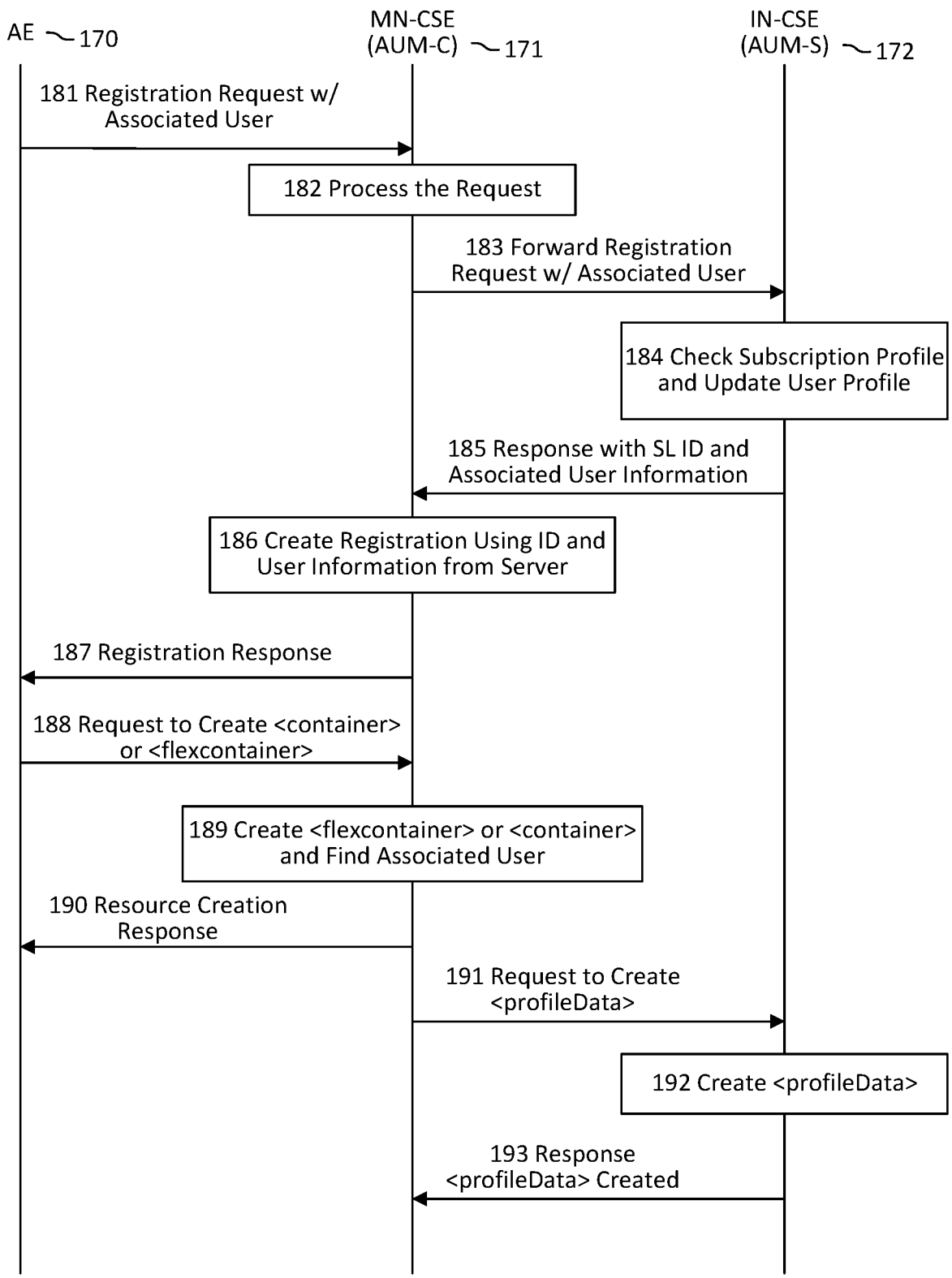
FIG. 12 illustrates an exemplary Enhanced Registration Procedure to Automatically Manage the Association Relationship between a SL user and the AE.

FIG. 12 illustrates an exemplary Enhanced Registration Procedure to Automatically Manage the Association Relationship between a SL user and the AE. When an AE or CSE registers to a oneM2M system, the Registrar CSE may automatically manage the association relationship between a SL user and the AE or CSE as shown in FIG. 12. At step 181, the Registree Entity, e.g. AE 170, may send a registration request message to the Registrar Entity, e.g. MN-CSE 171. In the request, AE 170 may indicate App-ID and may indicate the appName of the AE 170, e.g. a thermostat. The request may also include the SL ID and User ID that are assigned by the Service Layer when the AE is enrolled. At step 182, based on receiving the registration request message, MN-CSE 171 may determine whether to contact IN-CSE 172 about whether AE 170 is allowed to register and which user is authorized to associate with AE 170. At step 183, MN-CSE 171 may send a request to report this registration to IN-CSE 172, which may include CSE-ID of MN-CSE 171. MN-CSE 171 may also include information in the request about the type of the AE 170 and User ID that is assigned by the Service Layer when AE 170 was enrolled.

At step 184, IN-CSE 172 may check its service subscription profile to find whether AE 170 is allowed to register to MN-CSE 171. IN-CSE 172 finds <serviceSubscibedNode> resource that is associated with MN-CSE 171 and checks <serviceSubscribedUserRule> to find the authorized users of MN-CSE 171. For each authorized user, IN-CSE 172 finds the <serviceSubscribedUsers> and checks the linked <serviceSubscribeAppRule> to determine whether these authorized users may use AE 170. Based on the registration approval, if the user ID contained in the request is an allowed user, IN-CSE 172 may add a <associatedAE> resource for AE 170 and a <associatedCSE> resource for MN-CSE 171 in <serviceSubscribedUsers> associated with the user. Alternatively, IN-CSE 172 may add a <associatedAE> resource for AE 170 in <serviceSubscribedUsers> that are associated with allowed users who are currently using MN-CSE 171. IN-CSE 172 then generates a unique SL ID within the service provider domain for AE 170. At step 186, IN-CSE 172 sends a response to the Registrar Entity, e.g., MN-CSE 171. The response message may include the unique ID for the Registree Entity. The response may indicate the SL users who are currently using the AE 170.

At step 186, based on the received response, the Registrar Entity, e.g., MN-CSE 171, creates the SL registration for the Registree Entity, e.g., AE 170. Based on the response, MN-CSE 171 adds AE 170 into associatedAE list attribute in <associateUser> who are currently using AE 170. At step 187, MN-CSE 171 sends a response to AE 170 that the registration has been created. At step 188, AE 170 may send a request to create a <container> or <flexcontainer>. At step 199, MN-CSE 171 may receive the request and may create a <container> or <flexcontainer>. MN-CSE 171 then finds the user who is associated with this AE 170, and sends a request to update <serviceSubscribedUsers> that is associated with the user. At step 190, MN-CSE 711 may send a response to confirm the creation of the resource. At step 191, MN-CSE 171 may send a request to IN-CSE 172 to create a new <profileData> under <serviceSubscribedUsers> that is associated with the user. The request may include the URI of the resource, sematic description about the resource, or container definition of the resource if the resource is a <flexContainer>. At step 192, IN-CSE 172 may create a <profileData> resource that stores the context information about the data AE 170 generated that is associated with the user. At step 193, IN-CSE 172 may send a response to MN-CSE 171 to confirm the creation of the <profileData> resource.

Figure 13:
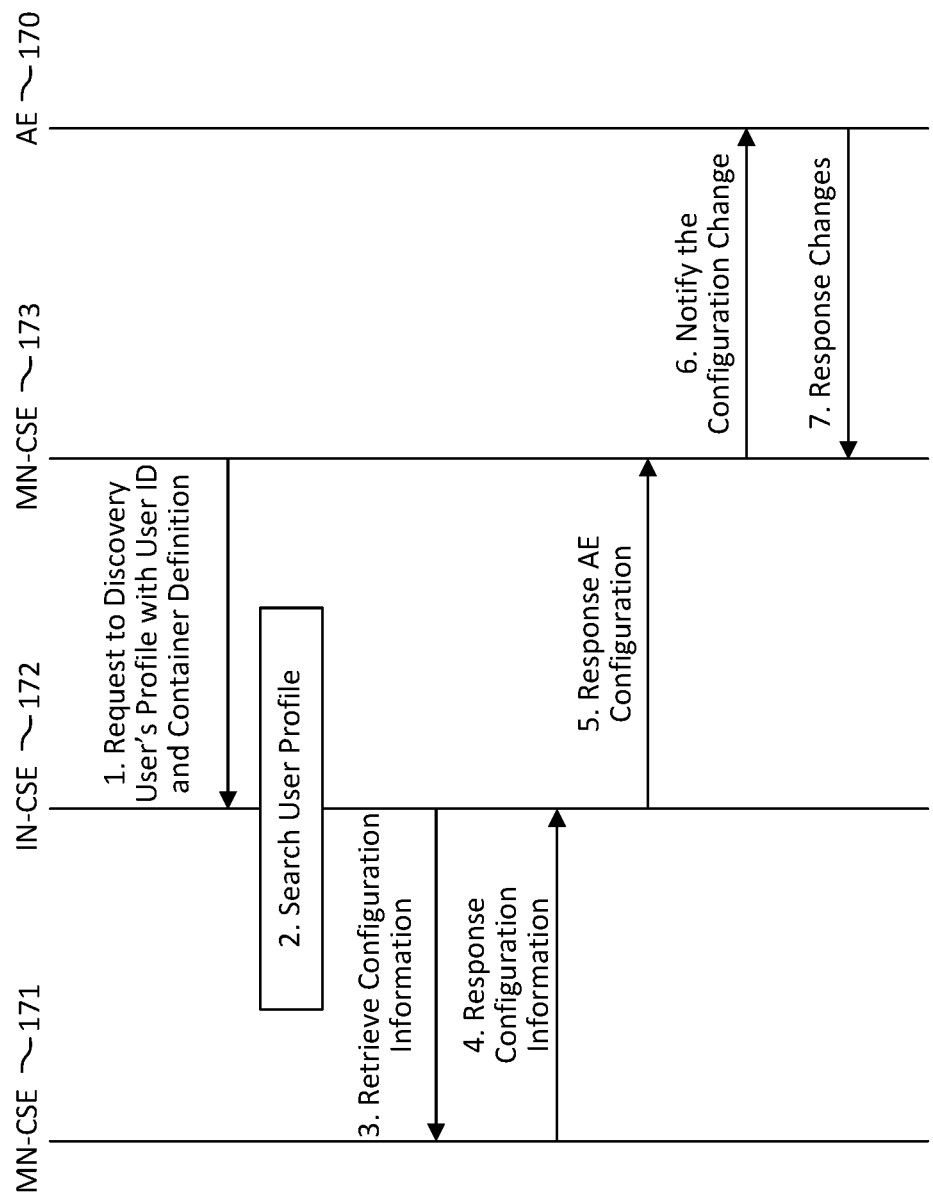
FIG. 13 illustrates an exemplary Procedure to Configure an AE using User Profile.

FIG. 13 illustrates an exemplary Procedure to Configure an AE using User Profile. A procedure is disclosed that a Registrar CSE, e.g. MN-CSE 173, may automatically configure AE 170 for a user based on the user's profile stored at IN-CSE 172 as shown in FIG. 13. At step 201, MN-CSE 173 may send a request to MN-CSE 172 to discovery the user profile in order to configure AE 170. The request may include the user-ID and the container definition information of the <flexcontainer> AE 170, for example, a thermostat device. At step 202, after receiving the request, IN-CSE 172 may check the <serviceSubscribedUser> resource associated with the user-ID in the request and find the configuration information for AE 170. For example, IN-CSE 172 find whether there is a <profileData> resource of which has the same contain definition as in the request, in this way, IN-CSE 172 may retrieve the <flexContainer> resource from the original hosting CSE, e.g. MN-CSE 171.

At step 173, IN-CSE 172 may send a request to MN-CSE 171 to retrieve <flexContainer> resource. At step 174, MN-CSE 171 may send a response that may include its <flexContainer> resource. At step 205, IN-CSE 172 sends a response may include the <flexContainer> resource that has the same container definition. At step 206, the <flexContainer> is updated, MN-CSE 173 send a notification to change the configuration of the AE 170. At step 207, AE may send a response to confirm the response.

A user interface may be added to a M2M/IoT Server or Gateways that have AUM-S (e.g. an oneM2M IN-CSE or MN-CSE) to display Service Layer User Profile information as shown in FIG. 14.

For conventional system, a user may login to different computers on a network and have all the user profile information transported from one computer (e.g., first login computer) to another computer (e.g., second login computer). For this conventional system, there is just copying and transfer of the profile to another computer. However, in M2M/IoT system disclosed herein, there are many type of M2M/IoT Devices, in which there may be in turn many types of device information to use the profile information to configure. For example, a humidifier setting should not be applied to a thermostat. Therefore, for example in FIG. 9, in step 133-step 135, AUM-S 114 retrieves devices information from AUM-C 111 before sending a request to AUM-S 112. Further, in the conventional system, there may be just a copy/transfer of an entire profile from the first computer to a second computer without changing any information. Again, generally, in M2M/IoT system or the like system, even the same type of device may be different. Step 139 of FIG. 9 allows for AUM-S 112 to generate a customized profile based on the device context information (e.g., device type, model number, manufacture, etc.) provided in the request of step 138.

For further context, conventional systems may not have the capability to dynamically manage the relationship between IoT Applications and users, such as the context information of the data generated by the Application or the location where the data is stored. Thus, the conventional scheme may not build a SL user profile that manages users' personalized data accurately. However, disclosed herein (e.g., FIG. 8-FIG. 10), when an entity registers to a SL system, the SL may automatically manage the association relationship between a SL user and the new entity. In step 121 and step 123 of FIG. 8, for example, messages may include device information and user information shown in Table 3. In step 124, AUM-S 112 may store device and user information shown in Table 4.

Figure 15:
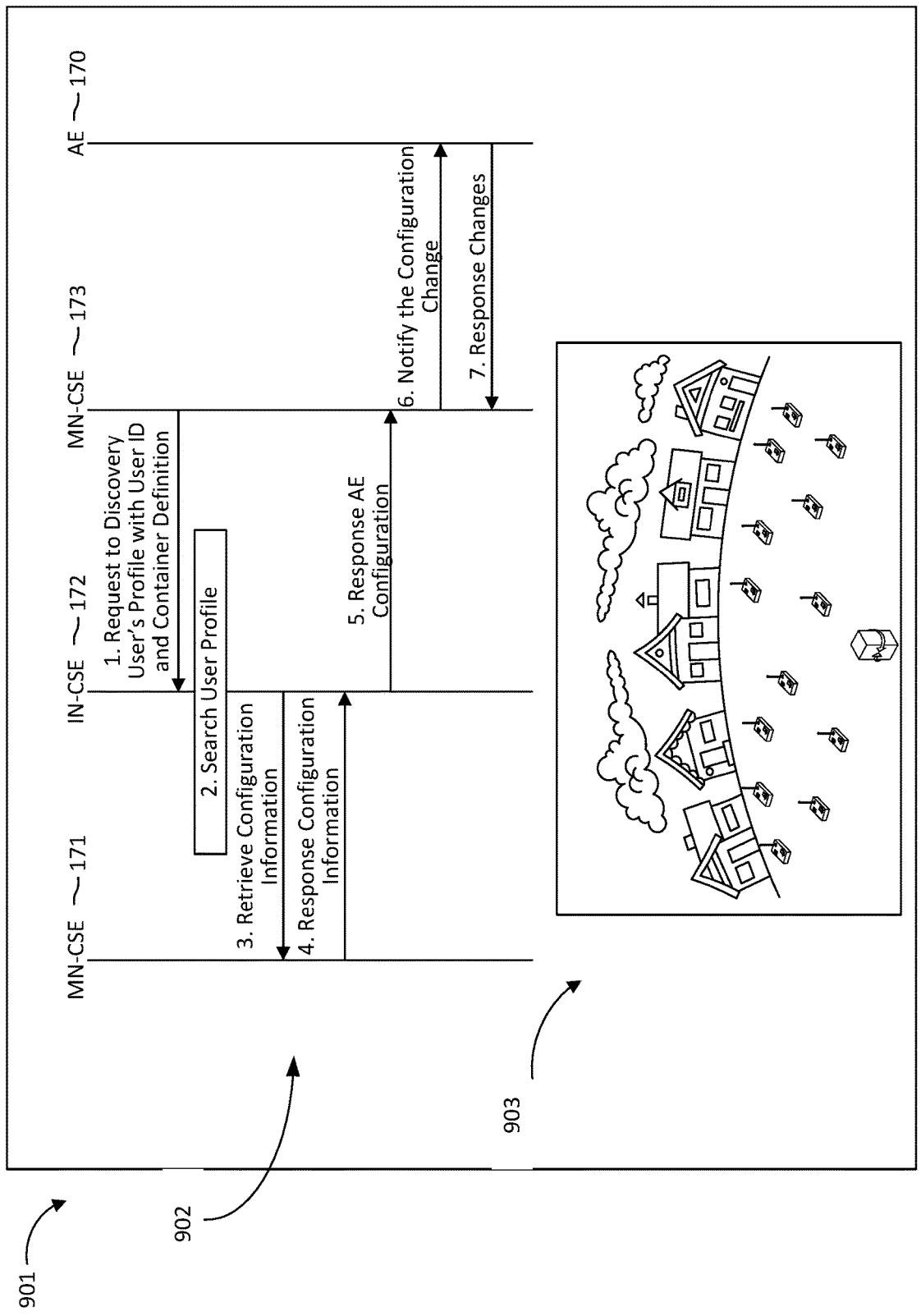
FIG. 15 illustrates an exemplary display (e.g., graphical user interface) that may be generated based on the methods and systems disclosed herein.

FIG. 15 illustrates an exemplary display (e.g., graphical user interface) that may be generated based on the methods and systems discussed herein. Display interface 901 (e.g., touch screen display) may provide text in block 902 associated with automated IoT device configuration using user profile, such as the parameters of Table 1 through Table 14. In another example, progress of any of the steps (e.g., sent messages or success of steps) discussed herein may be displayed in block 902. In addition, graphical output 903 may be displayed on display interface 901. Graphical output 903 may be the topology of the devices in an automated IoT device configuration using user profile setup, a graphical output of the progress of any method or systems discussed herein, or the like.

TABLE 15

| Abbreviations | |
| --- | --- |
| ADN | Application Dedicated Node |
| AE | Application Entity |

TABLE 15-continued

Abbreviations

| | |
|---|---|
| API | Application Programming Interfaces |
| ASN | Application Service Node |
| CSE | Common Service Entity |
| CSF | Common Service Function |
| IN | Infrastructure Network |
| IoT | Internet of Things |
| IP | Internet Protocol |
| M2M | Machine to Machine |
| MN | Middle Node |
| NoDN | Non-oneM2M Node |
| PoA | Point of Access |
| ROA | Resource Oriented Architecture |
| SL | Service Layer |
| URI | Uniform Resource Identifier |

TABLE 16

Definitions

| | |
|---|---|
| IoT application | A software entity that performs Application specific functionality pertaining to IoT use cases (e.g. sensing, actuating) |
| IoT service | A software entity that provides capabilities to IoT Applications and Devices (e.g. data management, security, Device management) |
| IoT device | An entity that may hosts one or more IoT Applications |
| IoT entity | An IoT Application, IoT service or IoT Device |
| IoT service platform | A system that provides IoT services to its enrollee's and their IoT Devices, Applications, data and users on behalf of a service provider |
| IoT service provider | A stakeholder (e.g. a company) responsible for the deployment and management of an IoT services platform |
| IoT service enrollee | A stakeholder (e.g. a human being) that establishes a service enrollment with an IoT service provider's platform in order to access and use its services. |
| IoT service enrollment | The act of an IoT service enrollee registering its IoT Devices, Applications, data and authorized users to an IoT service provider in order to gain access to the services offered by the provider's IoT platform. |
| IoT user | A user associated with an IoT service enrollee. An IoT service enrollee may grant specified privileges to specified users to access specified IoT Devices, Applications, data and services via the IoT service provider's platform. |
| User profile | A user profile is a collection of settings and information associated with a user. The user profile helps in associating characteristics with a user and helps in ascertaining the interactive behavior of the user along with preferences. |

Note that device and application are generally used interchangeably throughout this disclosure. It is contemplated that there may be a plurality of applications in use. Table 15 includes abbreviations and Table 16 includes exemplary definitions of terms.

A Service Layer (SL) function (e.g., a user data protection function) may be used for managing a user profile that is associated with a SL user and using this profile to automatically configure different types of devices connected to an IoT service provider's platform.

Data Protection for a mobile Internet-of-Things (IoT) user may be achieved by providing aliased data from a home server of the user to a foreign server, whereby personally identifiable information is removed from the aliased data. The user may assist in the establishment of a secure connection between the foreign server and the home server by provisioning a key to the home and foreign servers. The aliased data may be created in accordance with an extended attribute based access control policy. The foreign server may configure IoT devices for use by the user in accordance with the aliased data, and may remove the aliased data from itself and from the IoT devices according to a data erasure policy in response to a trigger, where the trigger is an input from user, a detected action by the user, or an automatic condition, for example.

Data Protection for a mobile user in an IoT, WoT, or M2M environment may be achieved by providing aliased data from a home server of the user to a foreign server, whereby the set of data is selected from a user profile and personally identifiable information is removed from the aliased data. The aliased data may include, for example, user preferences for the use of various IoT devices or classes of IoT devices in a variety of contexts. The aliased data may be extracted from a user profile, or constitute a complete, aliased user profile. For privacy purposes, it is useful to remove any personally identifiable information from the aliased data, and to have such data automatically removed from the foreign server and associated IoT devices when the user exits the area, for example. This enables the user to import her preferences for a number of devices at once, and yet retain confidentiality about her identity and preferences.

The user may assist in the establishment of a secure connection between the foreign server and the home server by provisioning a key to the home and foreign servers. In other words, rather than the secret being provisioned by the network, the user may, for example, enter a shared secret with which the home server and foreign server may establish a secure connection.

The aliased data may be created in accordance with an Extended Attribute-Based Access Control Policy (EA-BACP). Such a policy may reside on the home server, for example, and comprise information about which user profile information to share in various situations, and preferences for the eventual erasure of the data by the foreign server.

The foreign server may configure IoT devices for use by the user in accordance with the aliased data, and may remove the aliased data from itself and from the IoT devices according to a data erasure policy in response to a trigger, where the trigger is an input from the user, a detected action by the user (e.g., a deliberate act by the user), or an automatic condition, for example. Data erasure policies may be maintained by the foreign server while a temporary user account is in use, with the user having access to modify the policies. Modifications to the data erasure policies may also be maintained by, or shared with, the home server.

Table 17 lists many acronyms used herein.

TABLE 17

Acronyms

| | |
|---|---|
| ADN | Application Dedicated Network |
| AE | Application Entity |
| AF | Application Function |
| API | Application Programming Interface |
| ASN | Application Service Node |
| AUP | Aliased User Profile |
| CSE | Common Service Entity |
| CSF | Common Service Function |
| DEMF | Data Erasure Management Function |
| DEP | Data Erasure Policies |
| GUP | Generic User Profile |
| IN | Infrastructure Network |
| IoT | Internet of Things |
| IP | Internet Protocol |
| M2M | Machine to Machine |
| MN | Middle Node |
| NoDN | Non-oneM2M Node |
| OSA | oneM2M Security Administrator |
| PPM | Privacy Policy Manager |
| PPS | Privacy Policy Service |

TABLE 17-continued

Acronyms

| | |
|---|---|
| SL | Service Layer |
| SLSA | Service Layer Security Administrator |
| TAC | Temporary Access Code |
| TUA | Temporary User Account |
| UDPF | User Data Protection Function |
| UPIF | User Profile Integration Function |

Herein, the term "user" generally refers to a human user of software or hardware. A user may also be referred to as an operator or a service subscriber.

Herein, the term "user profile" generally refers to an organized set of data that represents a user's settings and preferences. A user profile, for example, may include a user's personal information such as name, ID, address, devices, applications, or service layers that user has authority over, or subscriptions to, etc.

Herein, the term "privacy" generally refers to the desirable personal state or condition of being free from being observed and, to determine when, how, to whom, and whether one's personal or organizational information is to be revealed.

Herein, the term "authentication" generally refers to a process of establishing confidence in the identity associated with an entity.

Herein, the term "data" generally refers to a set of facts that may include numbers, letters, words, observations, and measurements, outcome of monitoring, evaluation or surveys, etc.

Herein, the term "information" generally refers to data that are processed, organized, structured to give a meaning, e.g. Feb. 25, 2018.

Herein, the term "entity" generally refers to an application, a set or sub-set of applications, a service enabling function, a device such as a sensor, or a software function.

Herein, the terms "home gateway" and "home server" generally refer to a user's gateway or server used at her smart home location, to which all of her smart devices (such as smartphones, smart thermostat, smart meter, heartbeat monitor, etc.) may have been registered.

Herein, the term "foreign gateway or server" generally refers to a gateway or server resides in a location that is not the base location for the user and her devices, as distinct from the home gateway or server. A user may utilize foreign gateway or server temporarily, for example.

Herein, the term "home location" generally refers to a location, perhaps signified usually by user's home, mailing, or street address, where a user lives or spends most of her time.

Herein, the term "foreign location" generally refers to an away location that is not a home location.

Herein, the term "home M2M/IoT Environment" generally refers to a cloud of devices, applications, or service layers and networks that a user operates and owns at her home location.

Herein, the term "foreign M2M/IoT Environment" generally refers to a cloud of devices, applications, or service layers and networks at a location away from home, which the user does not own or otherwise have authority over. A user may be given some authority to utilize these devices, applications, or service layers in the foreign M2M/IoT environment.

Herein, the term "alias" generally refers to an assumed identity. For example, the artist Michael Jackson had multiple aliases: MJ, King of Pop, etc. An alias may be anonymous.

Herein, the term "aliased user profile" generally refers to a user profile which has its original user's identity, such as her name and unique ID, substituted with some other name and ID in order to protect the privacy of the user.

Herein, the term "generic user profile" generally refers to a user profile that does not belong to a particular user. A generic user profile usually is created so that a user may adopt it. A generic user profile may only be accessible, for example, only to a SL security administrator before it is given to a user.

Herein, the term "shared secret" generally refers to a piece of data, known only to the parties involved, in a secure communication. The shared secret may be a password, a passphrase, a large number, or an array of randomly chosen bytes, for example.

Herein, the term "temporary user" generally refers to a user who may have limited life time as well as authority in the foreign system.

Herein, the term "temporary user account" generally refers to a user account that may be given to a user who may reside in a foreign gateway or server for a limited period of time.

Herein, the term "temporary access code" generally refers to a unique temporary code that represents a temporary user account and acts as a token to access temporary user account.

Herein, the term "data erasure" generally refers to a software-based technique of overwriting data with the aim of destroying all of electronic data residing on a hard disk drive or other digital media device, such as by using zeros and ones to overwrite data onto all sectors of the device.

The Service Layer Security Administrator (SLSA) has full authority over the service layer and performs tasks such as designing and deploying ACP, granting authority to user, configuring protocols for authentication and authorization, etc. A oneM2M/IoT Security Administrator perform duties similar to those of an SLSA.

Herein, the term "procedure" generally refers to techniques of performing operations to achieve particular ends. The term "procedure" generally is used in place of "method" to avoid confusion with special meanings that the term "method" may have in the context of M2M and IoT applications. The steps described for procedures are often optional, and may potentially be performed in a variety of ways and a variety of sequences. Hence, herein the term "procedure" should not be interpreted as referring to a rigid set and sequence of steps, but rather to a general methodology for achieving results that may be adapted in a variety of ways.

M2M/IoT Service Layer

An M2M/IoT Service Layer (SL) is a technology for providing value-added services for M2M/IoT devices, IoT applications, and IoT data. Recently, several industry standard bodies have been developing M2M/IoT SLs to address the challenges associated with the integration of M2M/IoT devices, applications, and data into deployments with the Internet/web, cellular, enterprise, and home network. See, for example: neM2M Functional Architecture V-2.10.1; ETSI Machine-to-Machine communications (M2M) Functional Architecture, Draft ETSI TS 102 690 1.1.1 (2011-10); OCF OMA Lightweight M2M (LWM2M) Technical Specification, Draft Version 1.0.2—9 Feb. 2018; and oneM2M-TS-0003 Security Solutions-V-3.0.6.8.

An M2M/IoT SL can provide applications and devices access to a collection of M2M/IoT oriented capabilities. A few examples include security, charging, data management, device management, discovery, provisioning, and connectivity management. These capabilities are made available to applications via APIs which make use of message formats, resource structures, and resource representations supported by the M2M/IoT SL.

Figure 2:
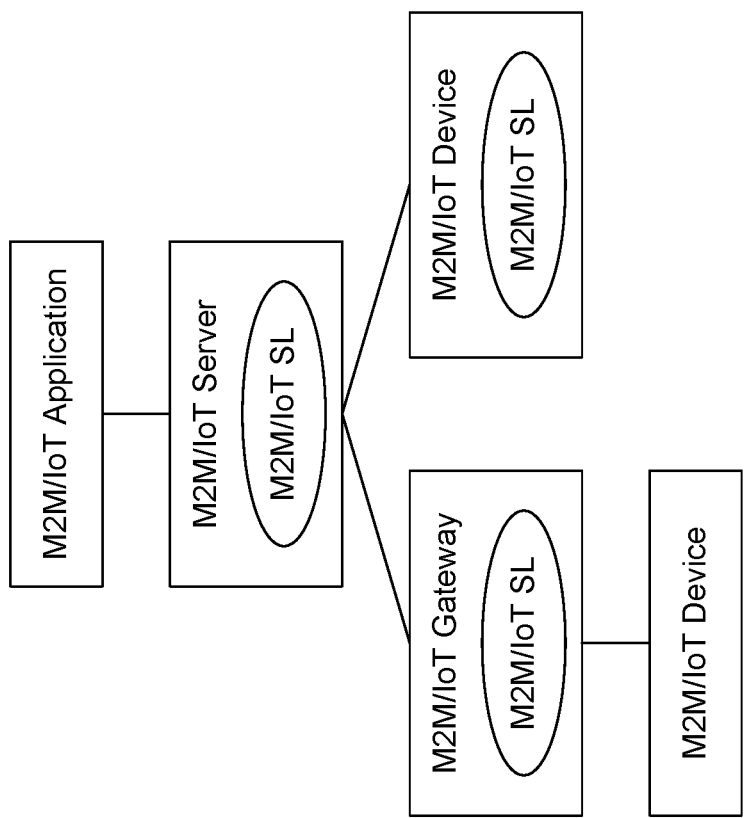
FIG. 2 illustrates an exemplary M2M/IoT SL deployed on various types of network nodes.
Figure 3:
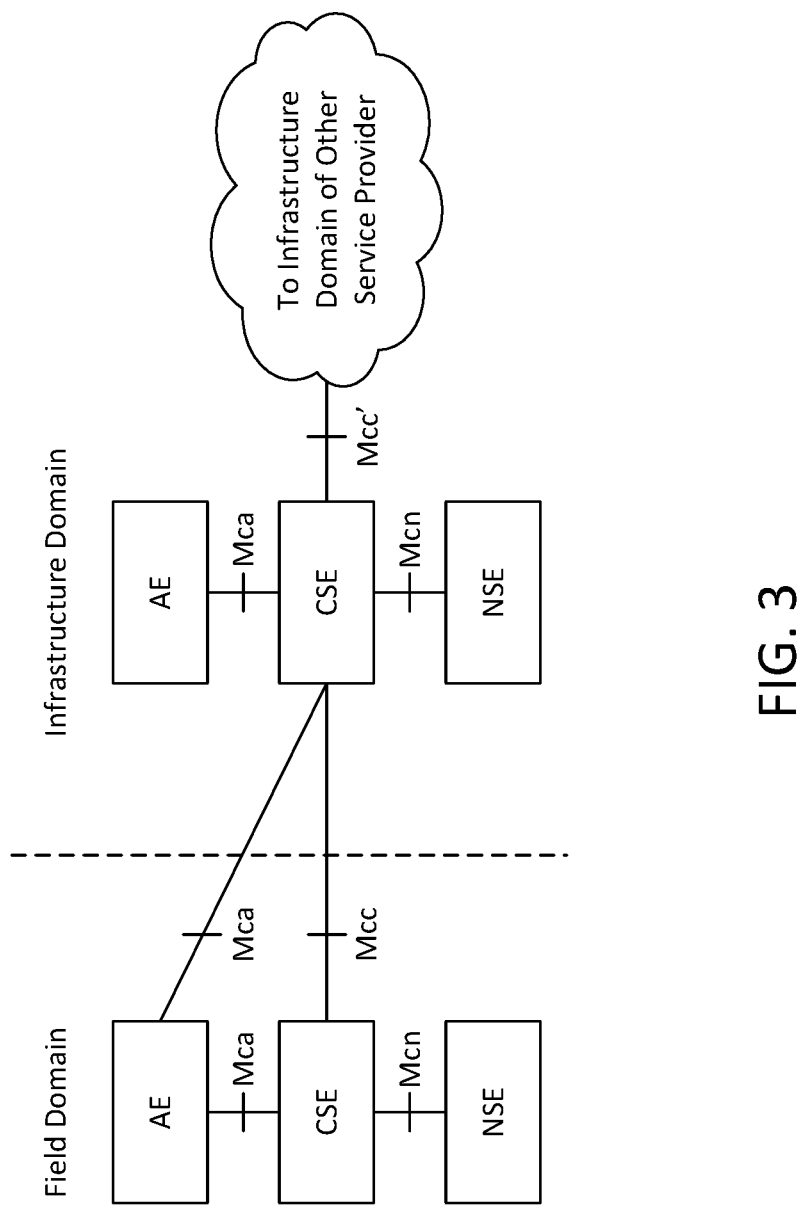
FIG. 3 illustrates an exemplary oneM2M Architecture.
Figure 4:
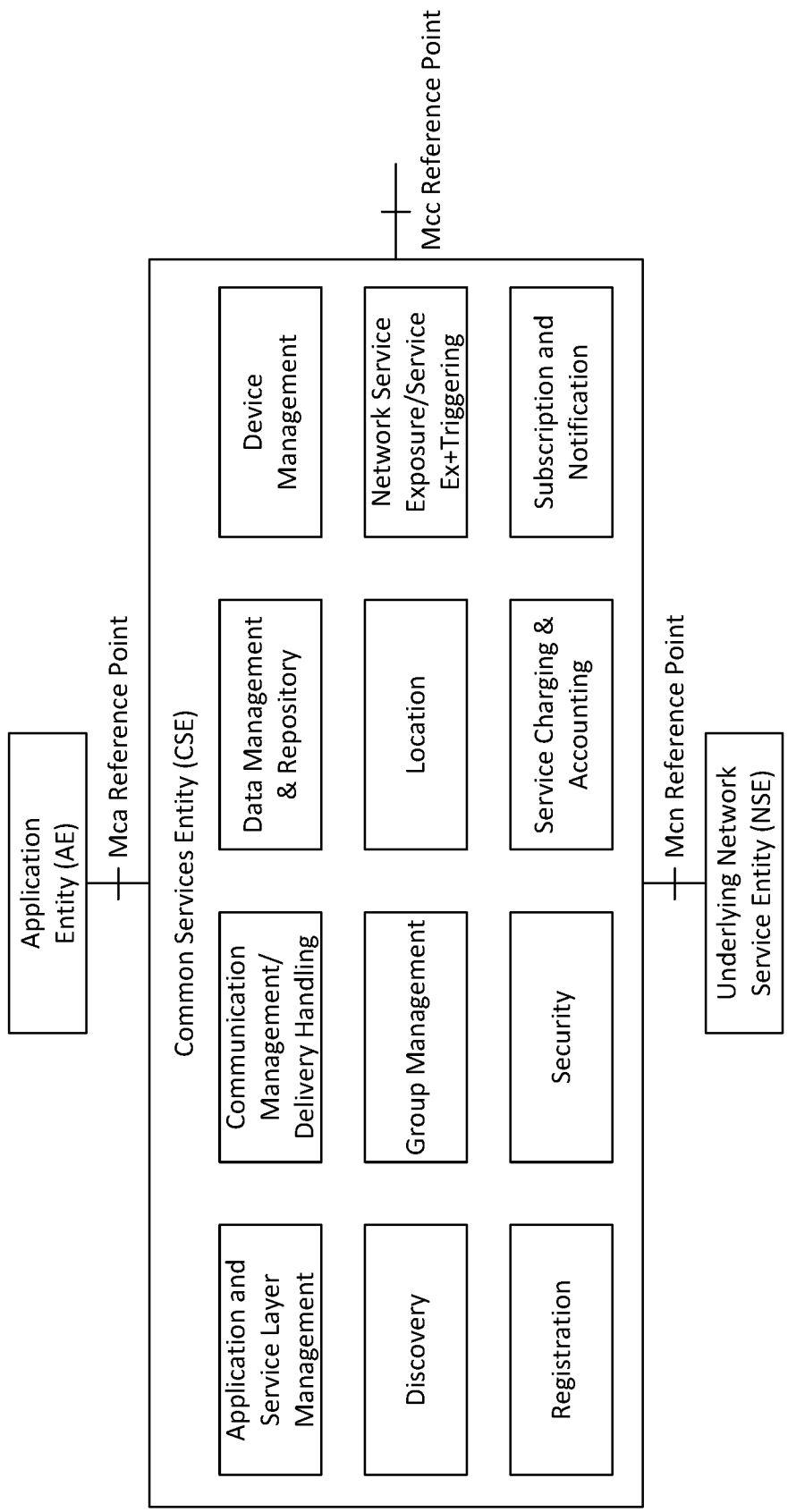
FIG. 4 illustrates an exemplary oneM2M Common Service Functions.
Figure 5:
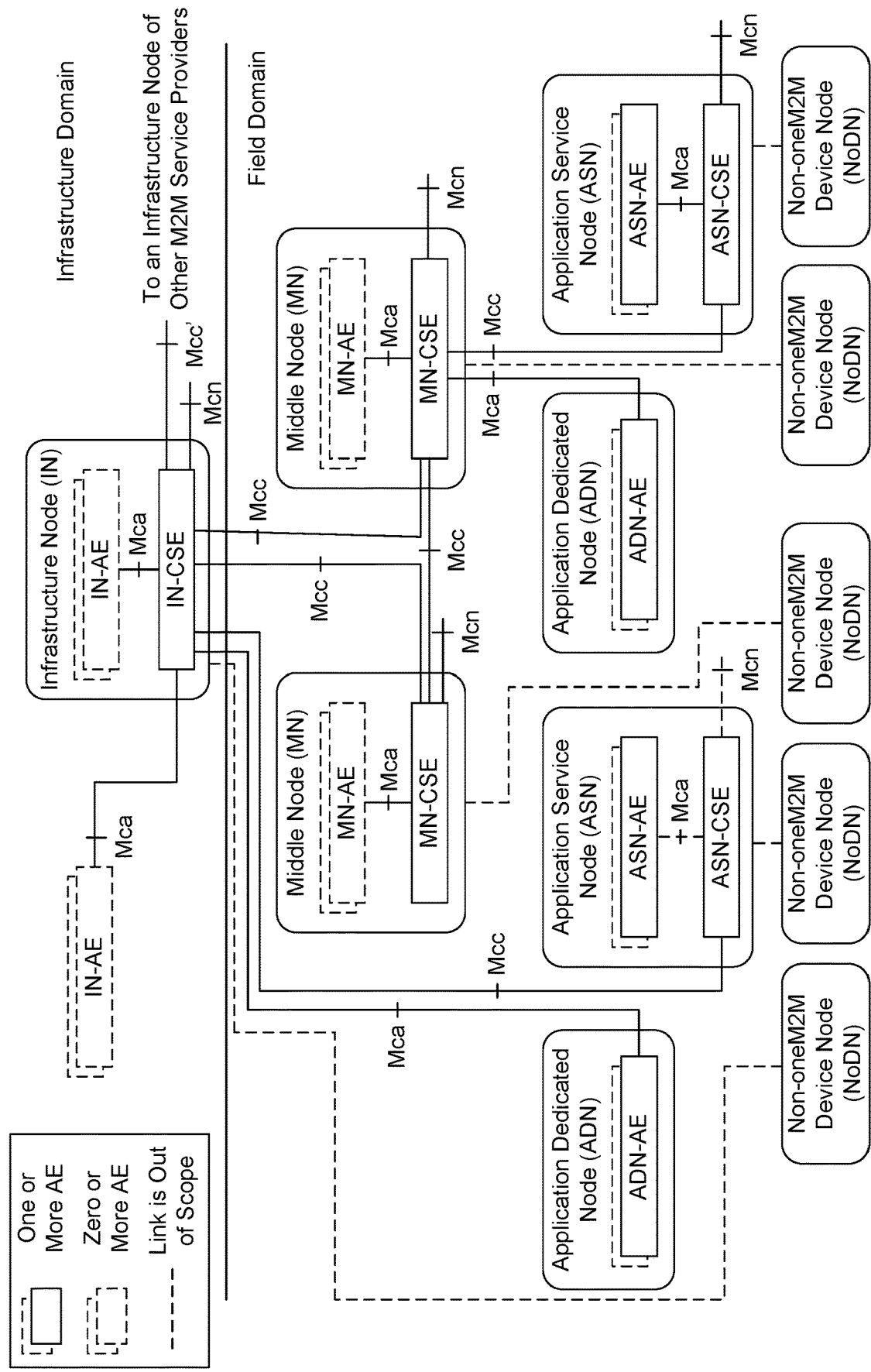
FIG. 5 illustrates exemplary Configurations supported by oneM2M Architecture.

From a protocol stack perspective, SLs are typically situated above the Application Protocol Layer and provide value added services to applications they support. Hence SLs are often categorized as 'middleware' services. FIG. 1 shows an exemplary service layer between the Application Protocols and Applications.

oneM2M SL Architecture oneM2M TS-0001 defines a M2M/IoT Service Layer (SL). The purpose of the SL is to provide "horizontal" services that can be utilized by different "vertical" M2M systems and applications, such as e-Health, fleet management, and smart homes. The architecture of the oneM2M SL, as shown in FIG. 2, defines a Common Service Entity (CSE) that supports four reference points. FIG. 4 illustrates oneM2M Common Service Functions. The Mca reference point interfaces with the Application Entity (AE). The Mcc reference point interfaces with another CSE within the same service provider domain and the Mcc' reference point interfaces with another CSE in a different service provider domain. The Mcn reference point interfaces with the underlying network service entity (NSE). An NSE provides underlying network services to the CSEs, such as device management, location services, and device triggering. A CSE contains multiple logical functions called Common Service Functions (CSFs). As illustrated in FIG. 3, CFs may include such functions as Discovery, Data Management & Repository, etc.

Some example configurations of inter-connecting the various entities supported within the oneM2M system are illustrated in FIG. 4.

Service Layer Authentication

Service layer authentication is the process of validating that the identity of a service layer registrant is associated with a trustworthy credential. How to perform an authentication process will depend on the authentication mechanism used. For example, in the case of certificate-based authentication, authentication typically involves verifying a digital signature. In the case of symmetric key authentication, authentication typically involves verifying a Message Authentication Code (MAC). Mutual Authentication is a two-way authentication which occurs between a registrant and the service layer it is registering to. Hence, mutual authentication is the process of the service layer validating the identity of the registrant as well as the registrant validating the identity of the service layer.

Password-based authentication is another easy way of authenticating users in a system. In password-based authentication, a user must supply a password to the server for their corresponding name/username, and the administrator must keep track of the name and password for each user. One commonly used technique of making password-based authentication more secure is password hashing. A hash function is any function that can be used to map data of arbitrary size to data of a fixed size. A cryptographic hash function is a special class of hash function that has certain properties which make it suitable for use in cryptography. It is a mathematical algorithm that maps data of arbitrary size to a bit string of a fixed size (a hash) and is designed to be a one-way function, that is, a function which is infeasible to invert. Modern day password-based authentication uses cryptographic hashing with salt. A salt is random data that is used as an additional input to a one-way function that "hashes" data, a password, or a passphrase. Salts are closely related to the concept of nonce. The primary function of salts is to defend against dictionary attacks.

Service Layer Authorization

Service layer authorization mechanisms are used to control access to resources or services hosted in the service layer. Authorization typically involves allowing authenticated registrants to access resources and services hosted in a service layer based on statically provisioned authorization policies and assigned roles. An authorization policy is a set of rules that define whether a given service layer registrant is permitted to access a protected resource or service hosted in the service layer. These policies can be based on different mechanisms. Three common types of authorization policies are Authorization List (ACL), Role Based Authorization (RBAC), and Subscription Based Authorization (SBAC).

A service layer ACL defines which service layer registrants are permitted to access which resources, attributes or services, as well as which operations they are allowed to perform on a given resource or service. For example, a registrant 123 may be allowed to read (but not write) resource ABC.

Figure 16:
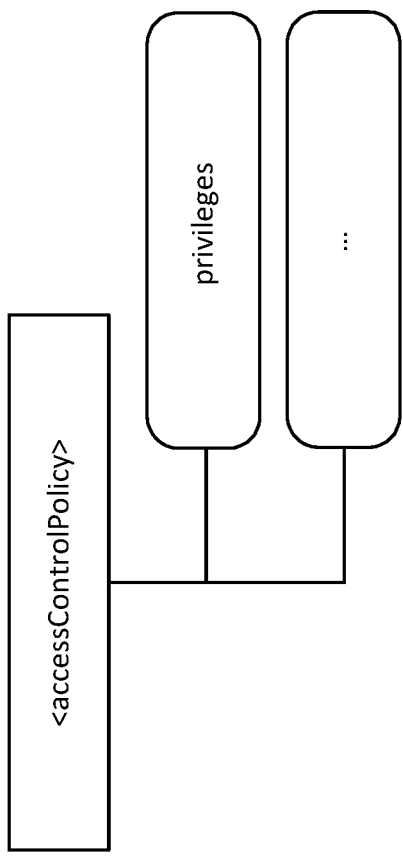
FIG. 16 illustrates an example oneM2M <accessControlPolicy> resource.

M2M service layers (for example, oneM2M TS-0001, ETSI TS 102 690 1.1.1, OMA LWM2M) are examples of service layers that support authorization mechanisms such as the ones described above.

oneM2M Service Layer Authorizations oneM2M defines an existing <accessControlPolicy> resource that supports a configured set of privileges as shown in FIG. 16. The privileges can be configured with a set of authorization rules (i.e., policies) defining which authenticated service layer registrants have privileges to access resources associated with the <accessControlPolicy> resource. Once configured these privileges are typically static from the perspective of the service layer.

oneM2M defines an ACL policy as a set of access-control-rule tuples that can be stored within the privileges attribute. Each tuple is comprised of five components: originators, operations, context, details, and authentication flag.

accessControlOriginators is a set of service layer registrants authorized to access resources associated with this authorization policy (e.g., a list of CSE-IDs or AE-IDs).

accessControlOperations is a set of operations that each authorized service layer registrant is authorized to perform (e.g., Create, Retrieve, Update, and Delete).

oneM2M currently defines the following three types of accessControlContext. accessControlTimeWindows are windows during which requests are allowed. Requests occurring outside this time to resources associated with this authorization policy will be denied. accessControlLocationRegions are lists of locations where service layer registrants are allowed to be located when accessing resources associated with this authorization policy. Requests from service layer registrants from locations not in this list will be denied. accessControlIpAddresses are IP addresses of service layer registrants allowed to access resources associated with this authorization policy. Requests from service layer registrants that have IP addresses not in this list will be denied.

accessControlObjectDetails is an optional parameter of an access control rule. It specifies a subset of child resource types of the targeted resource to which the access control rule applies.

accessControlAuthenticationFlag is an optional parameter in an access-control-rule-tuple. If the value is TRUE, then the access control rule applies only if the Originator is authenticated by the Hosting CSE. If the value is FALSE, then the access control rule applies whether or not the Originator is considered to be authenticated by the Hosting CSE.

oneM2M Privacy Policy Manager

A Privacy Policy Manager (PPM) is a distributed authorization privacy protection architecture using M2M Service Subscriber's privacy preference and a service's privacy policy. The PPM is a personal data management framework based on the M2M Service Subscriber's privacy preferences that creates access control information from policies agreed by a M2M Service Subscriber. The PPM protects M2M Service Subscriber's personal data from unauthorized parties and unauthorized collection. The PPM may be operated by the M2M Service Provider itself or another entity on behalf of the M2M Service Provider. If the M2M Service Provider provides M2M Service Subscriber's personal data to any third party, the M2M Service Provider needs to get the M2M Service Subscriber's consent. If the M2M Service Subscriber accepts a privacy policy that includes a provision that allows sharing personal data with third parties, the Service Provider can provide the M2M Service Subscriber's personal data to a third party. However, if the privacy policy did not include this provision, the Service Provider is not allowed to share the M2M Service Subscriber's personal data with a third party.

The PPM manages privacy preferences and privacy policies. Privacy preferences may include an M2M Service Subscriber's preference regarding the sharing of his own personal data with third parties. A M2M Service Subscriber creates a M2M Service Subscriber's privacy preference and registers it to the PPM. ☐☐Privacy policies may include an ACP that describes required M2M Service Subscriber personal data that is needed to provide service to a M2M Service Subscriber by a M2M Service Provider. An M2M Service Provider creates a privacy policy and registers it to the PPM.

Example Use Case

Consider a scenario wherein a person may travel from her smart home location to a new location. Her 'home' may be her base or home location, which may be a smart workplace, smart home, or condominium, etc., where she spends most of her time. At home, she may own or control M2M/IoT devices, applications, or service layers. She then travels for business, and may stay in a smart hotel away from her home location. A smart hotel may be assumed to have a M2M/IoT environment. She may reside or stay at the new location temporarily for a time. The new environment may be referred to as a "foreign" environment. The smart equipment and devices in the foreign environment may be referred to as "foreign devices" and the gateway or server as a "foreign" gateway or server. It is "foreign" in that a user may be completely new to the M2M/IoT environment. Based on the length of her stay, the user may want to utilize the M2M/IoT devices, applications, or service layers in the environment, at least for a limited period of time. However, the user may want the foreign location to have the same or similar features as her smart home location. She may, therefore, want to have information from her smart home gateway or server or a service provider's cloud server to be imported to the smart hotel's gateway or server, so that it can be integrated into the foreign M2M/IoT environment.

In a smart home M2M/IoT environment, it is assumed that there exists organized and logical information that conveys a user's settings and preferences known as a 'user profile' that captures a user's identity and home address, device names that user has some level of authority over (for example, owner may have all the access rights or authority), data and applications associated with those devices, etc. In addition, the user profile may capture or generate profile-centric information such as preferred TV channels, utilities utilization data, associated secondary users and their ACPs, profile centric ACPs, utilities utilization table or charts, most frequently used voice commands, etc. Data or information from her user profile may be transported to a foreign location, so that all or selected desirable features from her smart-home location may be used at the (foreign) smart hotel location. If and when the user wants to transport her profile data to a new server, it may be necessary that the data transport be done securely. These conditions and scenarios may demand a service layer to facilitate: trust establishment between a foreign gateway or server and user's home gateway or server; securing user data and protecting user privacy in the foreign server; facilitating correct data integration between the matching devices, applications or service layers; providing appropriate access control policies; and securing data by destruction or erasure to protect the user data and the user.

Challenges Presented by the Example Use Case

The example use case presents a number of challenges. The first challenge is that when a user imports her user profile/data from her home M2M/IoT environment into a foreign M2M/IoT environment, there may exist threats from adversaries of misusing her personally identifiable information. These threats can exist during the data transfer process, when the user utilizes the foreign M2M/IoT environment, and also after the user has left the foreign M2M/IoT environment.

Figure 17:
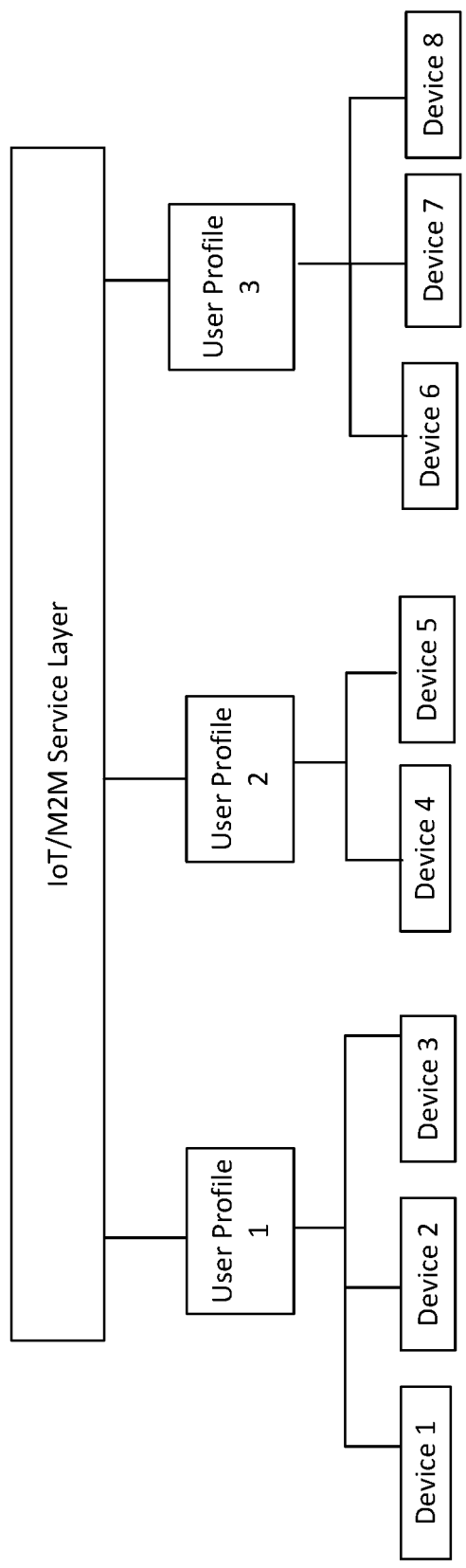
FIG. 17 illustrates an example of multiple user profiles in a service layer.

The second challenge is that when multiple user profiles with linked devices, applications or service layer profiles are hosted in a common server, there may be chances of interferences, misconfiguration, and mistakes/errors during data processing. The system and the data in the server may be vulnerable to parties who may escalate their privileges that could allow them to access other party's (unauthorized) information. FIG. 17 depicts an example scenario where there are multiple user profiles belonging to different users that are registered in an M2M/IoT service layer.

In the example of FIG. 17, each user profile has its own set of devices (and applications within) linked to the profile, illustrated as Device 1, Device 2 etc. However, all user profiles are registered under the same service layer. An M2M/IoT service layer may be provisioned with a pre-shared key or with a pair of asymmetric keys. With respect to FIG. 17, an adversarial user who has access to User Profile 1 may escalate her permission to be able to access User Profiles 3, for instance.

A third challenge is that a service layer is assumed to have provisioned or bootstrapped with a key pair or a pre-shared key for secure communication. Any communication with the service layer may be encrypted with a provisioned key of the service layer. A methodology introduced in this disclosure is to separate each user profile in the foreign server or gateway's service layer with a temporary user account (TUA), where each TUA contains one user profile. In the process of importing user profile data and integrating it into the user profile in a TUA, if the same service layer key is used to communicate with different user accounts, however, communication about one TUA may not be confidential with respect to any other temporary user accounts (TUAs).

A fourth challenge is that after the user profile data that have been imported into the foreign gateway or server have been utilized and the user departs from the foreign M2M/IoT environment, the user's user profile and usage history data may be vulnerable to data extraction and correlation from the adversaries with ill-intention against the user.

A fifth challenges is that, in order to send the user profile data without PII in it, a special set of ACPs must be configured. Additionally, the user in the foreign gateway or server may select devices of a common class or category to import data from her home gateway or server. For example, a user from a hotel suite may want to import data that is linked with home automation and convenience services that would include devices such as thermostat, smart TV channels, smart voice assistant data, etc. Flexible access control policies that can cover devices ranging from a single device or single data from a device to a bank of data, based on several factors such as device functionality or, usage category may be necessary. Current Service Layer architectures provide mechanisms to configure user requests and access control policies based on attributes or parameters such as a requester's and target's ID, IP address and contexts such as location, time, intended operations and resource type, but doesn't allow parameters or attributes such as 'device category' in a user's request and access control policies that could simplify security administration while providing more robust access control.

Figure 18:
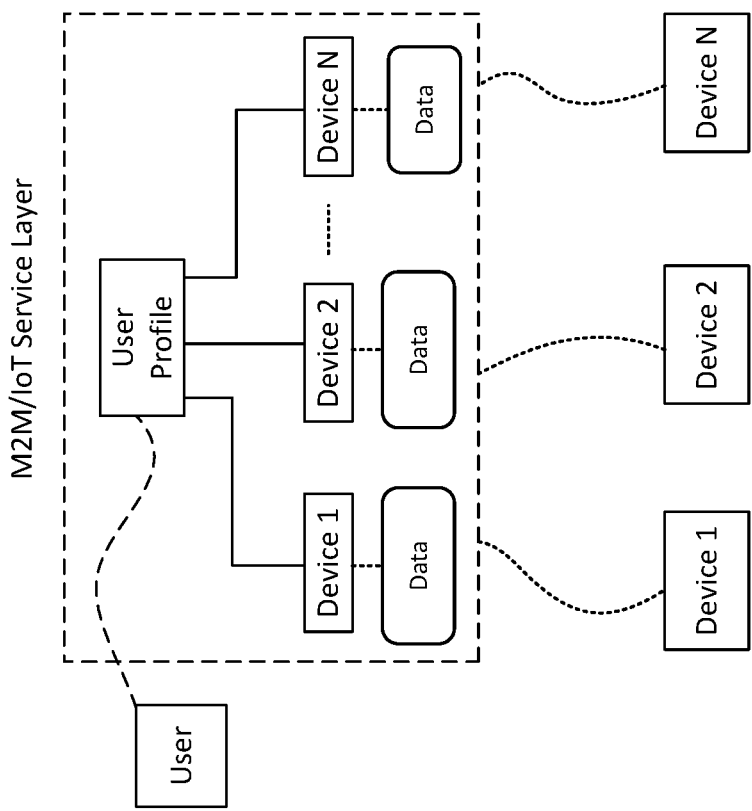
FIG. 18 illustrates an example user profile in an M2M/IoT service layer.

FIG. 18 shows a conceptual diagram for a User Profile in an M2M/IoT service layer system. FIG. 18 also shows corresponding data and settings of M2M/IoT devices, applications, or service layers in the M2M/IoT service layer that are deployed in the M2M/IoT field environment. The dotted box represents a service layer. Device 1 through Device N depicted inside the dotted box are data and settings of the deployed M2M/IoT devices, applications, or service layers in the M2M/IoT service layer. Data and settings of devices, applications, or service layers in the user profile may also be referred to as resources. FIG. 18 shows M2M/IoT devices (Device 1, Device 2 . . . Device N) associated with a User Profile in a M2M/IoT service layer. The bottom part of the figure represents actual physical field devices, applications or service layers (Device 1 through Device N) connected with the M2M/IoT service layer. Device 1 through Device N in the service layer (dotted box) are the logical representation of those physical field devices. Each M2M/IoT physical field device, application, or service layer sense, collect or process data, and deliver it towards their corresponding logical resource representation in the M2M/IoT service layer, each of which shows their corresponding associated data.

This disclosure particularly considers a scenario where a user may be mobile. As referenced in FIG. 18, the dotted line that connects 'user' box to the user profile box indicates that the user profile has the user information and user owns the user profile. A user profile in an M2M/IoT service layer may be associated with each of the M2M/IoT device, application, or service layer with a link key. A link key is a key that may be associated with a device or a user. When devices register with the service layer, they may provide a link key that is associated with a user to prove that they are permitted to be linked with the user. The service layer may check that the provided link key matches the link key that is stored in the user's profile. Similarly, when users register with the service layer, they may provide a link key that is associated with a device to prove that they are permitted to be linked with the device. The service layer may check that the provided link key matches the link key that is stored in the device's profile. Temporary User Account, Generic User Profile, and Data Encryption Consider a scenario where there are multiple user profiles being hosted in a foreign M2M/IoT service layer. Each user profile belongs to one user. Each user profile has associated M2M/IoT devices, applications, or service layers that the user of that user profile has access to. A Temporary User Account (TUA) and a Temporary Access Code (TAC) may be used to secure each user profile.

In this example, the users act as guests in the hosting service layer. As guests, the users who use the service layer may not have all CRUD access in the service layer. Therefore, an administrating authority, preferably a service layer security administrator, is assumed to exist. An SL Security Administrator (SLSA) may be responsible for generating TACs or may administer the TAC generation process. Each is unique.

Each TAC is linked to one TUA in the SL, and there may be one user profile associated with each TUA. The TACs are created in such a way that the user who may be given a TAC may only have access within the TUA. This implies that a user should have a temporary access to her TUA and hence, temporary access to the user profile in the TUA. The SLSA may arrange access control policies regarding the TUA that check privileges based on the TAC to allow or deny a user from accessing a TUA.

Figure 20:
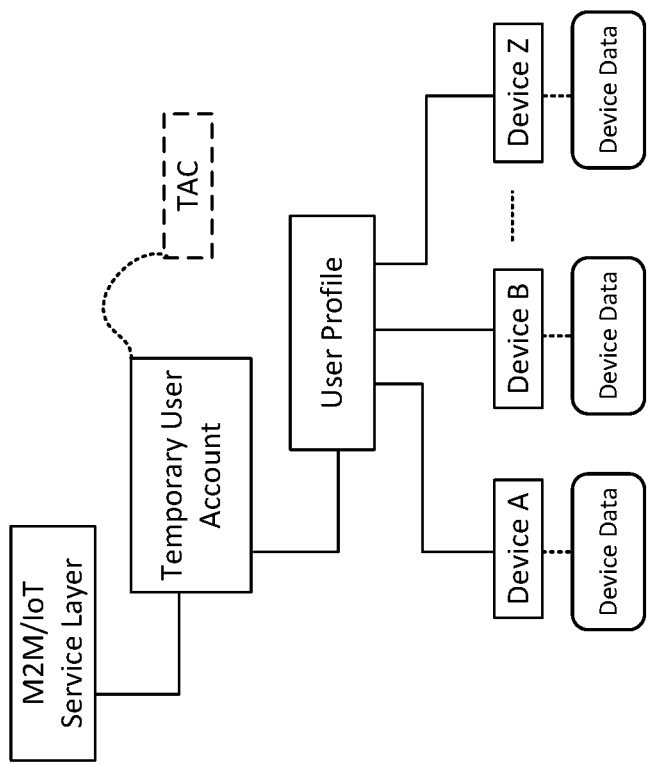
FIG. 20 illustrates an example structure of a service layer (SL), temporary user account (TUA), temporary access code (TAC), and user profile.

An SLSA may create a generic user profile (GUP) in the foreign M2M/IoT service layer. A GUP is a user profile comprising generic information. For instance, a GUP may have the user id information set as name of the unit dedicated to it (e.g., Room 205), and only the SLSA may have access to it before it is registered with a user. An example high-level view of a user profile is depicted in FIG. 20, where the user profile is created under the TUA in a service Layer. Each unit (e.g., hotel suite) may have M2M/IoT devices deployed in it. Each of those devices are logically represented in the service layer as being associated with GUP with default settings or empty values. For example, default setting for a thermostat may be an average temperature value. This allows any registering user to use the GUP associated with the TUA. The process in which user uses the TAC for the first time and creates a new password may be considered as user's registration with the TUA. Once the user is registered and has logged into her TUA, she may start using the devices, applications, and service layers as they are set up.

Figure 19:
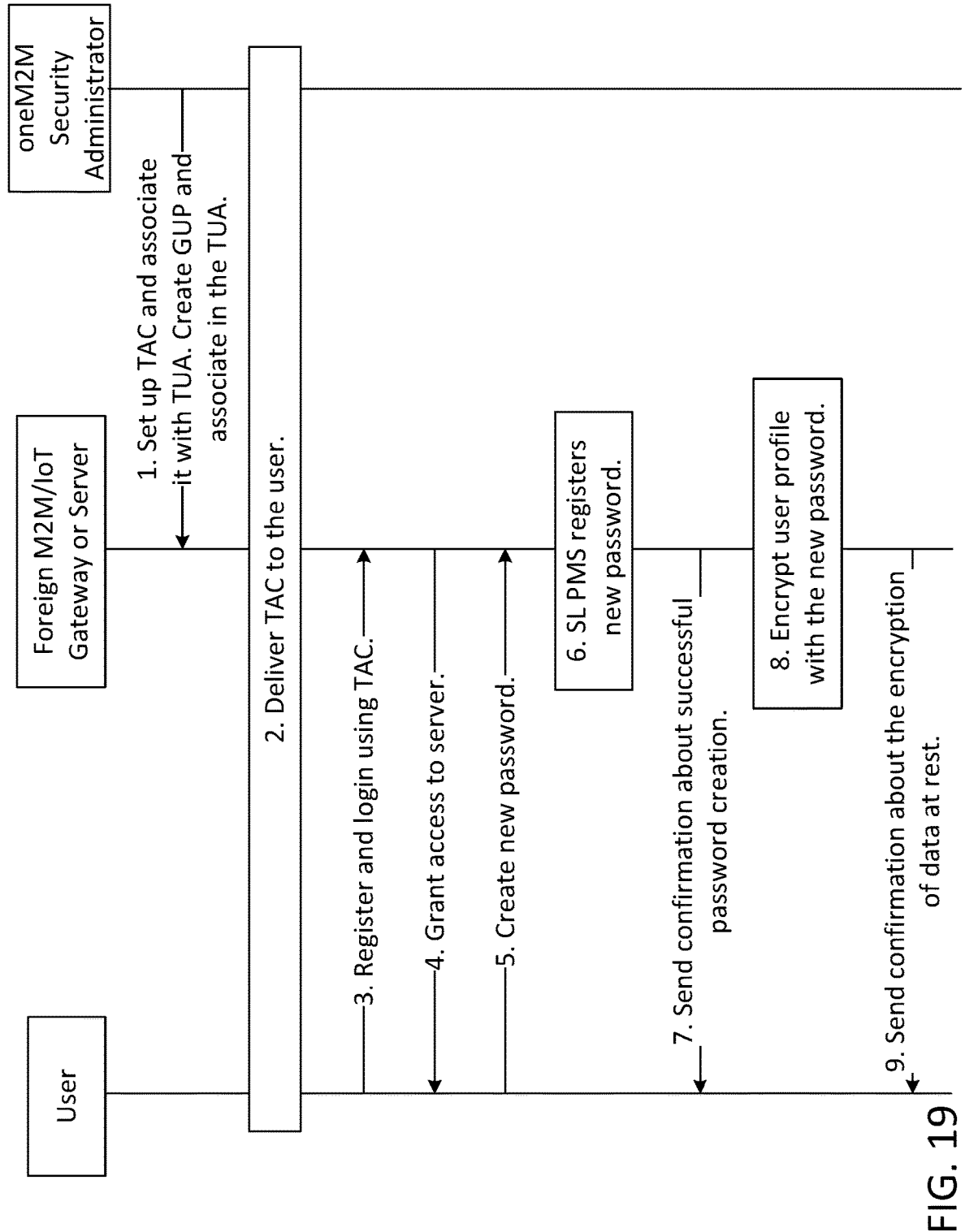
FIG. 19 is a flow diagram of an example process using a generic user profile in a temporary user account with password-based encryption.

FIG. 19 shows an example process by which a user gets access to the foreign M2M/IoT Server using a TAC. The user may set up a new password when she first registers and logs in. The same user created password may be used to encrypt the generic profile given to the user. This ensures that the data pertaining to the GUP remains secure at rest.

In Step 1 of FIG. 19, the Service Layer Security Administrator (SLSA) may create a Temporary User Account (TUA) and associate a TAC. The ACPs regarding the TUA may be designed to check for privileges based on the TAC. Only users with correct TAC may be allowed to register with the TUA and later allowed access to the TUA. This registration process may be constrained more by limiting the period for registration. The SLSA may also create a generic user profile (GUP) used to configure and control devices, applications or service layers that are at the foreign M2M/IoT environment, and may associate it with the TUA.

Alternatively, once the user profile data has been imported and integrated into the GUP, the foreign gateway or server may establish ACPs based on the TAC, around the mapped devices in the GUP. Importing, mapping, and integrating user profile data in TUA with GUP are described further, e.g., in relation to FIGS. 26, 23A, and 23B.

A TAC may be used as a username for a user at the foreign M2M/IoT gateway or server. A GUP may be designed such that, even if the user does not import any personal data from her home server or anywhere else, she must be able to use the existing GUP during her stay to control devices at the foreign location. The TUA may be dedicated to an office unit, townhouse, condominium, etc. A GUP, for example, named "JKL5003" and devices in the M2M/IoT system such as a thermostat, a smart TV, a smart refrigerator, a smart bed, voice assistants, etc., may be associated with a unit JKL5003 where the user temporarily resides.

FIG. 20 shows the structure of an example TUA, which is associated with a TAC and an underlying user profile with associated devices and their device data. In the example of FIG. 20, the TUA is created under the service layer, and that the generic user profile (GUP) is created under the TUA. FIG. 20 also depicts a TAC associated with the TUA. When a user either registers or logs in to the TUA, the ACP pertaining to the TUA may check for the correct TAC associated with the TUA.

In Step 2 of FIG. 1, the TAC may be delivered to the user via a secure text message or via other forms of communication by the M2M/IoT server or gateway system. This temporary property of the TAC may be based on the associated user's length of stay at the foreign location. This may mean that the TAC may expire on the date and time of user's departure (end of stay) from the foreign location.

Alternatively, the user may be provided a TAC via an authorized person at the time of checking in at the foreign location.

In Step 3, after a user has acquired a TAC, she registers herself to the foreign M2M/IoT server using the TAC. The TAC is used to confirm that only authorized users are given access to foreign M2M/IoT gateway or server. ACPs that check the usage of correct TAC including the time constraint for registration may be executed.

The foreign gateway or server may offer a GUI for the user to facilitate access. Alternatively, a user may use a separate device with a GUI to get access to the foreign gateway or server.

In Step 4, the M2M/IoT server identifies the TAC and allows the user to create a new password for her TUA. The identification or assertion process for the TAC in the hosting server may involve the service layer contacting an external database where user identity along with factors such as time, location, unit etc. may be authenticated.

In Step 5, the user is obligated to create a new password for the TAC.

Alternatively, a new username may be created to replace the TAC.

In Step 6, the M2M/IoT server allows the user to create new password, which is registered into the server.

Password creation, storage, etc., may be handled by a sub-function called a Password Manager Service (PMS). For example, the PMS may use a hash function with salt to create a password and securely store the password in the service layer. The hash function may be, a "one-way" function, such that a hashed password is very difficult to reverse to original plaintext.

In Step 7, the M2M/IoT server or gateway sends a confirmation message to the user for successful password creation and logs the user into the TUA. The M2M/IoT server or gateway presents the user with the existing GUP.

The creation of new password by the user for the given TUA marks the acquisition of the TUA and the GUP. The GUP becomes the user's (temporary or short-term) user profile.

In Step 8, in addition to saving the password, the PMS may channel the user entered plaintext password into the AES symmetric key generator in the PMS. The key generator may generate a key of a specified sized (e.g., bit length), and may store the key securely in the SL. The M2M/IoT Service Layer may use that key to encrypt the GUP data at rest.

Furthermore, the hash of the password instead of plaintext password may be stored in the SL as a password file. Hence, although possible, the hash of the password should not be used to encrypt the user profile data.

Alternatively, the SL PMS may provide the user with an opportunity to provide a new secret once the user has registered and logged into the TUA. This secret may be used to generate a key and then that key may be used to encrypt the user profile data at rest. The key may be stored securely in the SL.

In Step 9, the M2M/IoT gateway or server sends a confirmation message to notify the user about the data encryption at rest. The same password generated key may be used to encrypt/decrypt user profile data at rest, even if the user profile data has been updated.

Key Provisioning

With multiple user accounts in a service layer, and each of which is dedicated and authorized to separate users, there must be a separate channel of communication among the user accounts. In this technique, where the user, who is aware of two communicating servers, can facilitate remote provisioning of the secret key. Key provisioning may be used to achieve trust between two communicating parties, whereby the use of a Certification Authority (CA) is not required. For example, the use of a third party CA that offers asymmetric key cryptography may be too costly, e.g., in scenarios where power consumption is critical. Use of symmetric key cryptography also eliminate the requirement of CA where applicable. In addition, not all systems and architectures are suitable for asymmetric key crypto. For this reason, this disclosure introduces user assisted temporary shared secret key provisioning between each TUA in the service layer and the counterpart gateway or server.

User Assisted Shared Secret Key Provisioning

User assisted shared secret key provisioning involves a user who wants to import her data from her home gateway or server into the foreign gateway or server. The user may be able to provision a shared secret key between her TUA in the foreign M2M/IoT gateway or server and the home M2M/IoT gateway or server. This pre-shared key may be able to establish a secure channel for communication between the two communicating gateways or servers. The two parties need to authenticate, establish trust, and exchange messages that are confidential between the TUA at foreign gateway or server and the home M2M/IoT gateway/server.

Note that any key exchange between two entities in this disclosure assumes usage of a cryptographic protocol that is agreed to between the two communicating parties.

Figure 21A:
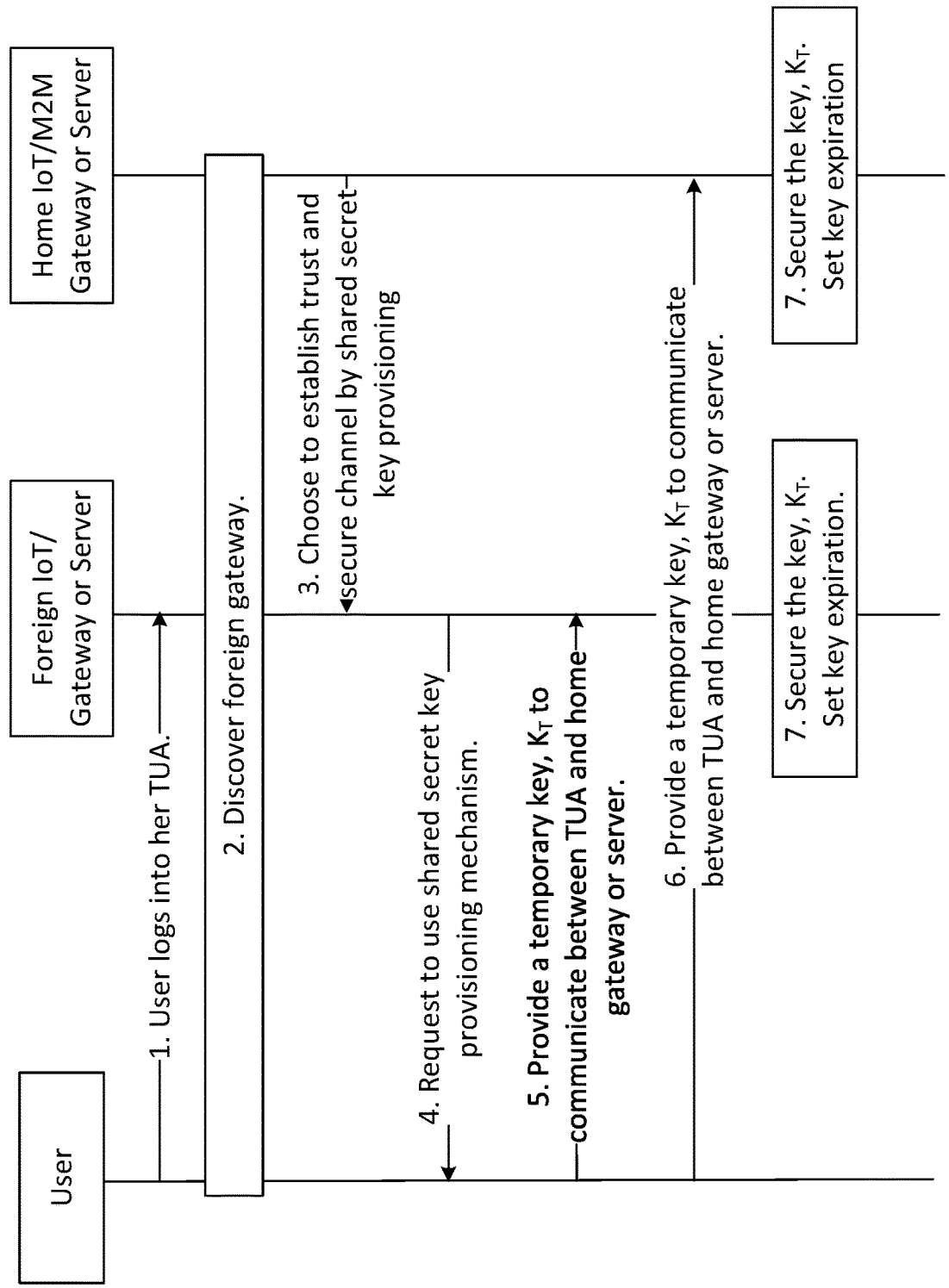
FIGS. 21A and 21B show a flow diagram of an example process for user assisted shared secret key provisioning.
Figure 21B:
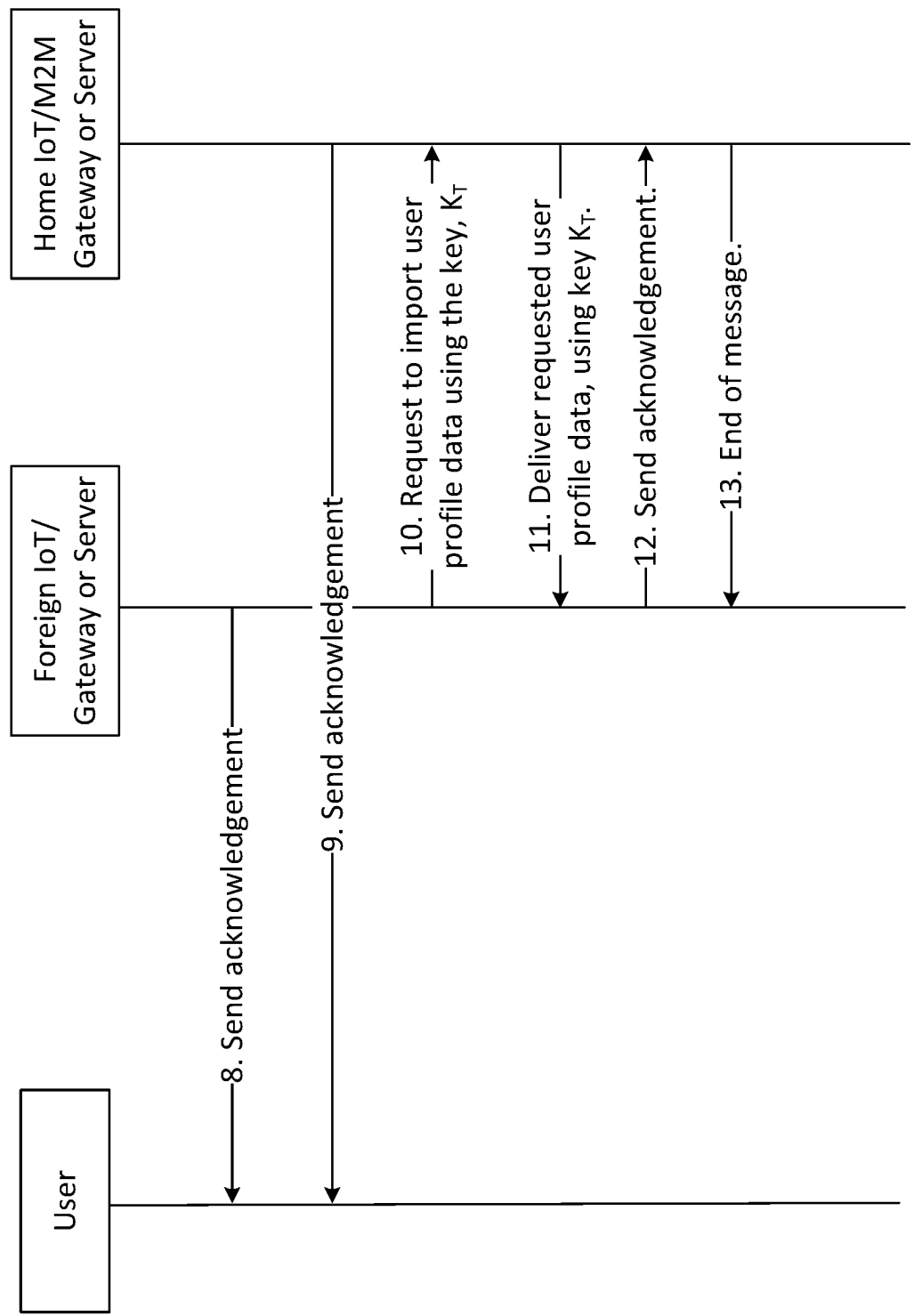

FIGS. 21A and 21B depict a call flow for a mechanism by which a user provisions a temporary shared secret key, which involves the use of symmetric key cryptographic protocols.

In Step 1 of FIG. 21A, the user logs in into the foreign gateway or server using a TAC and a pre-configured password. Only a registered user with the correct TAC and password may be given access to the TUA. The ACPs around TUA may be designed to check for privileges based on the TAC. The user may acquire foreign gateway or server information for device discovery, such as a Uniform Resource Identifier (URI) or a device tag.

In Step 2, the user may contact her home gateway or server via a built-in GUI, or via a separate IoT device (for example, an app in a mobile device), to provide a URI or an attribute, such as a device tag about the foreign gateway or server to the home gateway or server for server discovery. With the information provided, the home gateway or server may discover the foreign gateway or server. The user may receive a notification about the discovery.

In Step 3, following the successful foreign gateway or server discovery, the home gateway or server may choose to establish trust with the TUA in the foreign gateway or server by using shared secret key provisioning. The messages may include a 'string' or some agreed upon code that signifies share secret key provisioning based defined authentication protocol.

In Step 4, the foreign gateway or server receives and identifies the message from the home gateway or server. The foreign gateway or server may prompt the user to manually provision shared key between the two parties.

In Step 5, the user chooses to provision a user chosen shared secret key. The user introduces a shared secret for the TUA in the foreign gateway or server. A key generator in the M2M/IoT service layer receives the input and generates a key. This key may be used only for TUA at the foreign gateway or server, for example.

In Step 6, the user may provide (manually or via a 'share' instruction) the key derived from the shared secret to the home gateway or server.

Alternatively, the user may provide shared secret to foreign gateway or server and home gateway or server, independently. An agreed upon key generator may be used by each shared secret receiver party to generate a key, $K_T$.

In Step 7, both servers may securely store their shared secret keys, temporarily. As they store their keys, each server may set an expiration time of their key independently. Alternatively, they may agree on a common expiration time, e.g., a time after Step 10, when two entities successfully exchanged messages using key, $K_T$. Completion of key storage may trigger the start of a timer for a key's expiration. Additionally or alternatively, the home gateway or server may determine the expiration for the keys, since it is the entity that "owns" the data. However, having an independent expiration time for the key at the foreign gateway or server can avoid having temporary key misused or abused.

The call flow of FIG. 21A continues in FIG. 21B. In Step 8 of FIG. 21B, the foreign gateway or server sends, to the user, a confirmation of receiving the key.

In Step 9, the home gateway or server sends a confirmation of receiving the key to the user.

For rest of the messages exchanged in the call flow of FIG. 21B, the temporary key derived from the shared secret may be used.

Alternatively, home gateway or server may request an agreement on a new session key that may be exchanged using the pre-shared key, $K_T$.

In Step 10, the user may initiate user profile data import request using the key, $K_T$. This may involve establishing trust between the two parties before exchanging any information.

In Step 11, based on the request from the foreign gateway or server, the home gateway delivers the requested user profile data. The user may be able to select devices, applications, or service layer specific data that she wants to import. The foreign gateway or server may be equipped with friendly user interface to make the selection, e.g., as described in relation to FIGS. 43-45.

The home gateway or server may be equipped with special access control policies that bar access of PII from the user profile data. In addition, home gateway or server may use parameterized access control policies (also referred to as attribute-based access control policies) that may incorporate parameters or attributes of the device, applications or service layers to make access decisions. For example, parameter/attribute "category"="health" may allow or deny all the devices that have category of "health". This category may include devices such as smart weighing machines, body sensors, smart insulin pumps, etc. Furthermore, an attribute/parameter combined with other parameters, such as "time", "date", "device_function_type", and "data_range", to make the access control more robust with least privileges enforced while making it convenient for SLSA to design flexible ACPs.

Extended-Parameter Access Control Policies are defined hereinafter to provide for more flexible ACPs.

In Step 12, as the foreign gateway or server receives the user profile data, it sends back acknowledgement for the message received.

In Step 13, as the home gateway or server completes sending the data, it sends an end of message to indicate the end of business. This may also mean the close of the port and invalidation of temporary key.

Access Control Policies

When a user wants to import device data from the home gateway or server, she may import the device data based on the device, applications or service layers in the GUP. She may select the devices from a list of devices in the GUP via a GUI in the foreign gateway, or via an IoT app in a separate handheld device. When a user of a foreign gateway or server has made the selection regarding which user profile data to import from the user's home gateway or server, the foreign gateway or server sends a request for the selected user profile data to the home gateway or server. The home gateway or server may pick and choose the data that is requested. However, the user may also want to protect or limit the data elements that have a user's personally identifiable information (PII), for example, address, name, unique government IDs, etc., that are provided to the foreign gateway or server. To accomplish this, a set of special access control policies that bar PII from being exported when user profile data is requested may be necessary. We call these access control policies, personally identifiable information centric access control policies, or PII-centric ACPs (PCAs). Table 18 shows some examples of PII that are protected by PCAs.

TABLE 18

Personally Identifiable Information

| Attributes | Description | Examples |
| --- | --- | --- |
| Address | Residence or street address of a user. | 10882 E Hector, Conshohocken, PA 19125 |
| Name | A social identifier. | Sam Harris, NFN Rinchen etc. |
| Unique personal ID | A government ID, voter's ID, citizenship no. etc. | 1AS544512, A etc. |
| Affiliation | Any association, social groups etc. that the user may be affiliated with. | DNC, IEEE etc. |
| Location coordinates | Specific GPS longitude and latitude coordinates. | 40.079277, −75.301575 |
| Gender | User's gender | Male, female, etc. |

Another set of access control policies that a home gateway or server may use to flexibly handle request and response are Extended-Parameter Access Control Policies (EPACP). One form of Attribute-based access control (ABAC) have been used in current M2M/IoT systems (for example, oneM2M). Attributes in ABAC are known as parameters in oneM2M. oneM2M uses parameters in request messages and privileges. However, they are limited on how much they can specify because of its ability to specify limited parameters. Therefore, to generate a flexible yet robust ACPs, this disclosure introduces EPACP. EPACP may allow users to define additional parameters or attributes such as device type, device functions, and data_range, and use those parameters in the ACPs. Instead of defining ACPs for each object, adding defined number of parameters into the security system and incorporating them in the ACPs can provide SLSA with flexibility to specify new set of policies. Additionally, PII centric ACPs may also be represented by using EPACPs. Table 19 describes the parameters for EPACPs.

TABLE 19

Extended Parameters or Attributes for ACPs

| Attributes | Description | Examples |
|---|---|---|
| Device, application, or service layer's service category. | An attribute that organizes device, application, or service layer with same category of service. | Home security service, Smart environment service, Health data system etc. For example, Health monitoring system may include Fitness Data for tracked activities such as run, bike, weights, strides calories etc., and Female Health Data such as cycles, pregnancy, symptoms, activity, sleep etc. |
| Function Type | Attribute that can organize devices, applications, or service layers based on their function type. | Record and play, input-process-output, sensing agent etc. |
| Authority Levels | The level of authority over various devices in the environment. | CRUD, clearance levels etc. For example, User 1 may have 'Secret' and User 2 may have 'Classified' clearance levels. Each clearance level may have different allowed CRUD operations. |
| Data Range | The range of data to be accessed at a time. | Range of data collected by a thermostat between 23 Jun.-30 Jun. |

Importing and Integration of User Profile Data

User profile data may be imported and integrated with the existing devices, application, and service layers in the foreign M2M/IoT service layer. This may be achieved by a number of techniques.

Figure 22:
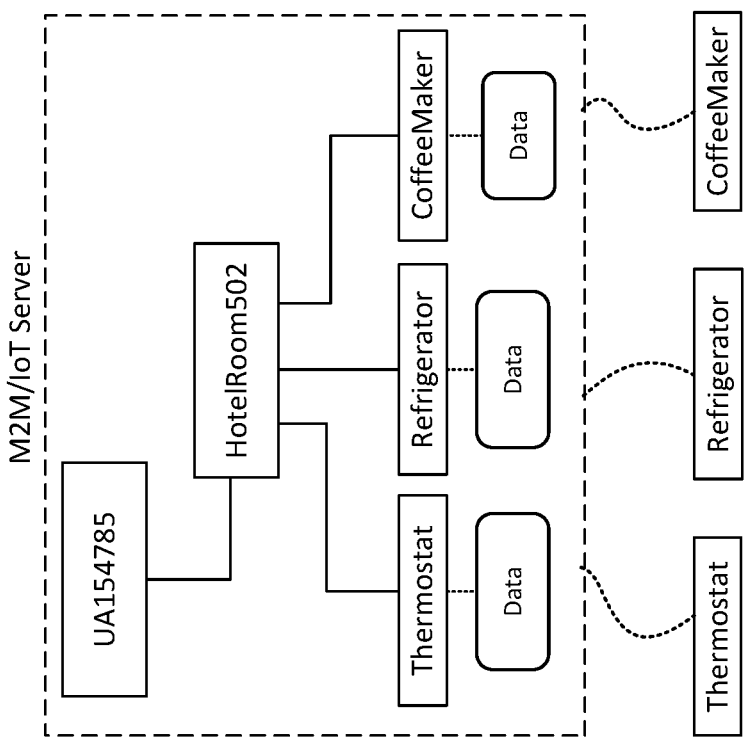
FIG. 22 illustrates an example user account linked with a generic user profile in a hotel room.

FIG. 22 depicts a TUA (Account ID: UA154785) linked with a sample GUP for a smart hotel room or unit (Hotel-Room502). The GUP here infers that it represents hotel Suite No 502. It is further linked with three different M2M/IoT devices, namely, Thermostat, Refrigerator, and Coffee-Maker. The GUP may contain other information like profile ID, user ID, time of profile creation, access control policies, unit type, address, time of update etc., and the linked devices, application, or service layers.

There are two alternative techniques by which user profile data that exists at the home M2M/IoT gateway or server may be imported into the service layer at the foreign M2M/IoT gateway or server. In the first technique, a user may use the existing GUP. A user can custom select and request the data pertaining to device, application, or service layer in her user profile and integrate the imported data into the GUP in the foreign gateway or server. In the second technique, user may create or configure the User Profile Aliasing Function (UPAF) in the home gateway or server to create an aliased version of user profile or aliased user profile (AUP). User can import the AUP into the foreign server or gateway where corresponding device, application, and service layer are mapped and the data are integrated into the matching devices, application, or service layers.

Figure 23A:
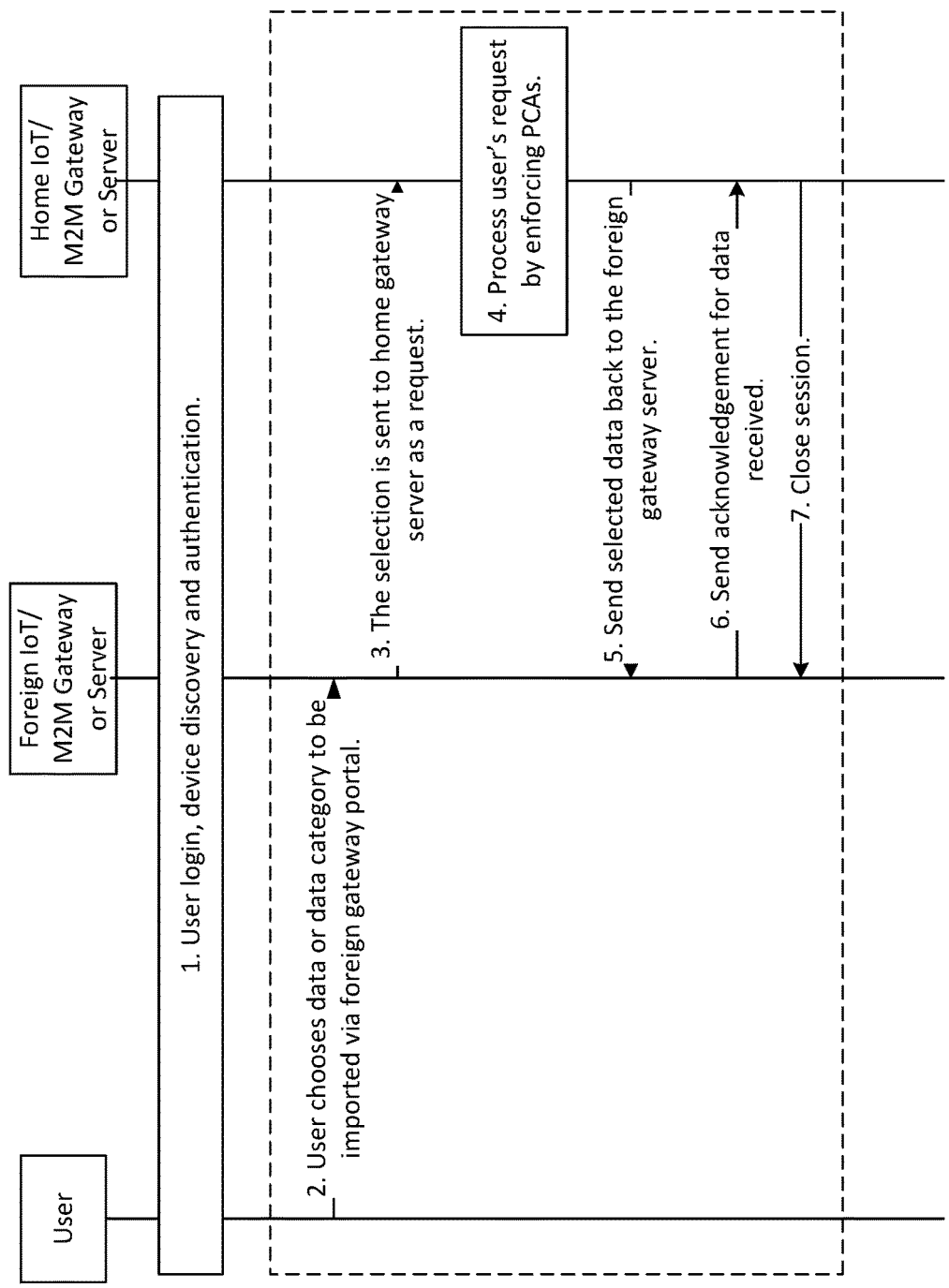
FIGS. 23A and 23B show a flow diagram of an example process for importing and integrating user data into a generic user profile (GUP) in a foreign gateway or server.
Figure 23B:
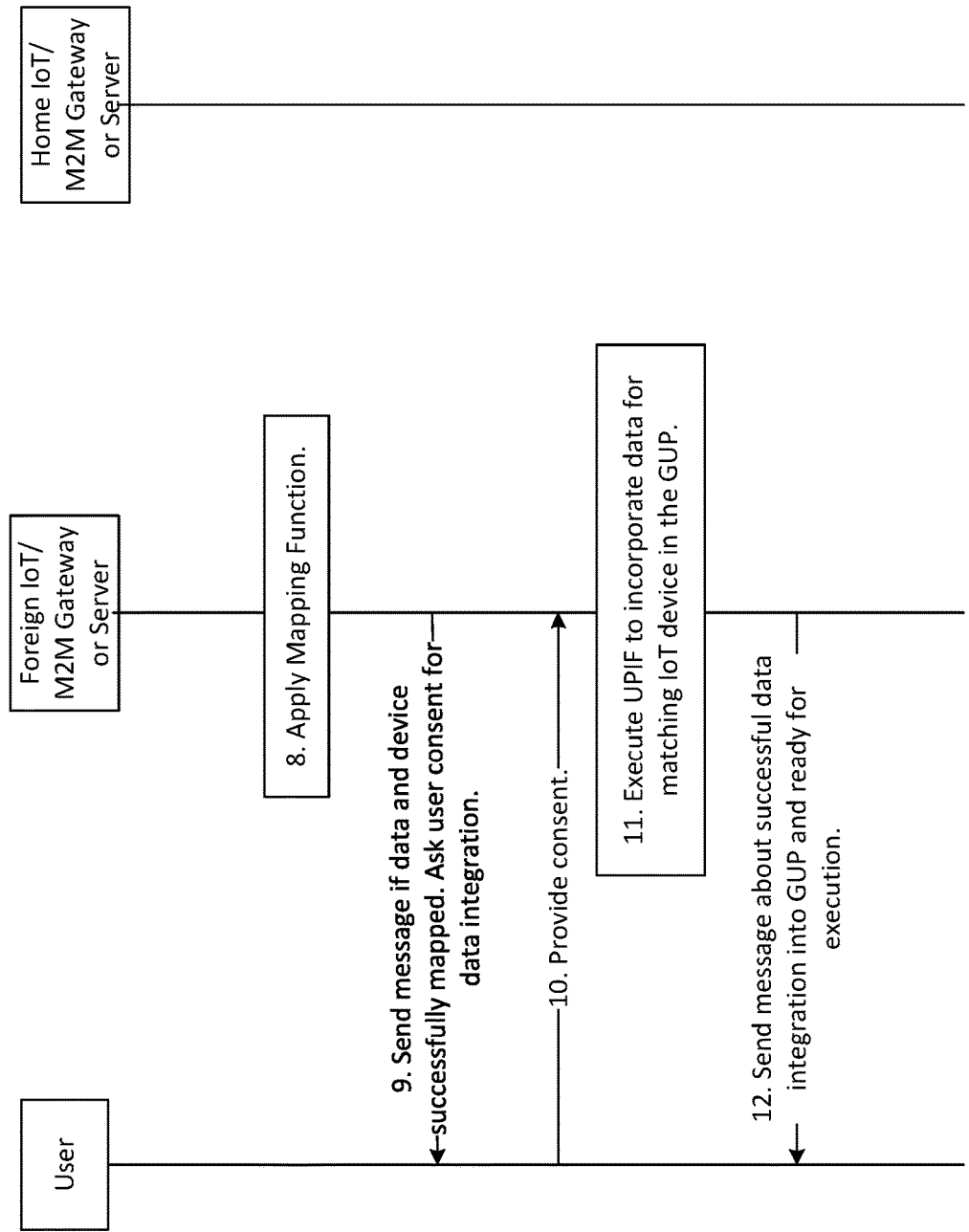

Importing User Profile Data and Integrating the Data into a Generic User Profile A user's profile data, or data selected the user's profile, may be imported and integrated into a generic user profile. The process by which a user's selected data is imported from the user's home gateway or server to the foreign gateway or server and finally integrated into the existing GUP is shown in FIGS. 23A and 23B. The overall process primarily involves three different phases. The first phase is the home gateway device discovery process. The second phase includes user authentication and data import. Please notice that this phase is marked with a dotted box. It is because this involves a separate session creation from foreign M2M/IoT server to home M2M/IoT server, and finally the ending of that session. The third phase involves integration of imported data with user consent into the foreign gateway or server.

In Step 1 of FIG. 23A, as discussed in relation to FIGS. 21A and 21B, a user logs in into the system, initiates device discovery and gets authenticated with the home gateway or server.

In Step 2, the user may now make customized data requests to home gateway or server. The user may be provided with a list of devices, applications or service layers or, a property such as category, device type etc. of devices, applications or service layers to choose from. These are the devices, applications, and service layers that are linked with the GUP. The user may select them individually or as a category as desired. For example, in a smart hotel scenario, the user may just import thermostat usage data or choose to import data category of "Home Convenience" which may include all the devices and data involving a smart home system such as a smart thermostat, smart refrigerator, smart TV, smart voice assistant and so on. Example user interfaces are described herein, e.g., in relation to FIGS. 43-45.

When user makes selection of a category and sends a request to the home gateway or server, ACPs in the home gateway or server may use parameters to enforce policies for convenience and to apply the principle of least privilege. Table 19 presents extended parameterized (attribute-based) access control policies, which allows a user to request and access a category of devices, applications or service layers and their data.

In Step 3, the foreign M2M/IoT server sends user' selection to home M2M/IoT server.

In Step 4, upon receipt of the request from the foreign gateway or server, home gateway or server may enforce ACPs before transporting user profile data. This may involve ACPs that incorporate access type (for example, read only), identity, and type of requesting entity, delivery destination of data being requested etc. In addition, the SL may enforce PCAs, which limits access to user's PII.

In Step 5, the home gateway or server sends the selected user profile data to the user at foreign gateway or server.

In Step 6, the foreign gateway or server receives the data and sends an acknowledgement for the data received.

In Step 7, upon receiving the acknowledgement from foreign gateway or server, home gateway or server sends a message back to the foreign gateway or server informing the end of the session.

The call flow of FIG. 23A is continued in FIG. 23B. In Step 8 of FIG. 23B, the foreign gateway or server may use a Mapping Function to identify the matching imported data with available M2M/IoT devices data in the foreign gateway or server. For example, if there exists a Nest thermostat at user's home gateway or server, and say, a week's temperature information along with date and time has been imported into the foreign gateway or server. But there exists a Samsung thermostat at the foreign location (for example, smart hotel). Provided that the two manufacturers have agreement on data integration which may also mean agreement on data formats, Nest's thermostat data may be prepared for integration with Samsung's data in the GUP of the TUA at the foreign gateway or server. The foreign gateway or server is then able to configure the M2M/IoT devices, applications, or SLs with the prepared data.

In Step 9, the foreign gateway or server sends a notification about suitable or mapped devices, application, or service layer's data as well as the device, application, or service layer data that server was incapable of mapping. The mapping may depend on various metrics but not limited to name, data formats, type of devices, device functionality or, agreement between manufacturers of different devices with similar functionality etc.

Additionally, in the notification, foreign gateway or server may ask for user's consent for integration of mapped data into the foreign M2M/IoT service layer system.

In Step 10, the user provides consent to integrate imported data into foreignM2M/IoT server.

In Step 11, upon receiving a consent from user, User Profile Integration Function (UPIF) integrates imported and mapped user data into GUP in the AUP at the foreign gateway or server. The integration process may include SL confirming locally mapped devices, applications, or service layers and populating their corresponding data, in the GUP.

An alternative technique by which ACPs are established around the devices, applications, or service layers is carried out at this point. Foreign gateway or server configures access control policies around the mapped, imported and integrated devices, applications or service layers in the GUP with TAC, so that user with TAC may have limited or temporary access.

In Step 12, the foreign gateway or server sends a message to the user about successful integration of imported data into the TUA and the GUP in the foreign M2M/IoT service layer system, and indicates that these data may now be executed.

Importing and Integrating Aliased User Profile

A may user send a request to the home gateway or server for user profile data that is suitable in the foreign M2M/IoT environment, home gateway or server delivers an AUP, which is then imported and integrated into the foreign gateway or server in the user's TUA.

This section presents another technique by which user's preferred user privacy protected data from user's home gateway or server may be transported into foreign M2M/IoT server. Unlike previous technique, where only the selected device, application, or service layer data were imported and integrated in the GUP, this technique involves importing the (aliased) user profile as a single unit with the selected data on it. Transporting a user profile as a unit as opposed to user profile data on individual devices, as described in the previous section, comes with critical advantages. This process may keep a user from having to build a new profile by integrating imported data around the GUP. More importantly, it offers user with control, and a capability to manage overall profile. For instance, a user may have: frequently used voice commands; associated users (tier II and tier III secondary users); saved video or audio states; favorite video game apps; scheduled software updates; utility monitoring; auto-reminders; most recent commands, utilities utilization tables and graphs, favorite podcasts etc. Additionally, each associated secondary user (tier II or III users) may have their own ACPs that may apply to the IoT devices and application on entire user profile. Some attributes that signifies profile level information are listed in Table 20.

TABLE 20

User Profile

| Field | Description | Examples |
|---|---|---|
| Name | Name of the user who would like to receive access to IoT devices leased by Application Service Provider (for example, Electric Company) | John Spade, Mary Dante |
| Subscriber-ID | A unique alphanumeric identification for the subscriber | xyz1432klm |
| Street Address | Street address where the subscriber resides | 1234 E. Hector Ave, Philadelphia, PA 19145 |
| Unit Type | Business or household. It can be further categorized as small business, medium large business. Similarly, small, large, or medium household based on the number of IoT devices deployed. | Medium household (less than 20 IoT devices) |
| Access Control Policies | Primary user's access control policies about user profile. | for example, {<br>if requester==tier_I:<br>access=all_access;<br>} |
| Associated Secondary Users | Users that reside in the same unit/address who have access rights other than the registered subscriber, authorized by the (primary) user | 1. Kathy Spade<br>2. Sam Smith<br>3. Dan Holly |
| Secondary User ACPs | ACPs for all the secondary users about user profile. | e.g.{<br>if (requester==tier_II or tier III):<br>else if (resource==device_21):<br>access=readOnly;<br>} |

TABLE 20-continued

User Profile

| Field | Description | Examples |
|---|---|---|
| Secondary user preferences | Preferences set by secondary users. | Notification on the release of a movie, favorite stations etc. |
| Linked Applications, Devices, and service layers | Name or Identification of devices, applications, or service layers that are linked to the Subscriber-ID. The user profile may also specify how each of his linked data sources should be protected. | Smartmeter501, MedicalDevice112, Nest321, GarageLock232, A234-43543H-5623434 |
| Device/Application/ Service Layer Linked Policies | The privacy policies that the user would like to apply when exposing information to each of its linked devices, applications, or service layers. | for example, { if (linkDevice == insulinPump): required: consent; or, allow = userID & name: } |
| Associated Identifiers | Other identifiers that are associated with the user. | Email addresses Driver's License Number Social Security Number |
| User Link Key | When devices, applications, or service layers request to be linked with this user, they must provide this user link key to prove that they are authorized to be linked with this user. Text or string based code for authentic linking. | Device12, sensor32 etc. |
| Frequently Used Voice Commands | User may use voice commands for voice assistants that are more common than others. | "Set Alarm for 6:30 AM", "Weather today.", "News briefing.", "Turn on the room lights.", "Where is my (smart) key?" |
| Favorite video games app | List of information on the favorite video game | Punisher, Wheels on the Hills, FIFA 18 etc. |
| Utilities utilization | Information of periodic utilities utilization. | Data set, graph chart etc. |
| Favorite podcasts | List of favorite radio podcast titles. | "The Full Ratchet", "The James Altucher Show" etc. |
| Saved video states | Point where user stops or pauses the video so that she can continue the next time. | "profile/smTV/catMovie/v114 3": {"uri" : " funnyvids.com/v1143", "time" : "02:43:51"} |
| Recorded program title and link | Live programs may be recorded or scheduled to record to watch it later. | NFL-IXIIV-Eagles_vs._Satans-game4_8/24/18_3:00pmEST |
| Scheduled Software Updates | The list of updates scheduled for various smart devices in the user profile. | Software update 5.2 - SmartLights, Software update 1.8 - SmartGarage etc. |

Let's take a scenario where the user is traveling with her family to an away townhouse for a month. Family members who may be registered as associated secondary users (tier II or tier III users) may have their own privileges that may vary based on the notion of who should be given access to what. All this ACP information may be transported with a user profile. Thus, each user may be able to utilize the devices, applications, and service layers based on their dedicated privileges. For example, a child user who is between the ages of 4-10, may be categorized as Secondary Tier III user. Users in this category may have access to only certain TV stations in the smart TV; they may not have access to surveillance cameras; or access to garage between 5 PM to 5 AM and so on. Users may have 'saved video state' information which could allow them to continue watching their video from the point where they had left off, in the new location after the user profile has been successfully transported to the new foreign location. Therefore, these features make transporting a user profile practicable and desirable.

Creating an Aliased User Profile

A user profile may go through a process of aliasing before it is transported to the foreign gateway or server. The aliasing process comprises of aliasing (by substitution) the user identity (name) in the profile and restricting access to other personally identifiable information (PII) from her profile at user's home M2M/IoT gateway or server by enforcing PCAs, and sending out only selective requested data from within user's aliased user profile (AUP).

From the requesting end, the user may select device, application, or service layer for data. User can either select a category of service or choose to import data by selecting device types, device names and so on.

User Profile Aliasing Process

The user profile aliasing process may be conducted by a User Profile Aliasing Function (UPAF). The process may involve substituting/replacing user profile name or user's name with an alias or a random alphanumeric number.

Additionally or alternatively, the aliasing process may involve enforcing PCAs in user profile that restricts anyone from accessing user's personally identifiable information such as address, fine or coarse location information, etc.

Additionally or alternatively, the aliasing process may involve enforcing ACPs as per the request to access chosen device, application, or service layers data.

Similarly, in the aliasing process, any user link key and device link key in respective user profile and device, application, or service layer profile, may be updated according to aliased user name/ID. For example, if the device was linked with a link key 'Sam_Harris' for the user Sam Harris, which is substituted with alias 'xyz123' may substitute the link key with 'xyz123'.

As a result, requester from foreign location receives an AUP with linked device, application, or applications but without user's PII. Note that the creation of AUP may be a one-way process, and the AUP may be volatile in nature. That is, the AUP is not cached in the database of the home gateway or server.

Table 20 depicts contents of a user profile.

Table 21 depicts an M2M/IoT device, application, or service layer profile.

TABLE 21

M2M/IoT Device, Application, or Service Layer Profile

| Field | Description | Examples |
| --- | --- | --- |
| Device, Application, or Service Layer Identifier | Name of the IoT device, application, or service layer | Nest1 |
| Location | Location of the IoT Device | 7845 N Hillside, Wichita, KS 78251 51.5074° N, 0.1278° W |
| Data Location | Data or storage location or database location of the data | /HDD1/folder1/ subfolder2/file1 |
| Linked Subscriber-ID's | Unique alphanumeric identification of subscriber that a particular device(s), application(s), and service layer(s) that the device, application, or service layer is linked to. | xyz1432klm |
| Device type | Device type representing its objective and function. | Medical device |
| Application type | Application type representing its objective and function | medical device application |
| Service Layer type | What services the Service Layer Provides | Home Automation, Medical Device tracking |
| Device (or application or Service Layer) Link Key | When users request to be linked with this device, application, or service layer, they must provide this link key to prove that they are authorized to be linked with this device, application, or service layer. | linkedNode, linkedCSE etc. |

Figure 24A:
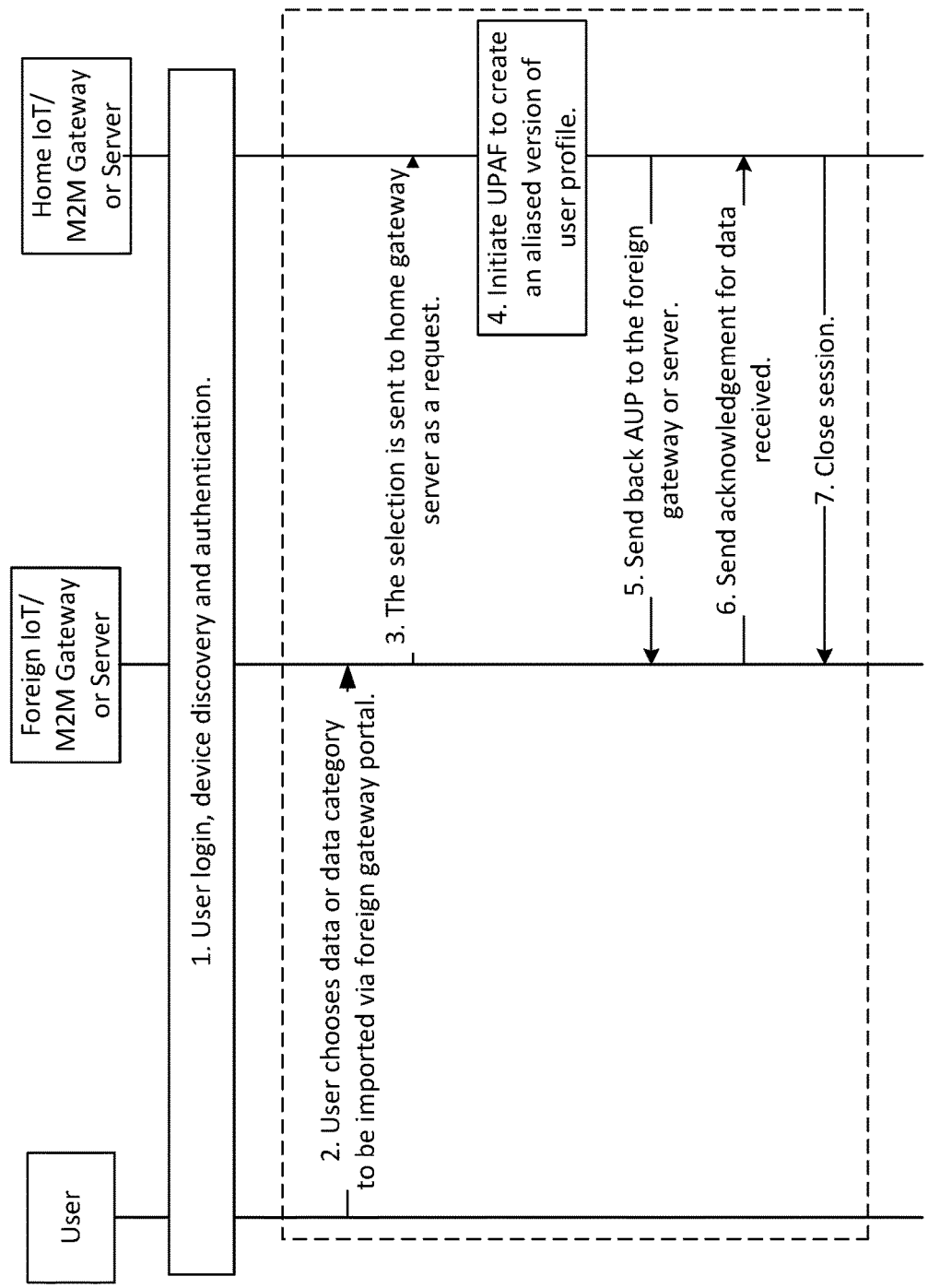
FIGS. 24A and 24B show a flow diagram of an example process for importing aliased user profile and integrating into the server.
Figure 24B:
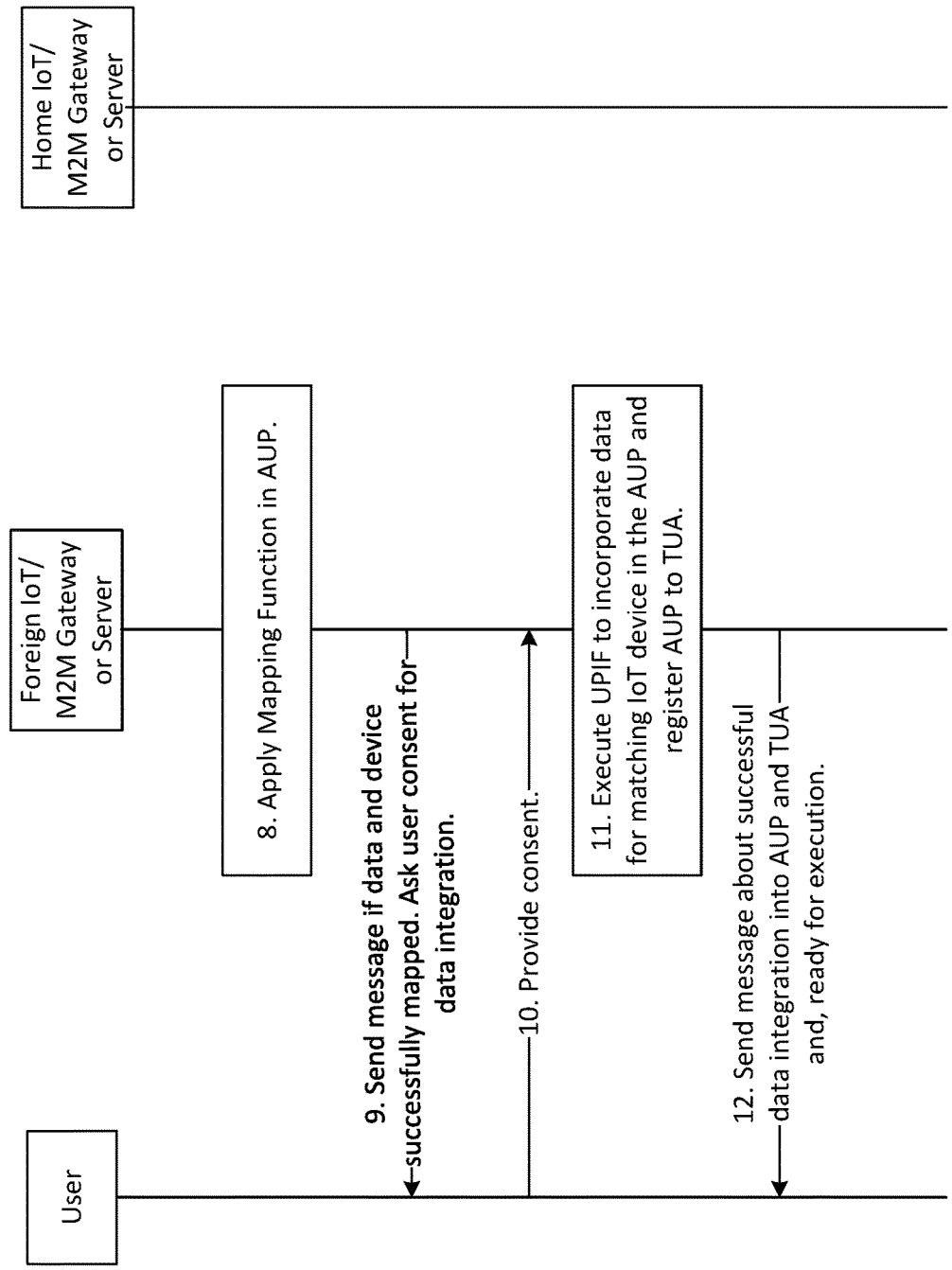

FIGS. 24A and 24B show the process of importing aliased user profile from home gateway or server and integrating it into the foreign gateway or server.

Note that FIGS. 24A and 24B may appear similar to FIGS. 23A and 23B. However, the processes involved in the steps and the underlying assumptions vary. In particular, the processes involved in Steps 4, 8, and 11 are different. In addition, the process of importing user profile data rather than the user profile as a unit is applicable more towards importing and integrating device information and individual device usage information into the foreign gateway or server. This is more useful when a user is traveling alone. This process doesn't import profile level information. That is, device level to device level data are transported and integrated. In contrast, the case where an aliased user profile is imported, user profile information is imported. This also, for instance, means that information about associated users who can utilize devices and services via primary user's user profile are imported and integrated. Transporting user profile as a unit may transport information about user profile such as information and ACPs about associated users in the user profile (for example, family members), reading and stat about overall utilities usage, most frequently used commands, favorite TV channels etc.

FIGS. 24A and 24B illustrate a process for: creating an AUP at the user's home gateway or server; importing the resulting AUP with selective device, application, or service layer data; and mapping and integrating into foreign gateway or server's TUA is described next.

In Step 1 of FIG. 24A, a user logs into the system, initiates device discovery and gets authenticated with the home gateway or server.

In Step 2, the user may request customized data from the home gateway or server. The foreign gateway or server may provide user with an interface that displays list of devices, applications or service layers, which may be listed individually or as a category of devices from which user may make selections. The user's request is based on devices available at the foreign M2M/IoT environment. For example, in a smart hotel room scenario, user may just import thermostat usage data or choose to import data from a service category. For example, a 'Home Convenience' category may include all the devices and data related to smart home system such as smart thermostat, smart refrigerator, smart TV, smart voice assistant and so on.

Table 19 shows attributes or parameters for ACP based on which a user at foreign location may be able to make selection for data request.

In Step 3, the Foreign M2M/IoT server sends import request with selected data to home M2M/IoT server on behalf of the user.

In Step 4, as the home gateway or server receives a request for data from the user at foreign gateway or server, the system may initiate the User Profile Aliasing Function (UPAF) in the home gateway or server. It creates an aliased version of user profile. The AUP creation process may involve one or more of the following four aspects.

First, the AUP creation process may involve making a copy of existing user profile and storing in the database.

Second, the AUP creation process may involve substituting a user's name/ID with an alias. An alias may be chosen by a user or it may be a randomly generated alphanumeric-symbolic characters. Rules for an alias may include, for example, that any alias does not match any user information such as: name; date of birth; assigned unique IDs; previously used aliases; any unique number used in the system; and any combination of characters used or matching information within the system. For example, a profile name/ID of 'SamHarris' may be replaced with 'Devon123', '4577123' or 'MX45RTU'.

Third, the AUP creation process may involve enforcement of access control policies that would allow or restrict requested user profile data or information (devices, applications, or service layer data).

Fourth, in the AUP creation process, the UPAF may also enforce access control policies that ensure user's PII are restricted from access. In other words, PCAs may be implemented in the AUP creation process.

Code Example 1 of the Appendix illustrates a way of implementing an access control policy.

---
Code Example 1
Access Control Policy
---

```
...
If OriginatorType == Foreign or Temporary {
    Restrict Access:
    Attribute == {address, location, associated users, SSN, PPN};
}
...
```

In Step 5, the home gateway or server sends user's AUP with selected device, application, or service layer data to the user at foreign gateway or server.

In Step 6, the foreign gateway or server receives the data and sends an acknowledgement for the data received.

In Step 7, upon receiving the acknowledgement from foreign gateway or server, home gateway sends a message to the foreign gateway or server informing end of the session.

The call flow of FIG. 24A continues in FIG. 24B. In Step 8 of FIG. 24B, the gateway or server consists of a Mapping Function. The Mapping Function maps the user data in the imported AUP, based on the M2M/IoT devices, applications or service layers in the foreign gateway or server and prepares for integration.

For example, in the imported AUP, if there exists a Nest thermostat, and say, last 1 week of temperature information along with date and time is imported into foreign gateway or server. But there exists a Samsung thermostat at the foreign location (for example, smart hotel). Provided that two manufacturers have agreement on data integration which may also mean agreement on data format, Nest's thermostat name may be substituted with Samsung thermostat and the data from the Nest devices may be used by Samsung thermostat in the AUP.

In Step 9, the foreign gateway or server sends a notification about mapped devices, application, or service layer's data or data that the server was incapable of mapping. The mapping may depend on various metrics but not limited to data formats, type of devices, device functionality or, agreement between manufacturers of different devices with similar functionality etc.

In addition to notification, foreign gateway or server may ask for user's consent for integration of mapped data into the foreign M2M/IoT service layer system.

In Step 10, the user provides consent to integrate imported data into foreign M2M/IoT server.

In Step 11, upon receiving a consent from user, foreign M2M/IoT gateway or server executes the User Profile Integration Function (UPIF). The integration process may involve one or more of the following five aspects.

First, the integration process may involve registering an Aliased User Profile (AUP) in the TUA.

Second, the integration process may involve linking all the available and mapped M2M/IoT devices, applications, and service layers to the imported AUP. This may include updating link keys for user profile and devices, applications or service layers.

Third, the integration process may involve updating the mapped home gateway or server's M2M/IoT devices, applications or service layers' resources and attributes in the imported AUP with local foreign M2M/IoT devices, applications, or service layers' resources and attributes.

Fourth, the integration process may involve populating the integrated devices with the imported device data. For example, average thermostat readings for 1 week collected in the interval of 3 hours.)

Fifth, in the process of integrating AUP into the foreign gateway or server, access control policies pertaining to the AUP is now granted only to the owner of the TUA in the foreign gateway or server.

Note that in the process of integrating AUP into the foreign M2M/IoT service layer system, the ACPs that are associated with user and secondary users are transported along with the AUP.

In Step 12, the foreign gateway or server sends a message to the user about successful integration of imported AUP and associated data in the foreign M2M/IoT service layer system, and indicates that the system is ready to be execute imported data in the foreign M2M/IoT service layer system.

AUP includes all the requested user information without PII. As compared to the user profile data transfer procedure described in relation to FIG. 27, more information is transported with the AUP. More importantly, the information is user profile centric, which allows user to leverage the advantages for control and monitoring of the overall user profile.

Data Protection by Erasure

One way to protect user privacy is to destroy user data after it has been utilized. This technique prevents adversaries from using stale data. To meet this objective, this disclosure proposes a data erasure management function (DEMF).

Data Erasure Management Function (DEMF)

A Data Erasure Management Function (DEMF) is adapted to provide data erasure for user data protection. A DEMF may follow a four step procedure for data erasure: (1) data erasure policies and policies provisioning; (2) erasure of user profile data; (3) erasure of temporary user account (TUA); and (4) reset/reboot of the IoT devices.

Data Erasure Policies and Policies Provisioning

When a user leaves a foreign location or, if the user is absent from the foreign M2M/IoT environment for extended amount of time, such as a duration that may declare temporary user as non-returning, data erasure policies may be triggered and executed to erase the imported data in the TUA of the foreign gateway or server. A user is usually expected to trigger the data erasure process when leaving the foreign M2M/IoT environment. However, even if the user is not able to trigger the data erasure process, say the user forgets to execute data erasure command, DEMF may trigger data erasure process.

DEMF in the M2M/IoT service layer consults the data erasure policies (DEPs) to make data erasure decisions. Table 22 presents DEPs used when data are erased either by the user or automatically by DEMF when a condition is met.

TABLE 22

| Data Erasure Policies | | |
|---|---|---|
| Attribute | Description | Examples |
| Conditions | Conditions are more static contexts that are highly likely to occur. Conditions for policy are preset by the SLSA. | Lease time expiration, trigger for departure from a user etc. |
| Metadata | Metadata is the data of the data that usually signifies when, who, where, what, why and how of the data creation. | Date and time (for example, 5:57PM), role of the creator (for example, guest, administrating |

TABLE 22-continued

Data Erasure Policies

| Attribute | Description | Examples |
| --- | --- | --- |
| | | authority etc.), location (for example, GPS coordinates, IP, MAC Address etc.). |
| Actions/ Operations | The types of action/ operation conducted towards the data. | The only operation that is allowed for the destruction purpose is "Overwrite". |
| Creator | The person/entity who creates, imports the data, integrates the data etc. | Guest ID number, administrating entity ID etc. |
| Target | The target data that policy should be applied to. | User profile data or user account. |

Note that DEPs are scoped to the user owned user profile data, for the user and policies established by the user.

To protect data and information ascertained by the user, may be destroyed once it has been utilized. Data may be erased or invalidated once the user decides not to use the smart devices in her M2M/IoT environment or service. This may usually occur when the user leaves the smart M2M/IoT location/environment or when the lease time expires. The lease time here may refer to the time the user has signed up to remain in the foreign M2M/IoT environment.

Data erasure policies (DEPs) may be established by the owner of the data (user) and executed by the DEMF in the M2M/IoT service layer. There are two scenarios where user may be able to set up DEPs: (1) provisioning DEPs at a foreign gateway or server; and (2) provisioning DEPs at the home gateway or server.

Provisioning DEPs at Foreign Gateway or Server

Figure 25:
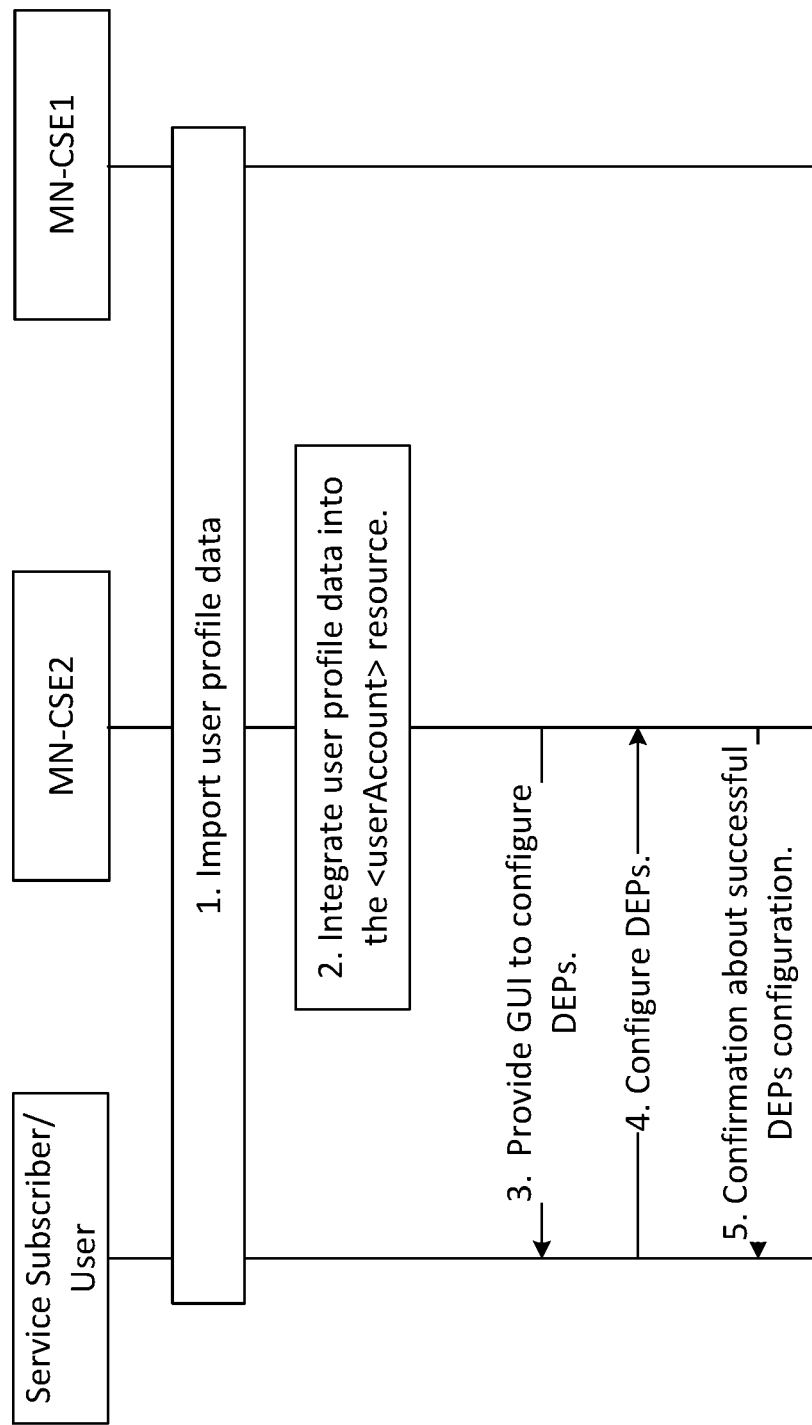
FIG. 25 is a flow diagram of an example process in which a user configures a data erasure policy at a foreign gateway or server.

A user may provision DEPs via a GUI after user obtains TUA and imports user profile data into the GUP in TUA. FIG. 25 depicts the process of provisioning DEPs at the foreign gateway or server. Each step of the call flow in the figure is described thereafter.

In Step 1 of FIG. 25, a user imports user profile data into the TUA at the foreign gateway or server.

In Step 2, the foreign gateway or server integrates user profile data into the GUP in TUA.

In Step 3, as the user profile data is integrated into the GUP, Data Erasure Management Function (DEMF) may provide a GUI for the user to configure DEPs for her data. The GUI may consist of user-friendly select-and-confirm DEP configuration architecture.

Alternatively, a user may use a separate (mobile) device with a GUI to get access and information management in the foreign gateway or server.

In Step 4, the User configures DEPs. For instance, user may choose date and time for data erasure, or just choose to select a default policy. A default policy may consist of a rule that would erase user data when the user's time of stay at the foreign location is over.

In Step 5, the A confirmation on successful DEP configuration is sent to the user.

Provisioning DEPs at the Home Gateway or Server

Figure 26:
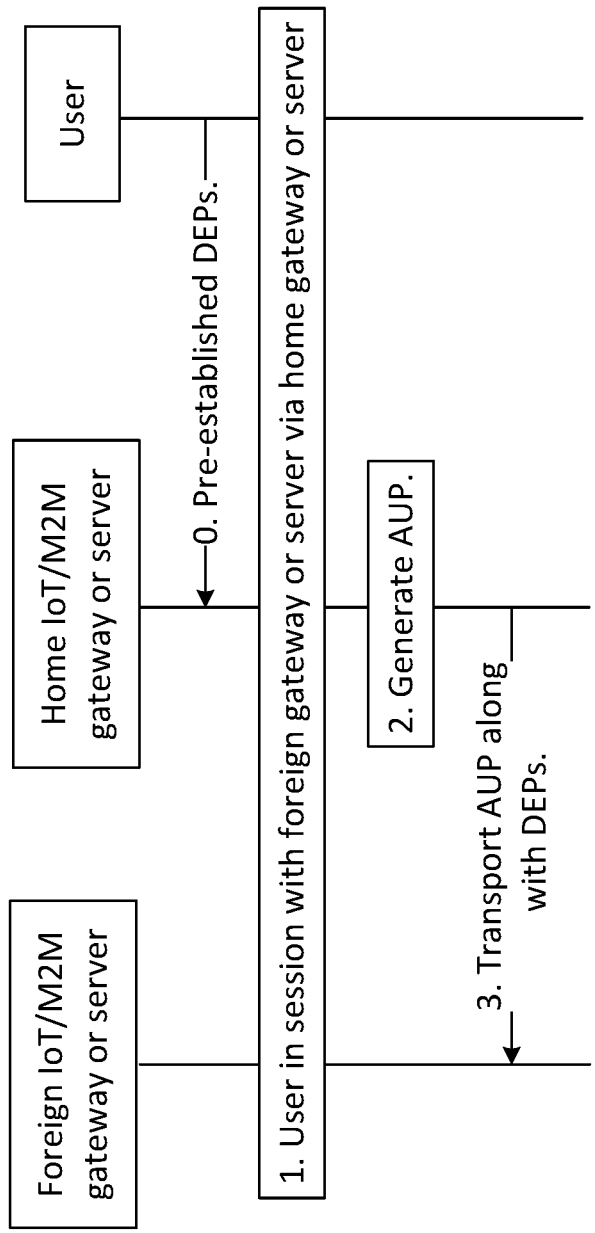
FIG. 26 is a flow diagram of an example process in which a user configures data erasure policy at a home gateway or server.

A user may be able to pre-configure DEPs. When the UPAF in the home gateway or server completes aliasing a user profile, DEMF incorporates DEPs along with the AUP. FIG. 26 shows the steps involves in configuring DEPs at the home gateway or server and transportation of DEPs along with AUP.

In Step 0 of FIG. 26, a user may pre-configure DEPs at the home gateway or server before locating herself at the foreign location.

In Step 1, the When user reached at the foreign M2M/IoT environment, she may initiate session with the home gateway or server via her TUA in the foreign gateway or server. In this session, user may request to import AUP from the home gateway or server.

In Step 2, the AUP is created by the UPAF at the home gateway or server. DEMF may be triggered at this point to incorporate DEPs with the AUP.

In Step 3, per the user's request, AUP along with the DEPs is transported to the foreign gateway or server.

Erasure of the User Profile Data

This process involves erasing generic/aliased user profile in the TUA. There are two cases where erasure of generic/aliased user profile data may occur. First, when user may want to erase generic/aliased user profile data and re-import user profile data. For example, there may occur in scenarios when user may want to reset her user profile with 'home convenience' data and re-establish user profile data with 'health monitoring' data. Second, when user erases the TUA, the generic/aliased user profile that exists in the TUA is erased altogether.

Erasure of the Temporary User Account

Generally, destroying or erasing the temporary/user account information may proceed only after user profile data have been erased. However, erasing temporary user account (TUA) implies destroying a TUA as well as user's profile linked with the TUA. For example, if user forgets or ignores to erase her data when she departs from the foreign M2M/IoT location, a condition that signifies the end of her lease period may trigger DEMF to erase the temporary user account. This trigger may allow DEMF to follow the process of erasing the generic/aliased user profile data followed by the temporary user account erasure process.

Data destruction or erasure process such as British HMG Infosec Standard 5, Enhanced Standard which incorporates 3 overwriting rounds with random pattern or, NIST standard, NIST SP-800-88 Rev. 1 which takes 1 round of overwriting with all zeros may be used.

Resetting/Rebooting of IoT Devices

User data erasure may be followed by sending a reset/reboot command to the participating IoT devices. These IoT devices may include M2M/IoT devices, applications or service layers or non M2M/IoT devices. This process may help wipe out any history of data and its meta data in the corresponding IoT devices. The outcome of the device reboot/reset may limit adversaries from gathering stale data from the IoT devices, which they may use to correlate with other information that eventually may harm the user.

It must be noted that sending a reset signal to non-M2M/IoT devices may be an act of intrusion. However, since we deal with an M2M/IoT environment, where devices, applications or service layers either belong to a service provider or, the devices are assumed to be operated (i.e. installed, configured etc.) by an SLSA, the IoT devices may be configured to receive and comply with the reset/reboot request sent by the hosting M2M/IoT server. If an IoT entity is a device that may not have reset functionality, only the device data may be reset. It is the boundary of authority that may enable the reset/reboot of IoT devices. For example, boundary of authority may include all the IoT devices M2M/IoT or non-M2M/IoT devices to comply with security procedures such as 'rebooting the device'.

Another scenario to note is that not all the devices may be power abundant, and hence may not be smart enough and may not keep records by themselves. However, they submit their data to a registrar M2M/IoT device (i.e. a proxy device). Therefore, data erasure command signal may be sent to the DEMF at the registrar M2M/IoT device to make sure that corresponding old data are wiped out.

Procedures for Data Erasure

As discussed, in the process of erasing the user data in a foreign M2M/IoT server, the data may be erased using two different methods: data erasure by intention, and data erasure by trigger.

The erasure process may incorporate the method of overwriting the existing user data rather than just deleting the existing data. "Deleting" data from the storage may not fully destroy the data, and in many cases, extracting deleted data from the storage has proven to be feasible. Therefore, overwriting existing data with zeros or gibberish data could be more secure than deleting.

Data Erasure by Intention

Data erasure may be initiated by the user herself. For example, the user may manually execute the user data erasure procedure. The process may include the erasure of user's generic/aliased user profile first, and then the deletion of the TUA. This provides a user with an option as well as control on whether to erase just the user profile or, erase the TUA as a whole.

Figure 27:
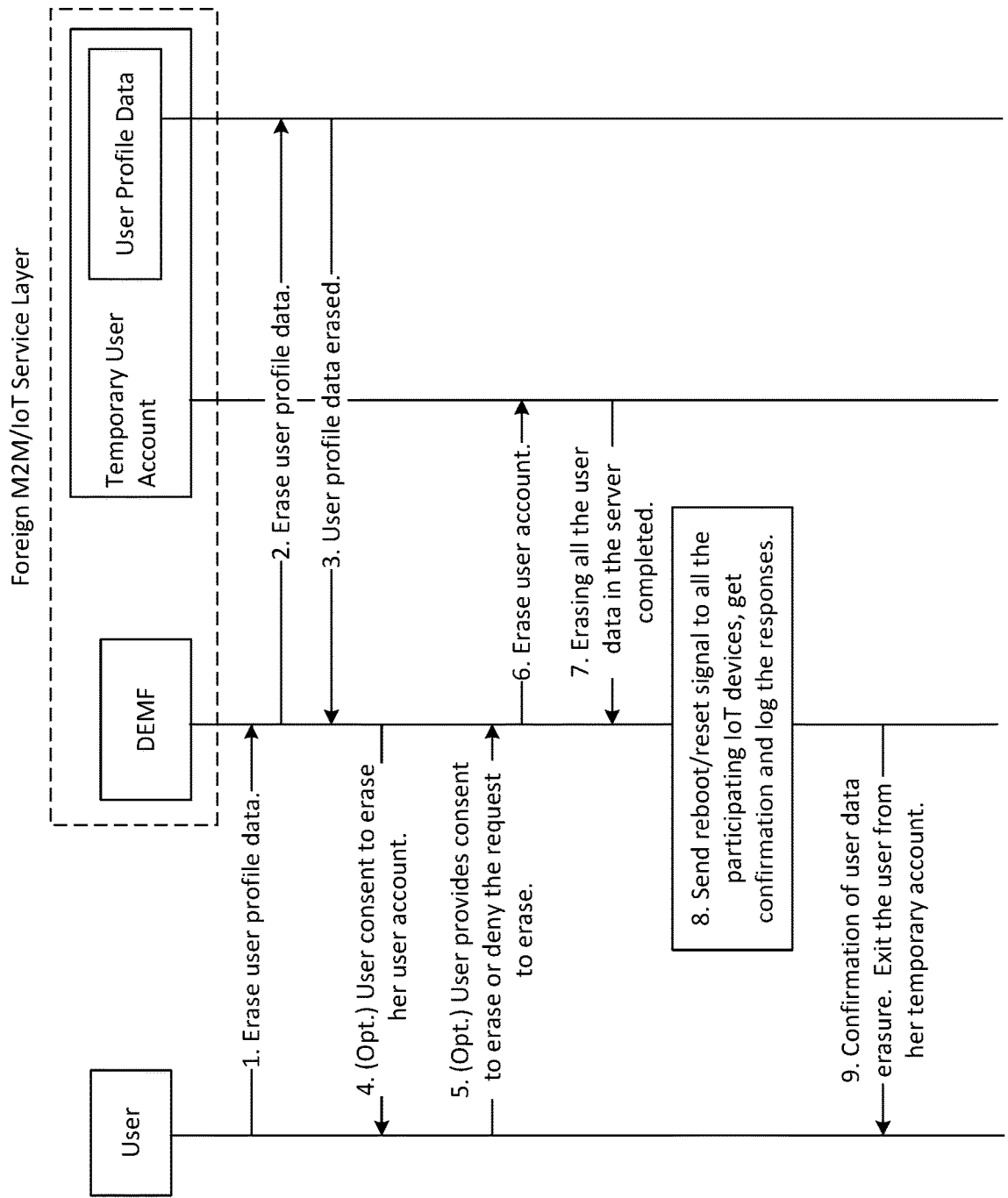
FIG. 27 is a flow diagram of an example process for a user-triggered data erasure process.

FIG. 27 shows an overall data erasure process triggered by the departing user. User is responsible to initiate her data erasure process. Each step about the data erasure process is described below:

In Step 1, the user interface may provide user with a control icon to initiate the data erasure process. User initiates the generic/aliased user profile data erasure process, which is sent to the data erasure management function (DEMF).

In Step 2, the As DEMF receives the data erasure command, it sends data erasure command as per the DEMF policies depicted in Table 22. The DEMF checks for policies which confirms attributes such as, if: the user is authorized AND the command is for erasure AND applies to the data that is authorized to the user. Provided that the policy meets the criteria, DEMF erases the user profile data.

In Step 3, upon the completion of generic/aliased user profile data erasure, the DEMF receives a message for erasure completion.

In Step 4, optionally, user may be notified with a message to provide a consent before erasing her user account. This step may be important to prevent any unintentional account erasure process. In addition, this step may be helpful in scenario where, user may just want to reset her generic/aliased user profile while she may still want to use the same TUA.

In Step 5, the User either provides consent to erase the TUA or deny the request to erase.

In Step 6, upon user's consent DEMF erases the TUA. DEMF may also be responsible for invalidating the TAC that user initially received.

In Step 7, the DEMF receives a notification after the data erasure process is complete.

In Step 8, the As the TUA as well as generic/aliased user profile is erased, DEMF sends a reboot/reset signal to all the M2M/IoT devices, applications, or service layers.

There may exist non-M2M devices (for example, devices, or applications that do not use oneM2M service layer) in the IoT environment. In scenario as such, non-M2M devices are assumed to be IoT devices of some form, and are configured to comply with the reboot/reset signal from the hosting M2M/IoT server. Once the IoT devices are reset/restarted, a confirmation from the devices are received, and clean states of the devices are logged in the DEMF.

In Step 9, as the erasure process completes, a confirmation of user account and AUP data erasure is sent to the user in the user interface. By then, user no longer possesses user account, and hence, user is exited out from the account with a notification of the exit.

Data Erasure by a Trigger

Data erasure by a trigger may be utilized as an alternative standalone approach or, it may be used as complimentary with the data erasure process discussed previously. This technique involves examining the metadata of the data by the DEMF to find what data exists, when the data was created, who the data was created by and so on. For instance, as the user's time of stay is over, the time, day and date may be a trigger for the user data erasure procedure. This trigger may lead DEMF to discover the data erasure policies, which are then enforced. The policy may decide what data needs to be erased.

Figure 28:
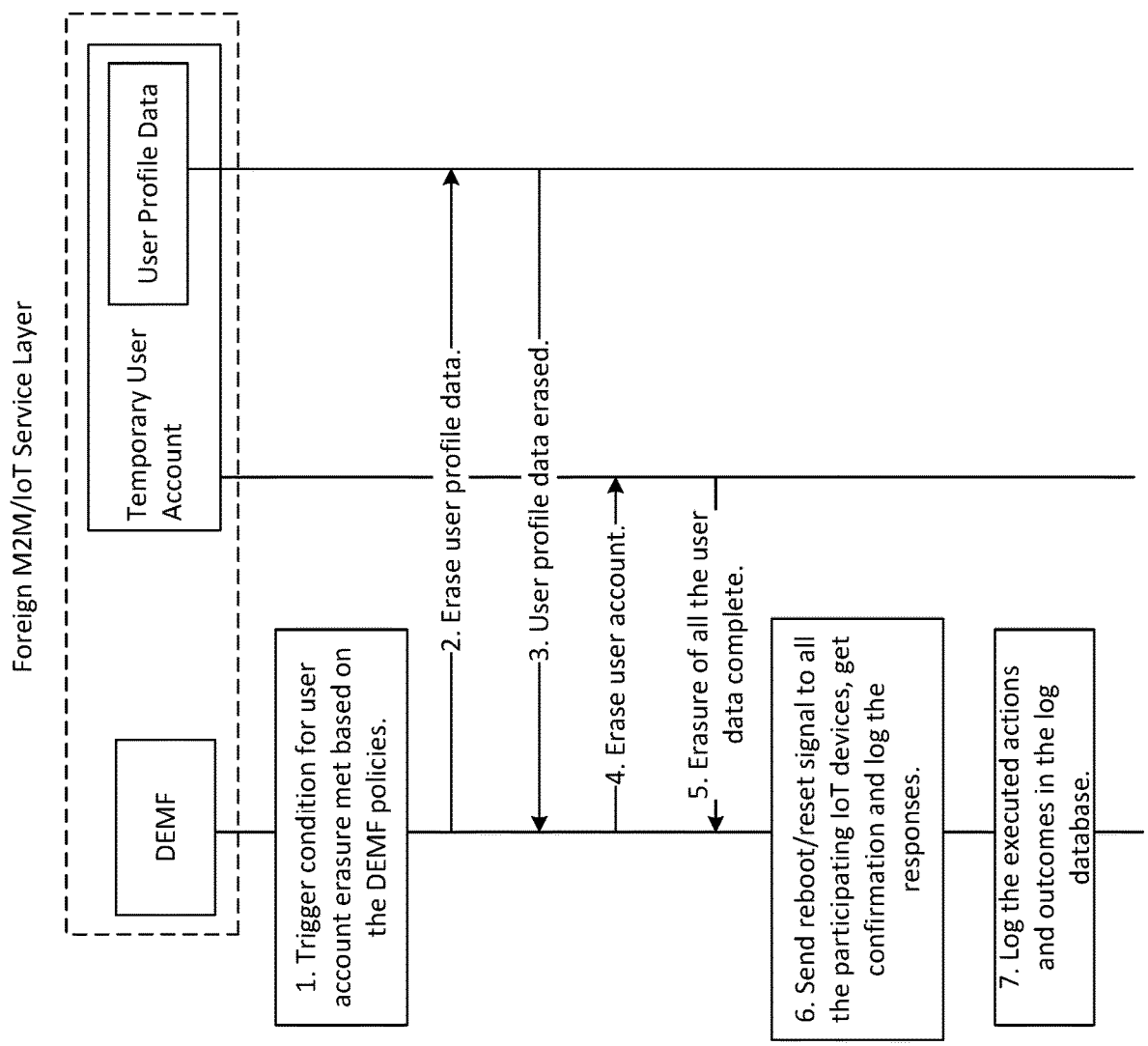
FIG. 28 is a flow diagram of an example process for condition-based data erasure using a Data Erasure Management Function (DEMF).

FIG. 28 shows an example process data erasure process when conditions for erasure are met. Policies that enable data erasure process are depicted in Table 22. The steps are described below:

In Step 1, the DEMF senses a trigger condition. For instance, the access code that was provided to the user is a temporary one in that it may expire as user's time of stay in the foreign location is over. The expiration time of the TAC may be a trigger for user data erasure process.

In Step 2, the DEMF executes the policy for data erasure and erases the generic/aliased user profile data.

In Step 3, upon completion of generic/aliased user profile data erasure, the DEMF receives a message for data erasure completion.

In Step 4, the DEMF then sends user account erasure command to erase the temporary user account. DEMF may also be responsible for invalidating the TAC that user initially received.

In Step 5, the DEMF receives the notification for the completion of all the user data erasure including the TUA.

In Step 6, as the user account as well as (generic/aliased) user profile is erased, DEMF sends a reboot/reset signal to all the M2M/IoT devices, applications, or service layers.

There may exist non-M2M devices (for example, devices, or applications that do not use oneM2M service layer) in the IoT environment. In scenario as such, non-M2M devices are assumed to be IoT devices of some form, and are configured to comply with the reboot/reset signal from the hosting M2M/IoT server.

Once the IoT devices are reset/restarted, a confirmation messages are received from the devices, and clean states of the devices are logged in the server.

In Step 7, as the erasure process completes, a confirmation of user account and generic/aliased user profile data erasure may be sent to the user via text message or email. By then, user no longer possesses temporary account, and hence, user may be exited out from the temporary user account. The steps that were taken in the process and the outcomes may be recorded into the log database.

The DEMF may be applicable to a GUP in a TUA, even when user does not choose to import her user profile data from her home M2M/IoT gateway or server to foreign M2M/IoT gateway or server.

Example oneM2M Implementations

Figure 29:
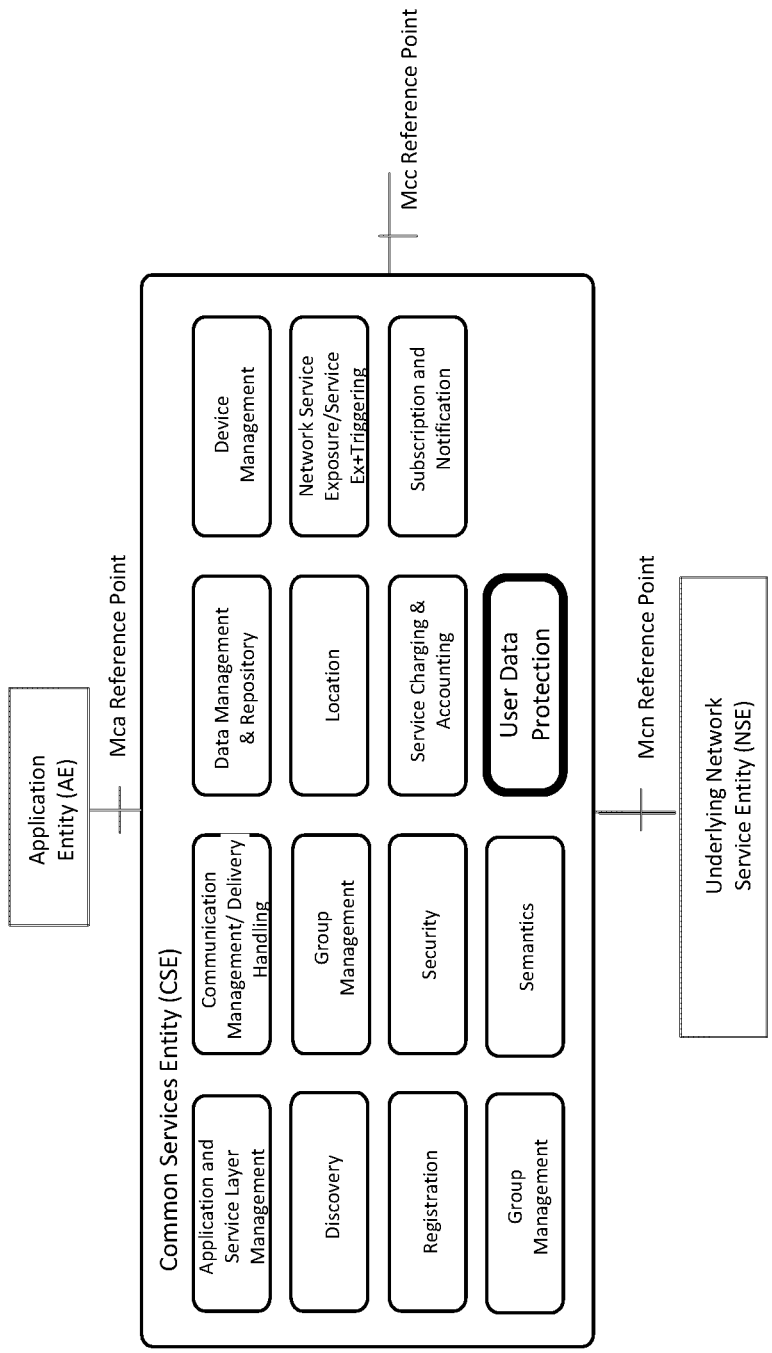
FIG. 29 illustrates an example oneM2M CSF.

The oneM2M service layer is instantiated as a Common Server Entity (CSE). Each CSE is composed of a set of Common Service Functions (CSFs) designed to serve specific objective. The user data protection functionality proposed in this disclosure may be embodied as a CSF. The new CSF, User Data Protection Function (UDPF) supports the functionalities described herein and may be realized as shown in FIG. 29. Alternatively, the UDPF can be embodied as a function of an existing CSF (for example, Security CSF).

A home M2M/IoT service layer gateway or server and foreign M2M/IoT service layer gateway or server can be embodied as oneM2M/IoT service layer gateway or server.

User Account, Generic User Profile, and Data Encryption at Rest

As described in relation to FIG. 27, for example, a TUA may be created and linked to a generic user profile (GUP). The data in the user account may be encrypted using a user's chosen password. Such processes may be used in a oneM2M/IoT SL system. For example, the foreign oneM2M/IoT server may be an IN-CSE, MN-CSE, or ASN-CSE. For the embodiment in this disclosure, a home gateway or server may be embodied here as MN-CSE1 and foreign gateway or server may be embodied as MN-CSE2. A user may be regarded as oneM2M service subscriber, originator or (in some cases) data subject. This disclosure uses the term 'service subscriber/user' throughout the document to indicate equivalent embodiment of 'user'. The CSE may have a special AE application to send and receive user's input and output.

A oneM2M/IoT Security Administrator (OSA), may be able to create TACs, where each TAC is configured to represent a TUA. A TUA in the oneM2M/IoT Service Layer may be represented with a <userAccount> resource. OSA may assign privileges or <accessControlPolicy> resources to TUAs. The <accessControlPolicy> child resource in the <userAccount> resource may define privileges that include the TAC. In other words, the privileges may include TAC as an attribute/parameter. The privilege may check the usage of proper TAC to allow or deny access to the service subscriber. OSA may also create a GUP as <userProfile> resource with a generic name attribute (for example, Room205) and associate or link resources such as <node>, <AE>, <remoteCSE>, or other CSE resources to it. In a foreign gateway or server, the name of the <userProfile> resource may be set to an indicator representing the environment. For example, in a hotel room scenario, the GUP may be initially named under hotel room number 205 as "Room205", and the attributes that are associated with the <userProfile> resource may be the fields that are listed in Table 20.

An equivalent of creating a GUP in a TUA may be embodied in the oneM2M/IoT SL as creating and associating a <userProfile> resource as a child resource of <userAccount> resource. For the scenario adopted in this disclosure, <userProfile> is assumed to have resources such as <node>, <AE>, <remoteCSE>, <flexContainer>, <container>, <contentInstance>, etc. associated with <userProfile> at the time when <userProfile> created under the <userAccount> resource. Table 23 depicts a <userAccount> resource for TUA in a foreign oneM2M/IoT gateway or server. Attributes of a <userAccount> resource are depicted in Table 24.

Table 25 shows <UserProfile> resource followed by attributes for the <UserProfile> resource in Table 26.

TABLE 23

Child resources of <remoteCSE> resource

| Child Resources of <remoteCSE> | Child Resource Type | Description |
|---|---|---|
| [variable] | <userAccount> | A resource that represents TUA as an entity that embodies resources representing GUP or AUP. |

TABLE 24

Attributes of <userAccount> resource

| Attributes of <CSEBase> | Description |
|---|---|
| TemporaryAccessCode | Unique temporary identifier created by OSA that presents the <userAccount> resource to the user. |
| Subscriber-ID | Unique alphanumeric number that represents the user. |
| creationTime | Time/date of creation of the resource |
| expiration Time | Time/date after which the resource will be deleted by the Hosting CSE. This attribute can be provided by the OSA, and in such a case it will be regarded as a hint to the Hosting CSE on the lifetime of the resource. The Hosting CSE may configure the expirationTime value |

TABLE 25

Child resources of <userAccount> resource

| Child Resources of <userAccount> | Child Resource Type | Description |
|---|---|---|
| [variable] | <userProfile> | Associated unique user profile. See Table |

TABLE 26

Attributes of <UserProfile> resource

| Attributes of <UserProfile> | Description |
|---|---|
| name | Name of the user who subscribes to M2M/IoT service layer services |
| Subscriber-ID | Unique alphanumeric number that represents the service subscriber/user. |
| streetAddress | Physical address of the service subscriber/user. |
| unitType | Nature of unit that intuitively defines the accountability as business or person. For example: household, business, corporation etc. |
| linkedCSE | Name/ID of the CSE that is associated with the user profile and the service subscriber/user in the user profile can control. |
| linkedNode | Name/ID of the node that is associated with the user profile and the service subscriber/user in the user profile can control. |
| foreignServerInfo | Optional attribute (applicable in the home gateway) that keeps track of the foreign gateways or servers where user profile may have been transmitted. |
| linkedAE | Name/ID of the AE that is associated with the user profile and the service subscriber/user in the user profile can control. |

As described in relation to FIG. 19 and FIG. 20, for example, a TUA may be created and associated with a GUP. A oneM2M/IoT CSE can support linking capability. An OSA may create a <userProfile> resource under <userAccount> resource in the service layer, <remoteCSE> resource. On the other hand, any linked user profile in the <node>, <AE> or <CSE> resources may be represented by linkedUser attribute that represents the <userProfile> resource for the linked user. A CSE or AE may subscribe to any linkedUser attribute in the system being assigned with a value.

Figure 30:
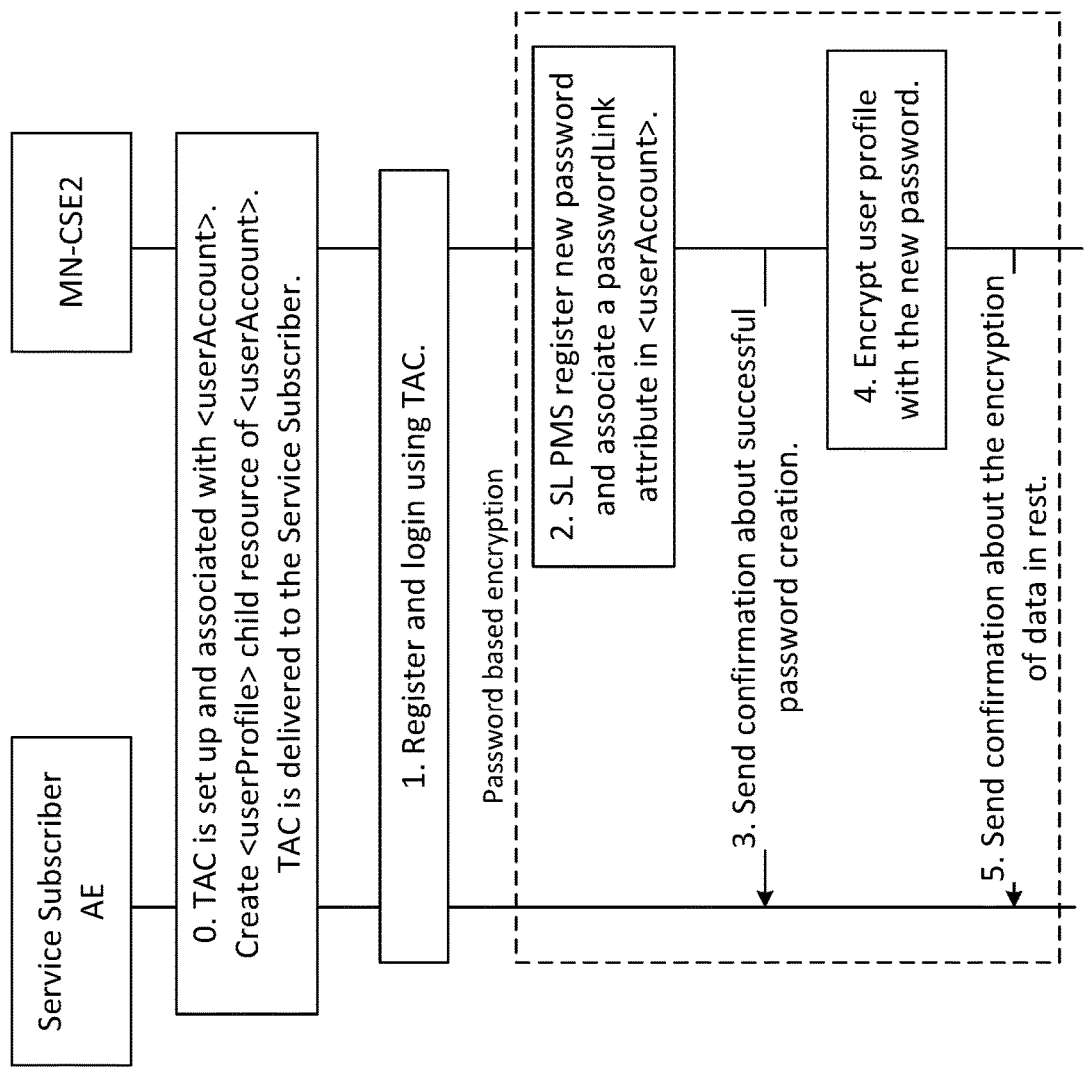
FIG. 30 is a call flow of an example process for user account creation, linking a user profile to a temporary user account, and user profile encryption using a password.

FIG. 30 depicts the process that involves user account creation, linking a genetic user profile to TUA, and user profile data encryption at rest using a password. FIG. 30 depicts a foreign gateway or a server as an MN-CSE2, an instance of oneM2M/IoT service layer.

Figure 32:
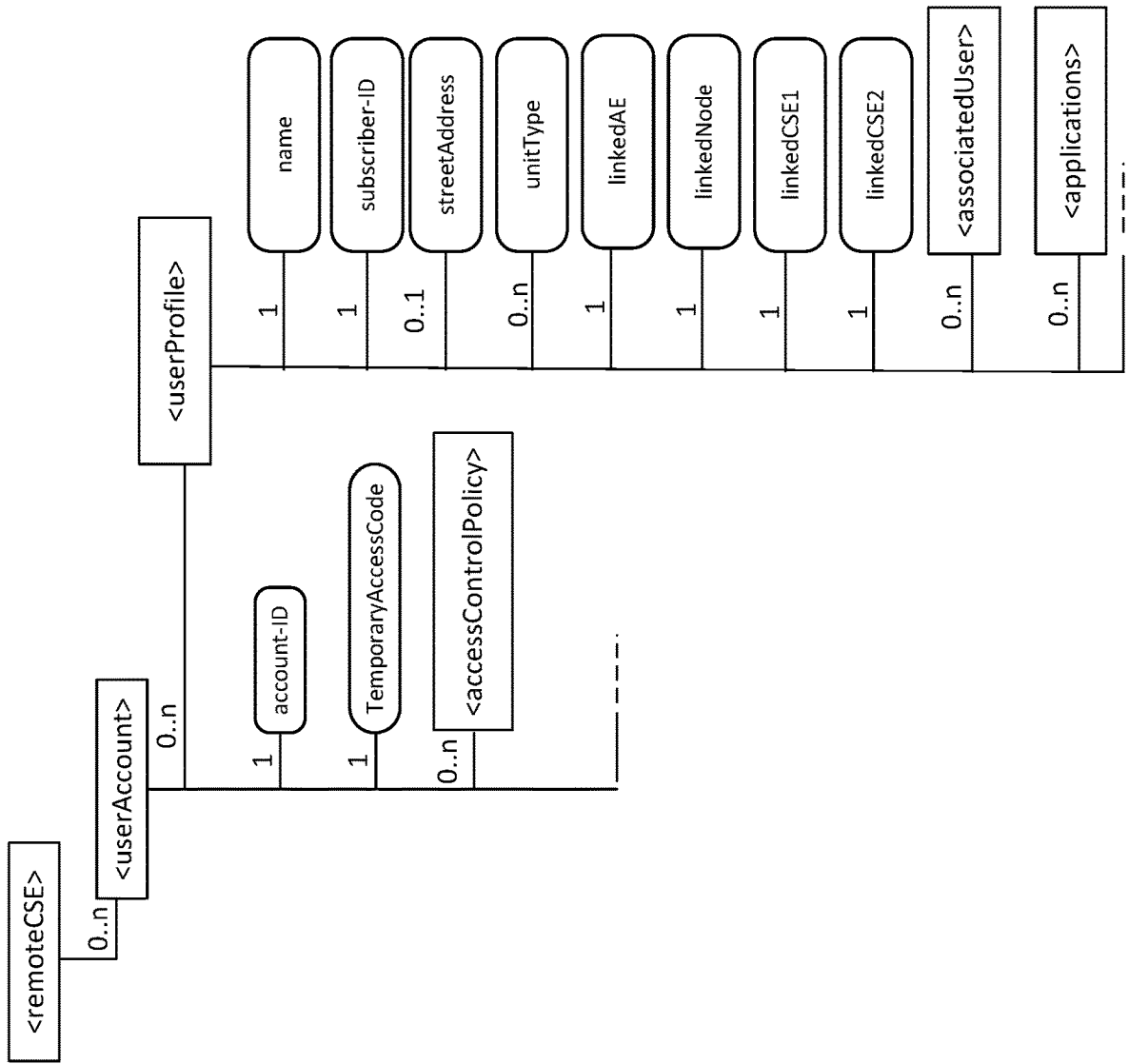
FIG. 32 is an example structure of a user account and user profile resources in a oneM2M service layer.

In Step 0 of FIG. 30, the TAC may be created and associated with the TUA represented with <userAccount> resource. <accessControlPolicy> child resource as depicted in FIG. 32 may be established, which may include privileges with the TAC and time constraint for service subscriber/user account registration. The ACPs checks for correct TAC and the valid time constraint duration before allowing service subscriber/user to register herself with the TUA and later, to sign-in into the TUA. Child resource <userProfile> may be then created. TAC is delivered to the oneM2M service subscriber/user.

Alternatively, once the user profile data has been imported and integrated into the GUP, MN-CSE2 may establish ACPs based on the TAC around the mapped resources and attributes in the GUP.

In Step 1 of FIG. 30, the User registers to TUA in the MN-CSE2 with TAC. In the process, user is obligated to create a new password. Before allowing service subscriber to register for TUA, MN-CSE2 checks if the user has a correct TAC and if the user is registering within given time constraint. With TAC and password service subscriber registers and logs in into her TUA.

Password Based Encryption

In Step 2, the SL PMS registers new password into the SL. A PMS in oneM2M/IoT service layer may be handled by M2M Authentication Function/M2M Enrolment Function (MEF/MAF). It may use hash function with salt to encipher a password and securely stores it via the service layer. A hash function is a one-way function. This means a hashed password by the hash function is very difficult to reverse to original plaintext.

In Step 3, the MN-CSE2 sends confirmation message to the user for successful password creation. The creation of new password by the user for the given TUA represented with <userAccount> resource marks the acquisition of TUA and the underlying <userProfile> child resource.

In Step 4, in addition to saving the password, the MEF/MAF may channel the service subscriber/user entered plaintext password into the AES symmetric key generator. The key generator may generate specified sized (bit length) key and may store securely in the SL. The MN-CSE2 Service Layer uses same key to encrypt the GUP data at rest.

Alternatively, SL PMS may provide user with an opportunity to provide a new secret once she has registered and logged into the TUA <userAccount>. This secret may be used to generate a key and then use the key to encrypt the <userProfile> resource data at rest. The key may be stored securely in the SL.

In Step 5, the oneM2M/IoT gateway or server sends a confirmation message about successful data encryption at rest, to the service subscriber/user.

User Assisted Shared Secret Key Provisioning

Figure 40:
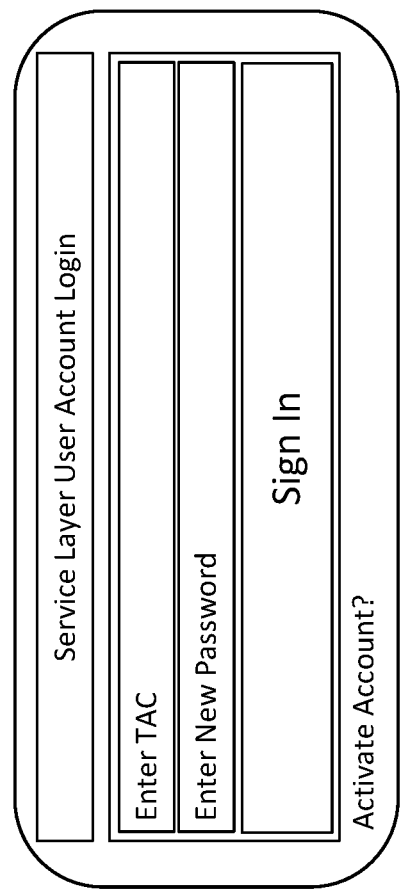
FIG. 40 illustrates an example user interface to log in into the TUA.

A user-assisted shared secret key distribution technique may be used in a oneM2M/IoT service layer system. A home gateway or server may be embodied here as MN-CSE1 and foreign gateway or server may be embodied as MN-CSE2. A service subscriber/user, who has registered with a TAC and password, and has logged-in into the MN-CSE2, may be able to provision a shared secret between the TUA represented by <userAccount> resource in the MN-CSE2 and the MN-CSE1. Login functionality in a MN-CSE2 may be realized by an AE designed to manage login functionality. A user interface that depicts a TUA login pane is depicted in FIG. 40.

The derived symmetric key from the secret may be represented as, Kpm denoting pre-provisioned symmetric enrollee key. Here, either foreign gateway or server or home gateway or server may be considered as enrollee and enrolment target or vice versa.

Figure 31:
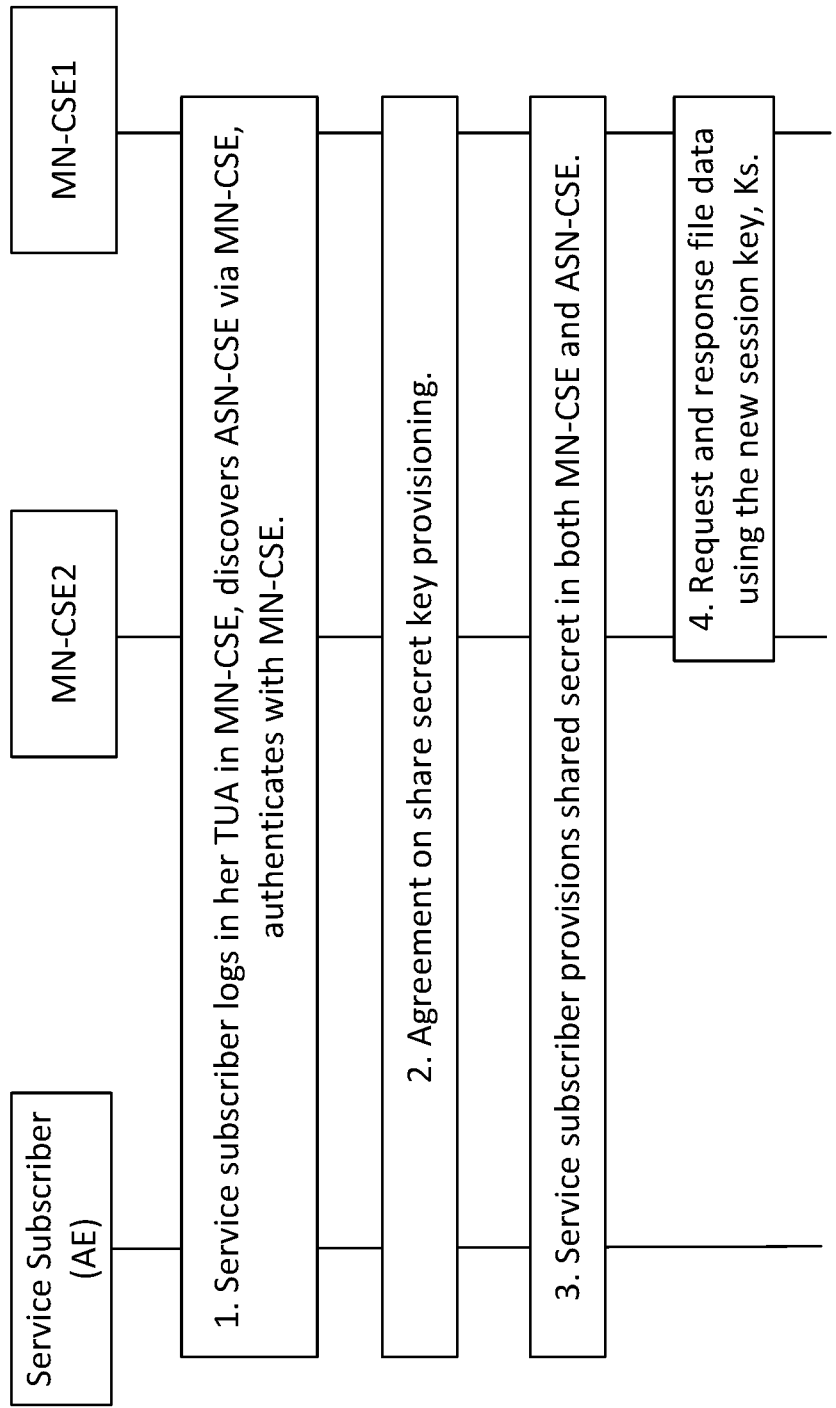
FIG. 31 is a call flow of an example process for user assisted shared secret key provisioning in a oneM2M/IoT service layer.

A technique for user assisted shared secret key provisioning, e.g., as described in relation to FIG. 21, may be used in for the oneM2M/IoT service layer. FIG. 31 illustrates an example implementation in oneM2M.

In Step 1 of FIG. 31, a service subscriber/user logs into her TUA represented with <userAccount> resource in the foreign gateway or server. Assuming that the user has already created her new password, she uses her TAC as her username and newly created password to register herself with the TUA and access her TUA in the MN-CSE2.

The service subscriber/user may use ports in MN-CSE2 to initiate MN-CSE1 discovery. Followed by the successful discovery of MN-CSE1, service subscriber/user may have to authenticate with the MN-CSE1, and provide consent to import/export user profile data.

In Step 2, the MN-CSE1 may choose to secure the channel with TUA represented by <userAccount> resource in the MN-CSE2 using the technique of shared secret key provisioning. After agreement with MN-CSE2, service subscriber/user may be informed and directed to provision share secret.

In Step 3, the Service subscriber/user accepts to provision a shared secret key at the MN-CSE2. The key generation functionality may be supported by MEF/MAF in the oneM2M. It may receive the shared secret as input and generates a key, Kpm. This key may be provisioned for TUA represented by <userAccount> resource in the MN-CSE2. Service subscriber/user may then provision the derived key Kpm, to the MN-CSE1 as well. Both the gateways/servers securely store their shared secret keys (Kpm). As they store their keys, each server may set their expiration time, Ke of the key independently or, alternatively they may agree on a common expiration time, Ke after the Kpm has been exchanged. Completion of secret key's secure storage may also trigger beginning of timer for key's expiration. MN-CSE1 may be the entity that makes the key expiration decision as it is the entity that holds the user profile data. However, having its own independent expiration time for the key at MN-CSE2 may help avoid temporary key from being misused or abused.

In Step 4, the two parties may agree on a new session key (Ks) for encryption, to exchange rest of the messages.

Access Control Policies oneM2M/IoT service layer has a well-established ACP framework. Based on the requirements for the scenarios explored herein, it may be desirable to construct special Access Control Policies (ACPs), such as Personally Identifiable Information (PII) Centric ACPs or Extended-Parameter ACPs (EPACP.)

Personally Identifiable Information (PII) Centric ACPs may be useful, for example, where a user in a foreign oneM2M/IoT gateway or server has made selection on what user profile data to import from her home gateway or server, the foreign oneM2M/IoT gateway or server may send request for a selected set of user profile data to the home oneM2M/IoT gateway or server. Hence, home gateway or server may be configured with PII centric ACPs. Table 18 Shows examples of PII that are protected by these PII centric policies. PII resources and attributes may be identified and restricted to be exported with user consent or condition like the requests from a foreign gateway or server.

indicated in a request message as specified in TS-0003 V3.8, this disclosure proposes extended parameter depicted in Table 11 of the Appendix in the message request.

The extended parameter introduced in this clause may be embodied as parameters of an accessControlObjectDetails. accessControlObjectDetails is a parameter of an access-control-rule-tuple in oneM2M.

Table 12 of the Appendix shows example parameters for an access control policy.

TABLE 11

Optional Parameters in the Request Message

| Parameter | Description | Usage in access control mechanism |
| --- | --- | --- |
| Device Category | Category or class of target resource or attribute. | Device category or class identifier denoted by an intuitive name, number, symbol etc. For example, "deviceCategory" = "HealthMonitoring" |
| Authority Level | Authority level of the requesting user | Authority level for instance may indicate as read only, read and write, or write only access etc. For example "Tier III User" = {"TVchannels" : {'cartoon network', 'necoledian', 'kids', 'Animal_Planet'}, "time" : "11AM to 1 PM", "7PM to 8PM"}, {"day", "Friday-to-Sunday"}} |
| Function Type | Functionality of the devices. | Access may be limited or permitted based on device function type. For example, "function_type" : {" record_and_play", "surveillance", "sense_and_send"} |
| DataRange | Range of data as targeted resource or attribute. | Data range identifier commonly represented with boundary names/numbers. For example, Dec. 12, 2018 to Dec. 17, 2018, Sunday-Monday, 2 hour period average throughout the day from Dec. 12, 2018 to Dec. 18, 2018. |

Another set of access control policies that oneM2M/IoT home gateway or server may use to flexibly handle request and response are, Extended-Parameter Access Control Policies (EPACP). Attribute-based access control (ABAC) policies have been used in oneM2M/IoT service layer. Attributes used in current oneM2M/IoT systems are known as parameters. Those systems already have some use of parameters, but are limited. Therefore, to generate a flexible yet robust ACPs, this disclosure introduces EPACP. EPACP may allow users to define additional parameters or attributes such as device type, device functions, data_range etc., and use those parameters in the ACPs. Instead of defining ACPs for each object, adding defined number of parameters into the security system and incorporating them in the ACPs can save processing time and as well as provide OSA with simplicity to define new set of policies added flexibility. Additionally, even PII centric ACPs may also be represented by using EPACPs. Table 19 describes the parameters for EPACPs.

Code Example 2 of the Appendix illustrates a way of implementing an EPACP.

---
Code Example 2
EPACP
---

```
...
permit == Read if {
    "category" : "Health" AND "dev_function_type" : "sensor" AND
"data_range" : "12:00AM, Dec 21, 2017 to 12:00AM, Dec 28, 2017
}
...
```

To serve a request that demands access of resources and attributes based on extended attributes/parameters, an access request in oneM2M/IoT service layer may contain parameters to signify the request. In addition to parameters already

TABLE 12

Optional Parameters in the Access Control Policy

| Parameter | Usage Description | Formats |
| --- | --- | --- |
| DeviceCategory | Resource category on which access control rule applies. | Resource type list. |
| DataRange | Set of items on which access control rule applies. | Resource type list. |
| Authority Level | Operation function on which access control applies. | Resource type list. |
| Function Type | Name of the functionality on which access control applies. | Resource type list. |

User Profile Aliasing for Privacy

User profile aliasing for privacy may be used through data integration with a GUP in the foreign gateway or server, or through user profile aliasing in home gateway or server and integration in the foreign gateway or server, for example.

Data Integration with a Generic User Profile in a Foreign Gateway or Server

Data integration with a generic user profile in a foreign gateway or server may be achieved in a number of ways. The structure of a user profile in a oneM2M/IoT SL user account may structure as depicted in FIG. 32. It shows a gateway or server represented as a <remoteCSE> that has a child resource <userAccount>, which represents TUA of a user. <userAccount> has child resources <userProfile> and <accessControlPolicy> shown in the figure. There may be other child resources. There are attributes particular to the <userAccount> resource such as account-ID, TemporaryAccessCode etc. FIG. 32 also shows <userProfile> resource has its child resources <associatedUser> and <applications>. <associatedUser> defines any secondary users that service subscriber/user (primary user) may have given access to. <applications> may refer to applications that is related to user profile control. User profile also has several attributes such as name, subscriber-ID, streetAddress, unitType, and linkedAE. The description of these attributes was given in Table 26.

A technique for importing and integrating of user data, such as the technique discussed in relation to FIG. 27, may be used adopted in a oneM2M/IoT service layer system. An example is illustrated in FIG. 33, where user profile data is imported from MN-CSE1 and integrated into MN-CSE2.

Figure 33:
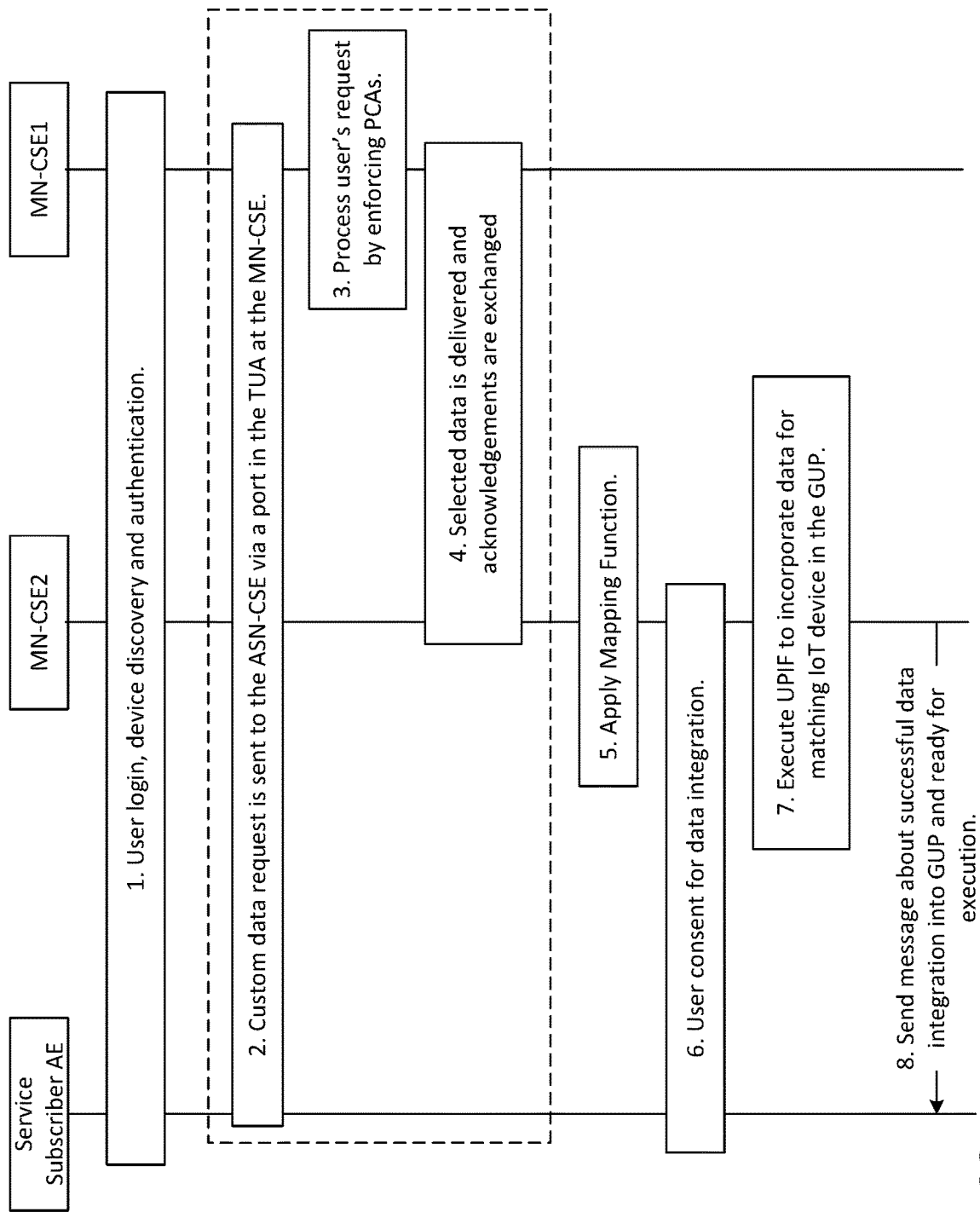
FIG. 33 is a call flow of an example process for importing and Integration of User Data from home gateway or server into foreign gateway or server.

In Step 1 of FIG. 33, a service subscriber/user logs onto the MN-CSE2 using TAC and password via an AE; initiates MN-CSE1 discovery; and authenticates herself with the MN-CSE1, upon discovery.

In Step 2, the service subscriber/user may make customized data requests to the MN-CSE1 via a port in the TUA. The service subscriber/user may select data individually or as a category to import, based on devices linked with the GUP. For example, in a smart hotel scenario, the user may just import thermostat usage data or choose to import data category of "Home_Convenience" which may involve all the devices and data involving smart home system such as smart thermostat, smart refrigerator, smart TV, smart voice assistant and so on. User may choose to import single data from as little as one device as well. User request message parameters that were newly introduced are depicted in Table 11 of the Appendix.

In Step 3, upon receipt of the request from the MN-CSE2, MN-CSE1 may enforce access control policies and select data requested to deliver it to the service subscriber/user. It may also include enforcement of PCAs as discussed previously.

Table 19 presents some extended parameterized (attribute-based) access control policies applicable to scenarios close to the ones discussed in this disclosure, which provides OSA a convenience to configure ACPs for large variety and number of devices in the oneM2M/IoT service layer systems that help to enforce ACPs on select set of target nodes, AEs or CSEs and their data at a time, based on the extended-parameters/attributes.

In Step 4, MN-CSE1 sends the requested <node>, <AE>, or <CSE> and their attributes data or information to the user at MN-CSE2.

In Step 5, MN-CSE2 consists of a Mapping Function. The Mapping Function identifies the imported data/information, identifies matching oneM2M/IoT nodes, AEs or CSEs, and integrates the corresponding imported data. For instance, if a <node> is matching, the imported usage data about the matching <node> from the home gateway or server is configured in the matched <node> resource's child resources and attributes.

In Step 6, MN-CSE2 sends a notification to the service/user about suitable or matching or non-matching data/information. The mapping may depend on various metrics not limited to data formats, device types, device functionality, model number, compatibility description, version, manufacturer, standards or, agreement between manufacturers of different devices with similar functionality etc. In addition to notification, MN-CSE2 may ask for user's consent to integrate mapped data into the MN-CSE2, which may involve incorporation of imported data into the GUP. This may involve updating the device, application, or service layer resources and attributes in the generic <userProfile> resource. User may provide consent for data integration.

In Step 7, upon receiving a consent from user, MN-CSE2 executes UPIF to integrate matching user profile data into the GUP. For example, if there exists a Nest thermostat at user's home oneM2M/IoT SL gateway or server, and say, 1 week of temperature information along with date and time is imported into foreign oneM2M/IoT SL gateway or server. But there exists a Samsung thermostat at the foreign location (for example, smart hotel). Provided that two manufacturers have business as well as technical agreement on data integration, that is agreement on data format, Nest's thermostat data may be integrated with Samsung's data, assuming the GUP at the foreign gateway or server has the Samsung thermostat device linked to it as a resource.

Alternative technique by which ACPs may be established around the resource and attributes of the mapped nodes, CSE or AEs may be carried out at this point. MN-CSE2 may configure <accessControlPolicies> resources with TAC centric privileges around the mapped, imported and integrated <node>, <CSE> or <AE> resources in the <userProfile> resource (GUP) with TAC. This way service subscriber/user with TAC may have limited or temporary access towards the resources of the GUP in TUA.

In Step 8, the MN-CSE2 sends a message to the user via an AE about successful integration of imported data into the <userAccount> resource and the generic <userProfile> resource in MN-CSE2, and indicates that these data can now be executed.

Importing and Integrating Aliased User Profile

Importing and integrating an aliased user profile may also be implemented in a oneM2M/IoT SL system. An example is illustrated in FIG. 34, where an aliased user profile (AUP) is exported from MN-CSE1 to MN-CSE2 when an authenticated user requests for her user profile.

Figure 34:
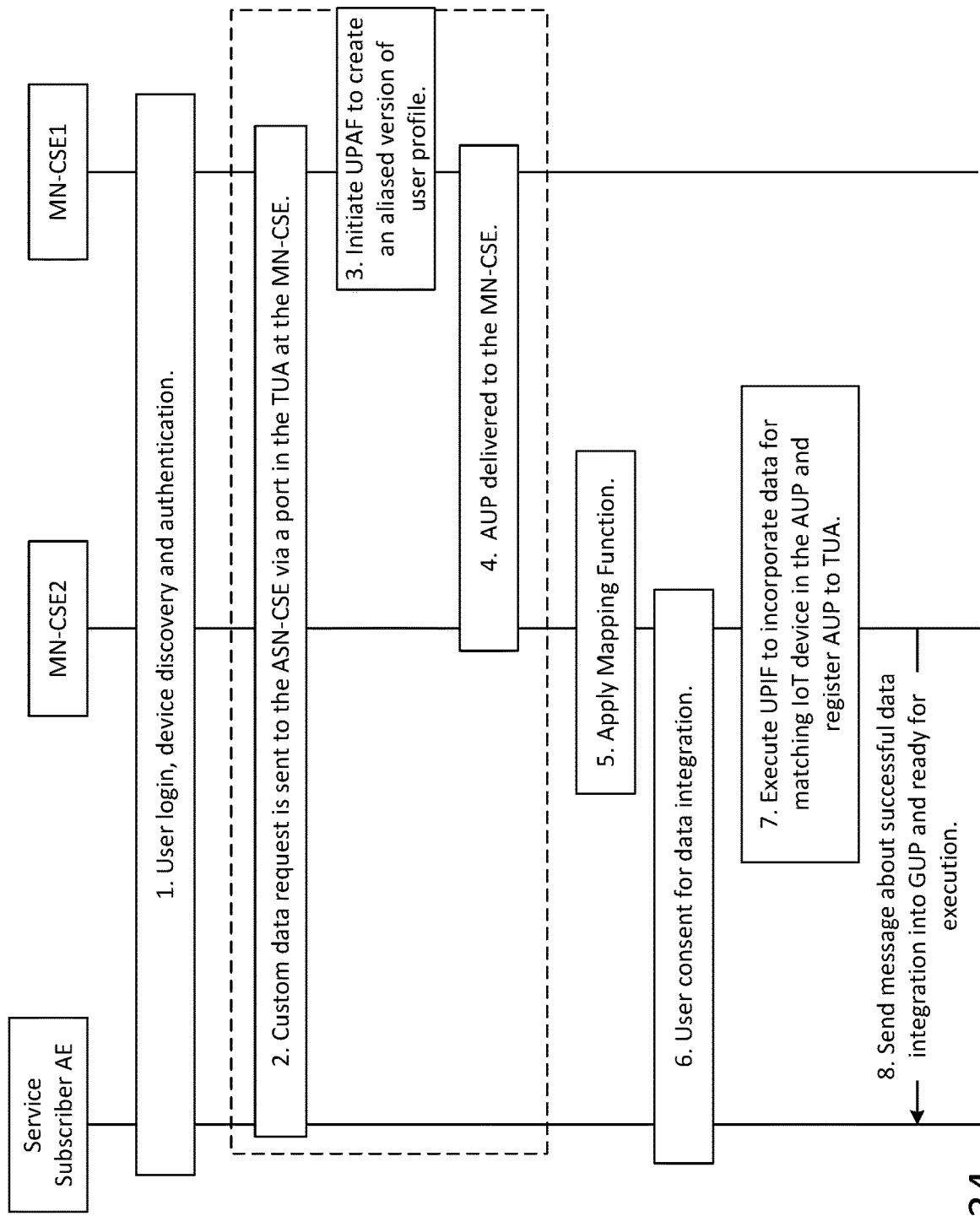
FIG. 34 is a call flow of an example process for user profile aliasing, transport, and integration from home gateway or server to foreign gateway or server.

In Step 1 of FIG. 34, a service subscriber/originator/data subject/user logs onto her TUA represented by <userAccount> resource in the MN-CSE2 using TAC and password and initiates MN-CSE1 discovery. MN-CSE2 notifies the service subscriber/user of the device discovery. MN-CSE1 may demand service subscriber/user pass the authentication check before requesting the transport of user profile.

In Step 2, the service subscriber/user may make customized data requests to the MN-CSE1 via a port in the TUA. The service subscriber/user may select data individually or as a category to import, based on devices linked with the GUP. For example, in a smart hotel scenario, the user may just import thermostat usage data or choose to import data category of "Home_Convenience" which may involve all the devices and data involving smart home system such as smart thermostat, smart refrigerator, smart TV, smart voice assistant and so on. User may choose to import single data from as little as one device as well. User request message parameters that were newly introduced are depicted in Table 11 of the Appendix.

In Step 3, the As the MN-CSE1 receives the request, it initiates User Profile Aliasing Function (UPAF), which creates an aliased version of user profile. UPAF may involve the one or more of the following operations.

First, the UPAF may involve making a copy of existing user profile.

Second, the UPAF may involve substituting user's name/ID with an alias. An alias may be chosen by a user or it may be a randomly generated alphanumeric numbers, characters, or symbols. Rules for the alias may include, for example, that the alias may not match any of the user's profile information, such as: name; date of birth; assigned unique IDs; previously used aliases; any unique number used in the system; and any combination of characters used or matching information within the system. For example, profile name/ID SamHarris' name be replaced with 'Devon123', '4577123' or 'MX45RTU'.

Third, the UPAF may involve enforcement of access control policies that would allow or restrict requested user profile data or information (devices, applications, or service layer data).

Fourth, the UPAF may involve UPAF may then enforce PCAs.

Code Example 2 of the Appendix illustrates another way of implementing an access control.

In Step 4, MN-CSE1 sends user's AUP with selected node, AE, or CSE data/information within the AUP requested by the user at MN-CSE2.

In Step 5, MN-CSE2 may consist of a Mapping Function. The Mapping Function identifies the imported user profile data, identifies matching oneM2M/IoT nodes, AEs or CSEs registered with the MN-CSE2, and maps the corresponding imported AUP data.

In Step 6, the foreign gateway or server sends a notification about suitable or matching nodes, AEs or CSEs' data and the data that the Mapping Function was incapable of mapping to the service subscriber/user. The mapping may depend on various metrics not limited to data formats, type of devices, device functionality or, agreement between manufacturers of different devices with similar functionality and so on. MN-CSE2 asks for user's consent for integration of the mapped user profile data into the <userAccount> resource of MN-CSE2. Service subscriber/user may provide consent for integration of imported AUP data.

In Step 7, upon receiving a consent from user, MN-CSE2 executes the User Profile Integration Function (UPIF). The integration process may include several operations, such as: registering <userProfile> resource (AUP) in the <userAccount> parent resource (TUA); linking all the available and mapped oneM2M/IoT nodes, AEs or CSEs from imported AUP and updating the link keys; and updating mapped AUP's resources and attributes with matching MN-CSE2's resources and attributes data.

For example, the imported AUP data may have a matching Thermostat (say Thermo1) with a 1 week of discrete data. This discrete data may be posted as attributes of the matching Thermostat (say Thermo2) in the foreign server's CSE.

In the process of integrating <userProfile> resource (AUP) into the <userAccount> resource of MN-CSE2, access control policies pertaining to the <userProfile> resource is now granted only to the user of the <userAccount> resource in the MN-CSE2, who is the primary user for the user profile. Note that ACPs for primary and secondary users may remain intact about the AUP.

In Step 8, MN-CSE2 sends notification to the service subscriber about successful integration of imported AUP and data association into the MN-CSE2. This also indicates that the system is ready to be execute imported data in the MN-CSE2.

Data Protection by Erasure

Data protection using data erasure may be used in a oneM2M/IoT Service Layer. To protect the user data from the misuse against the user, this disclosure defines a notion of data protection by the technique of erasure after the data has been utilized. A function known as a Service Layer Data Erasure Management Function (DEMF) may be used to effect user data erasure and to reset or reboot IoT devices.

User data erasure may involve two steps process in a oneM2M/IoT service layer, e.g., erasing the <userProfile> resource and associated data and erasing the <userAccount> and associated data.

Note that erasing <userAccount> resource includes erasing <userProfile> and associated data. However, <userProfile> may be erased without erasing <userAccount>. There are primarily two techniques on which user data erasure process is based on. Each technique is described as follows:

Data Erasure Policies and Policies Provisioning

A data erasure process may be triggered by the participating user or by the underlying DEPs. A DEMF may consult the DEPs to make data erasure decisions. Table 22 presents DEPs used when data are erased either by the user or automatically by DEMF when a condition is met. Data erasure policies (DEPs) may be established by the owner of the data (user). DEMF may execute DEPs in oneM2M/IoT service layer. There are two scenarios where user may be able to set up DEPs. They are as follows:

Provisioning DEPs at the MN-CSE2

Figure 35:
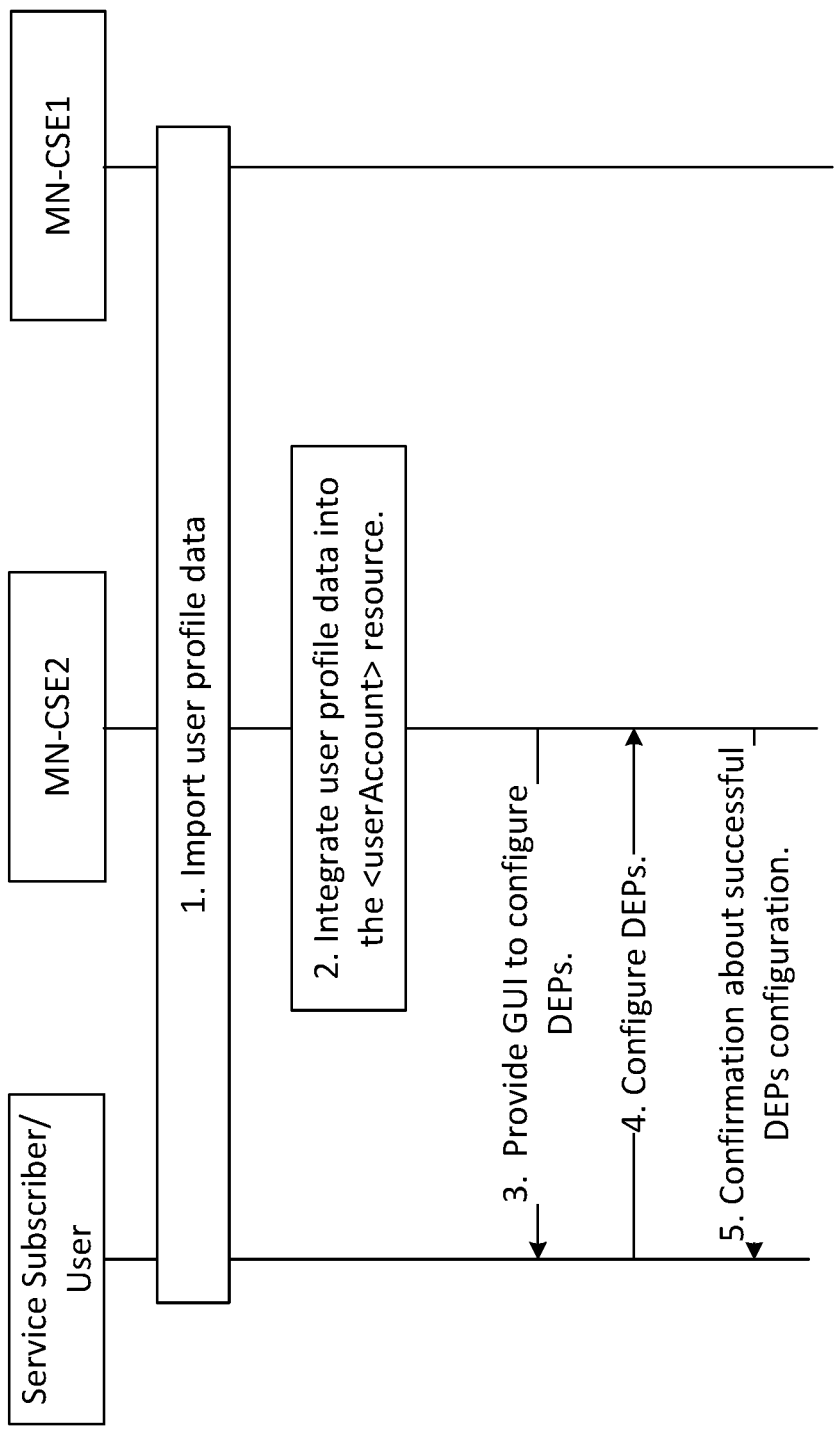
FIG. 35 is a call flow of an example process for user DEP provisioning at the foreign gateway or server.

An MN-CSE2 may host an AE responsible for GUI functionality required for DEP provisioning. Service subscriber/user may provision DEPs via the GUI after the user obtains TUA and imports service subscriber/user profile data into the GUP. FIG. 35 depicts the process of provisioning DEPs at the MN-CSE2 via an AE. Each step of the call flow in the figure is described thereafter.

In Step 1 of FIG. 35, the Service Subscriber/User has imported user profile data into the <userAccount> resource (TUA) at the MN-CSE2.

In Step 2, the MN-CSE2 integrates user profile data into the GUP represented as <userProfile> resource in the <userAccount> parent resource.

In Step 3, as the user profile data is integrated into the <userProfile> resource, Data Erasure Management Function (DEMF) may provide a GUI via an AE in the MN-CSE2, for the user to configure DEPs for her data. The GUI may consist of user-friendly select-and-confirm DEP configuration architecture.

In Step 4, the Service Subscriber/User may configure DEPs. For instance, service subscriber/user may choose date and time for data erasure, or just choose to select a default policy. A default policy may consist of a rule that would erase user data when the user's time of stay at the foreign location is over.

In Step 5, a confirmation on successful DEP configuration is sent to the service subscriber/user.

Provisioning DEPs at the MN-CSE1

Figure 36:
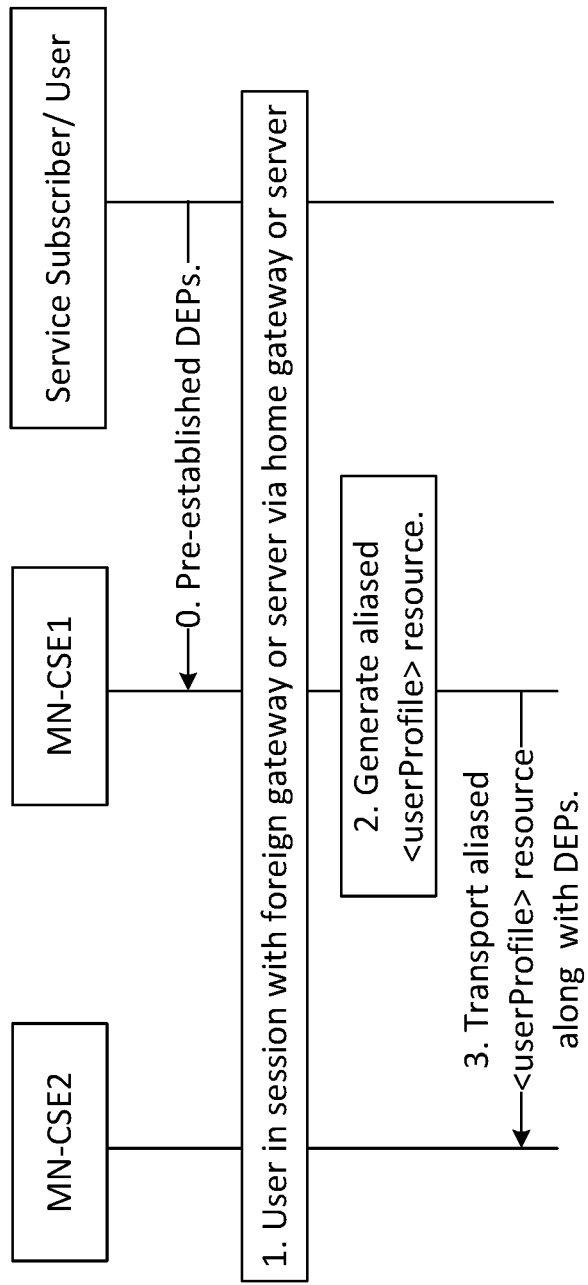
FIG. 36 is a call flow of an example process for user DEP provisioning about the AUP at the home gateway or server.

A user may be able to pre-configure DEPs at the MN-CSE1. When the UPAF in the MN-CSE1 completes aliasing a user profile, DEMF may incorporates DEPs along with the aliased <userProfile> resource. FIG. 36 shows the steps involves in configuring DEPs at the MN-CSE1 and transportation of DEPs along with aliased <userProfile> resource.

In Step 0 of FIG. 36, the Service subscriber/User may pre-configure DEPs at the MN-CSE1 before locating herself at location where MN-CSE2 is present.

In Step 1, when service subscriber/user reaches the location where MN-CSE2 is, she may initiate session with the MN-CSE1 via her TUA in the MN-CSE2. In this session, service subscriber/user may request to import aliased <userProfile> resource from the MN-CSE1.

In Step 2, an aliased <userProfile> resource is created by the UPAF at the MN-CSE1. DEMF may be triggered at this point to incorporate DEPs with the aliased <userProfile> resource.

In Step 3, as per the service subscriber/user's request, aliased <userProfile> resource along with the DEPs may be transported to the MN-CSE2.

Data Erasure by Intention

Figure 37:
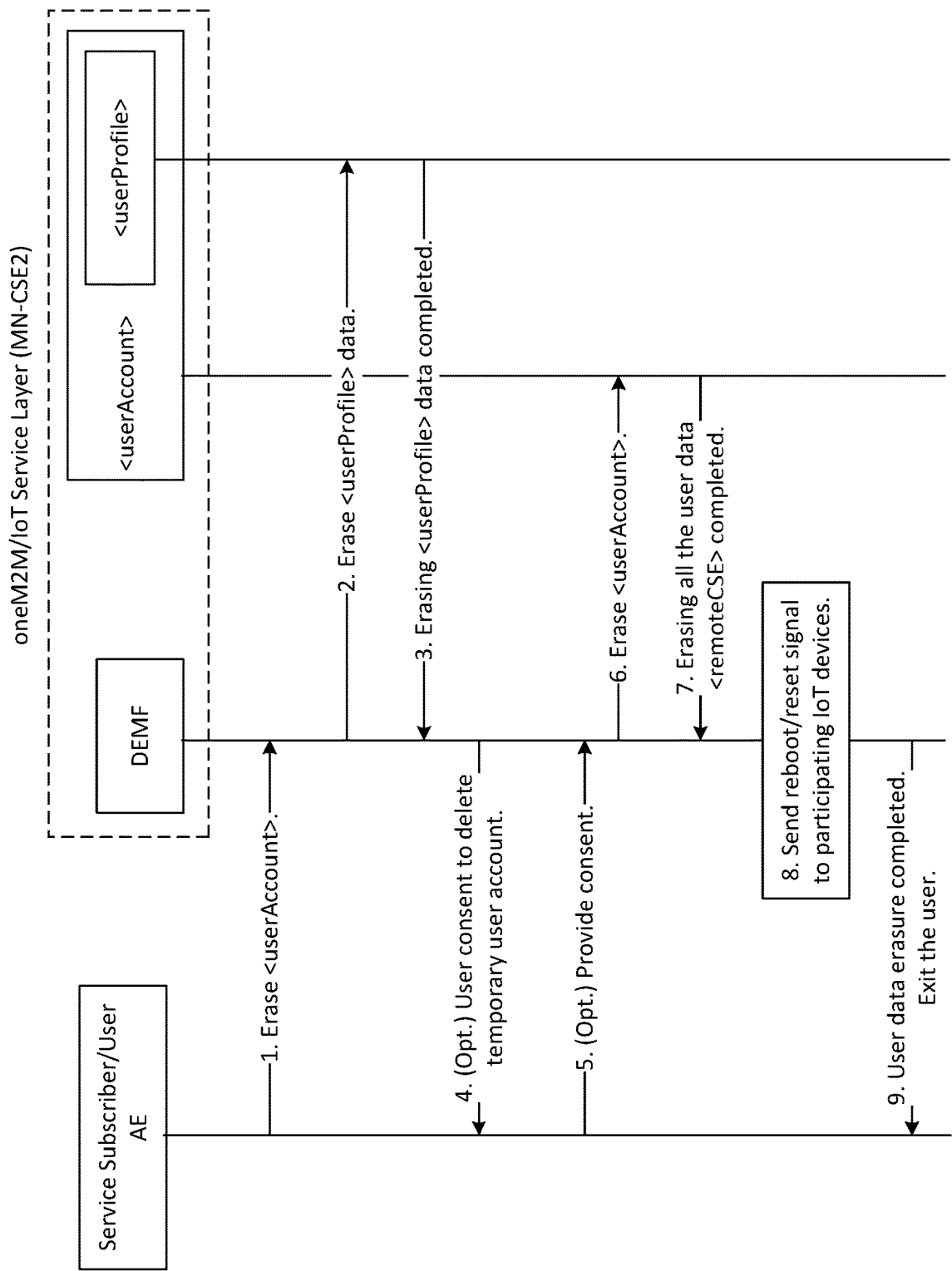
FIG. 37 is a call flow of an example process for user data erasure by intention in a oneM2M/IoT Service Layer.

Data erasure by user intention, as described in relation to FIG. 27, for example, may be used in a oneM2M/IoT service layer. FIG. 37 depicts the call flows for the process involved in the user data erasure process intentionally triggered by a user in an oneM2M/IoT service layer system. Each step is described below:

In Step 1 of FIG. 37, a user interface provides a user with a control icon to initiate the data erasure process. Using the icon, the user initiates the data erasure process, which is sent to the service layer Data Erasure Management Function (DEMF).

Alternatively, the data erasure process is initiated by some other intentional act of the user. For example, the process may be initiated by departure of the user through a smart door, or activating another special trigger such as a switch, or other signal generator. The user need not consciously trigger data erasure. Rather, the system may infer the need for erasure from another action taken by the user.

In Step 2, the As DEMF receives the data erasure command from the user, it sends data erasure command as per the DEMF policies depicted in Table 22. The DEMF checks for policies which confirms attributes such as, if: the user is authorized AND the command is for erasure AND applies to the data that is authorized to the user. Provided that the policy meets the criteria, DEMF erases the <userProfile> child resource and all the child resources and attributes under <userProfile> resource in the <userAccount> parent resource.

In step 3, upon completion of <userProfile> resource erasure, the DEMF receives completion of erasure message via an interpreter/API.

In Step 4, optionally, the user may be notified with a message to provide a consent before erasing her <userAccount> resource. This step may be important to prevent any unintentional erasure of <userAccount> resource. In addition, this step may be helpful in a scenario where user may just want to reset her AUP represented by <userProfile> resource while she may still want to use the same <userAccount> resource.

In Step 5, the user either provides consent to erase the <userAccount> resource or denies the request to erase. If the request to erase <userAccount> resource, it must be populated with new GUP or imported AUP.

In Step 6, upon user's consent, the DEMF erases the <userAccount> resource in the <remoteCSE> parent resource. DEMF may also be responsible for invalidating the TAC, which user had initially received. The TAC that acted as the username for the TUA may be invalidated at this point.

In Step 7, the DEMF receives the response for the completion of data erasure process from the system.

In Step 8, as the <userAccount> as well as <userProfile> resources have been erased, DEMF sends a reboot/reset signal to all the oneM2M/IoT nodes, AEs or CSEs.

There may exist non-oneM2M devices (for example, devices, or applications that do not use oneM2M/IoT service layer standard) in the IoT environment/network. In a scenario as such, non-oneM2M devices are assumed to be IoT devices of some form, and are configured to comply with the reboot/reset signal from the hosting oneM2M/IoT service layer. This requirement assumes that these non-oneM2M devices are capable of being reset or restarted.

Once the IoT devices are reset or restarted, a confirmation from the devices are received at the hosting oneM2M/IoT service layer, and clean states of the devices are logged in the DEMF. For instance, the values of the sensor reading may be set to null or zeros.

In Step 9, the A confirmation of <userAccount> and <userProfile> resources erasure may be sent to the user in the user interface to indicate the completion of erasure procedure. By then, user no longer possesses TUA, and hence, user is exited out from the account with a notification about the erasure of TUA.

Data Erasure by Trigger

Figure 38:
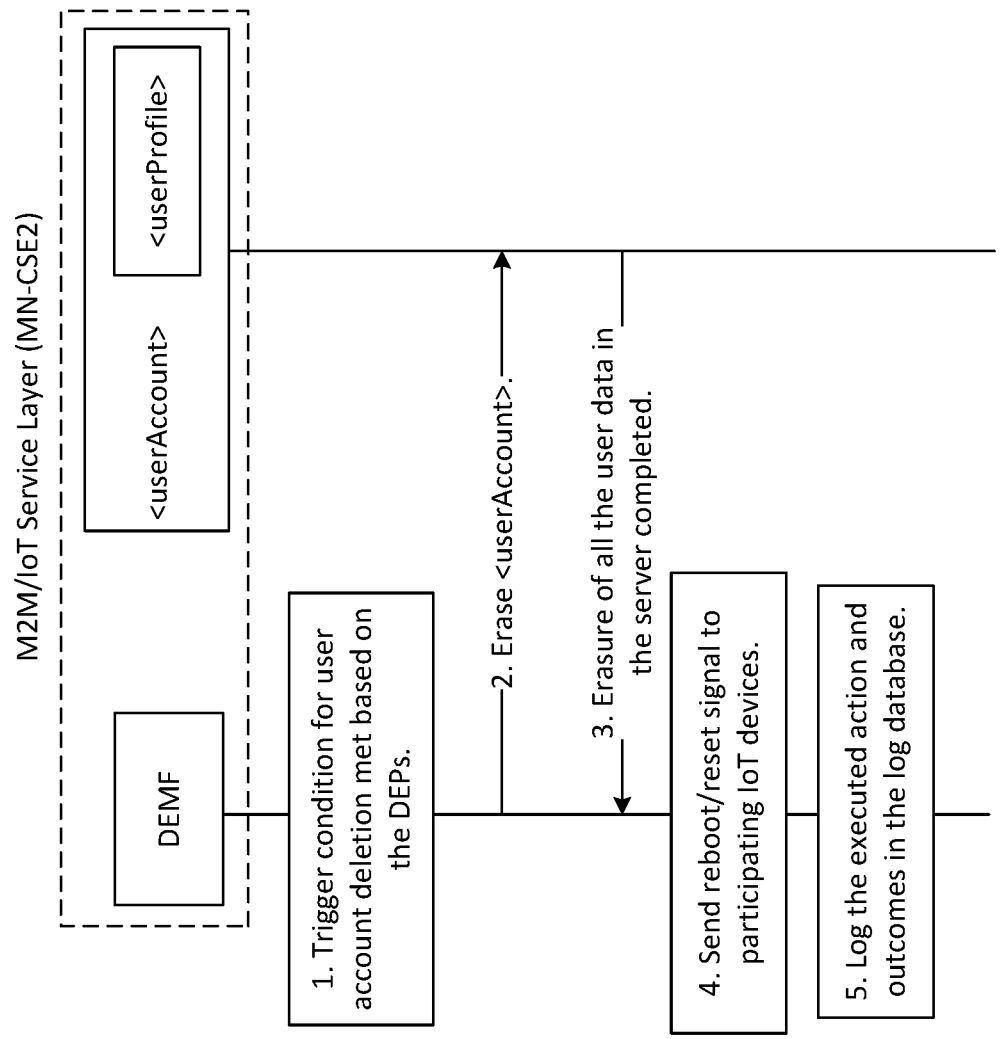
FIG. 38 is a call flow of an example process for data erasure based on predefined conditions in a oneM2M/IoT service layer system.

Another technique for data erasure that may be used in oneM2M/IoT deals with triggering data erasure procedure based on condition and data erasure policies (DEP). FIG. 38 shows an example call flow for a data erasure procedure that may be used when conditions for erasure are met. Example policies that enable data erasure process are depicted in Table 22.

In Step 1 of FIG. 38, the DEMF senses a trigger condition. For instance, the TAC that was provided to the user is meant to be short-lived. The TAC may expire as user's time of stay in the foreign location is over. Another instance may be when a user cancels her stay before the expiration of originally allotted time.

In Step 2, as the DEMF gets the expiration signal of the TAC for instance, it triggers a command to destroy <userAccount> resource data in the <remoteCSE> resource. <userAccount> resource also includes <userProfile> resource and corresponding child resources and attributes.

In Step 3, as the <userAccount> resource data erasure is completed, DEMF receives the notification for the completion of erasure of all the user data which also includes erasure of <userProfile> resource.

In Step 4, as the <userAccount> resource erasure is complete, DEMF sends a reboot/reset signal to all the oneM2M/IoT nodes, AEs or CSEs in the environment/network.

Additionally, there may exist non-oneM2M devices (for example, devices, or applications that do not use oneM2M service layer) in the IoT environment. In scenario as such, non-oneM2M devices are assumed to be IoT devices of some form, and may be configured to comply with the reboot/reset signal from the hosting oneM2M/IoT server.

In Step 5 of FIG. 38, once the IoT devices are reset/restarted, a confirmation from each device is received at the DEMF. The executed actions are documented and clean states of the devices are logged into the server.

As the erasure process completes, a confirmation about <userAccount> and <userProfile> resources data erasure is sent to the user in the user interface. By then, user may be exited out from her TUA as the user no longer possesses TUA. Additionally, notifications may be sent to the user in her mobile device via text messaging, via email or other forms of communication.

Note that DEMF may be applicable to a GUP in a TUA, even when user does not choose to import her user profile data from her home oneM2M/IoT gateway or server to foreign oneM2M/IoT gateway or server.

User Interfaces

Figure 39:
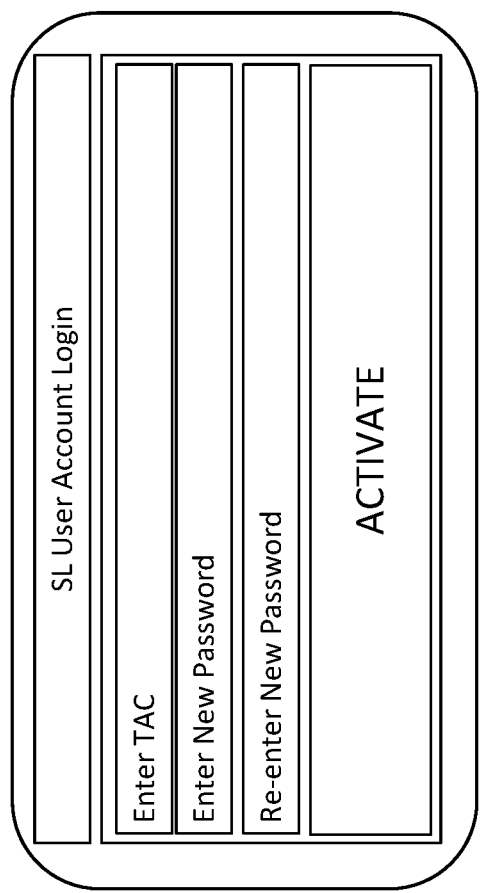
FIG. 39 illustrates an example user interface to activate a user account.

FIG. 39 shows an example interface used when a service subscriber/user activates her TUA at the foreign gateway or server (MN-CSE2). The user data security and privacy protection technique demands a service subscriber/user to enter the given TAC and a new password for the account. FIG. 39 shows one text object to enter TAC and two text objects to enter and re-enter a new password, respectively. It further shows a button object with 'Activate' command. A service subscriber/user may press the ACTIVATE button after entering given TAC and the chosen password to activate a temporary user account (TUA).

FIG. 40 shows a user login interface, which allows service subscriber/user to sign in using a TAC and pre-registered password. A user login management interfaces depicted in FIG. 39 and FIG. 40 may be embodied in the oneM2M/IoT service layer by an AE designed for login functionality. However, the actual data and access control may be managed by the foreign gateway or server (MN-CSE2).

Figure 41:
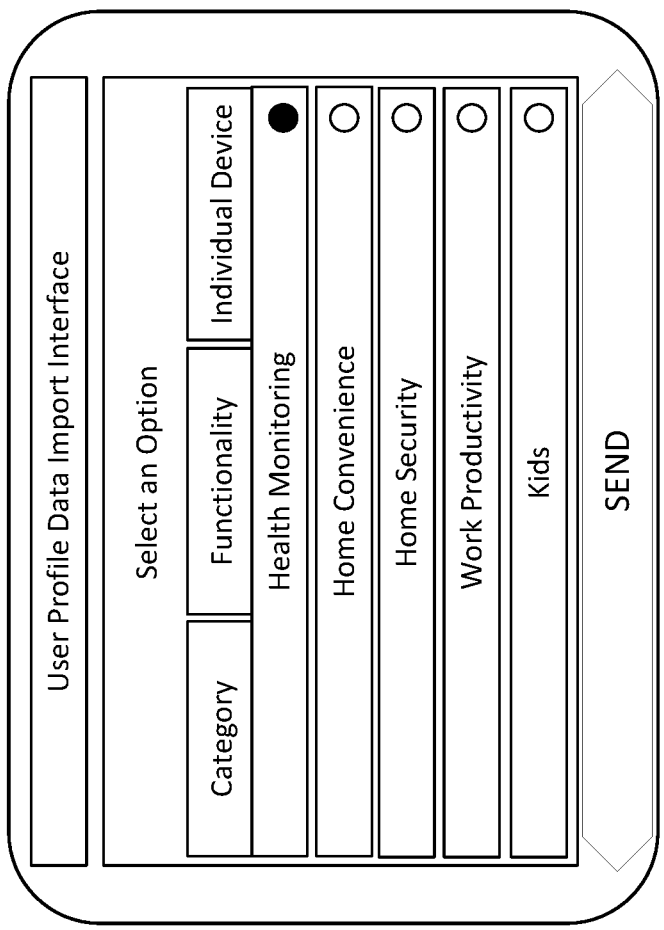
FIG. 41 illustrates an example user interface at a foreign oneM2M/IoT gateway or server.

FIG. 41 shows a sample user interface typically used by a user at the foreign oneM2M/IoT gateway or server (MN-CSE2) while making a request to import user profile or user profile data from her home oneM2M/gateway or server (MN-CSE1).

FIG. 41 also shows three different options for selection, namely, category, functionality, and individual device. For Category option, the interface lists five different category selections among which, Health Monitoring is shown as 'selected', marked with a black dot on the right-hand side. Multiple items from an option could be selected at a time.

Example Implementation Frameworks

FIG. 27 is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, M2M gateway, M2M server, or M2M service platform may be a component or node of the IoT/WoT as well as an IoT/WoT Service Layer, etc. Any of the client, proxy, or server devices illustrated in any of FIGS. 23, 25, 27-32, 34-35, and 37-42 may comprise a node of a communication system, such as the ones illustrated in FIGS. 23, 25, 27-32, 34-35, and 37-42.

Figure 42A:
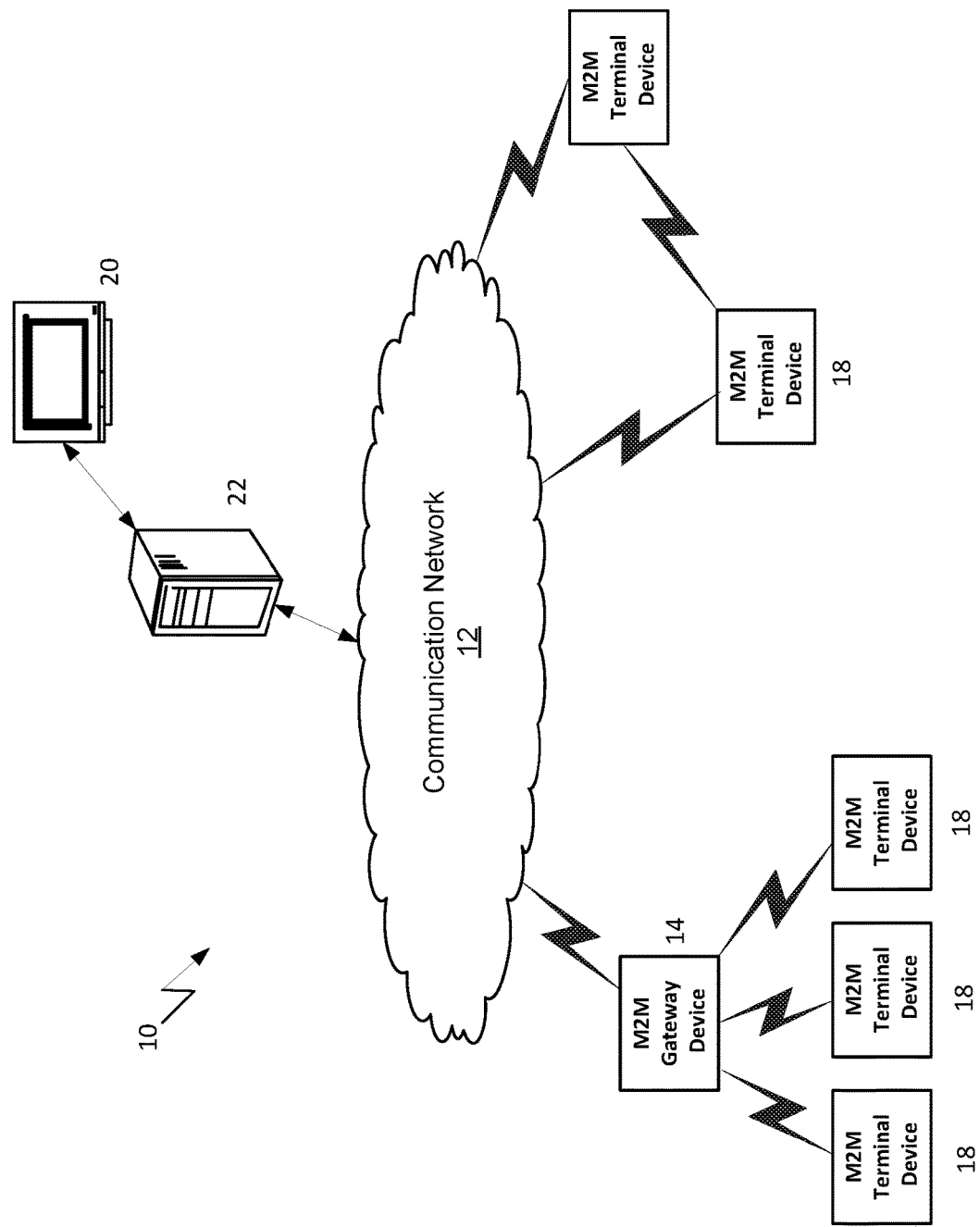
FIG. 42A illustrates an exemplary machine-to-machine (M2M) or Internet of Things (IoT) communication system in which the disclosed subject matter may be implemented.

FIG. 42A is a diagram of an example machine-to machine (M2M), Internet of Things (IoT), or Web of Things (WoT) communication system 10 in which one or more disclosed concepts associated with automated IoT device configuration using user profile may be implemented (e.g., FIG. 7-FIG. 14 and accompanying discussion). Generally, M2M technologies provide building blocks for the IoT/WoT, and any M2M device, M2M gateway or M2M service platform may be a component of the IoT/WoT as well as an IoT/WoT service layer, etc.

As shown in FIG. 42A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may comprise of multiple access networks that provides content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 42A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain includes M2M gateways 14 and terminal devices 18. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals via the communication network 12 or direct radio link. The M2M gateway device 14 allows wireless M2M devices (e.g. cellular and non-cellular) as well as fixed network M2M devices (e.g., PLC) to communicate either through operator networks, such as the communication network 12 or direct radio link. For example, the M2M devices 18 may collect data and send the data, via the communication network 12 or direct radio link, to an M2M application 20 or M2M devices 18. The M2M devices 18 may also receive data from the M2M application 20 or an M2M device 18. Further, data and signals may be sent to and received from the M2M application 20 via an M2M service layer 22, as described below. M2M devices 18 and gateways 14 may communicate via various networks including, cellular, WLAN, WPAN (e.g., Zigbee, 6LoWPAN, Bluetooth), direct radio link, and wireline for example.

Figure 42B:
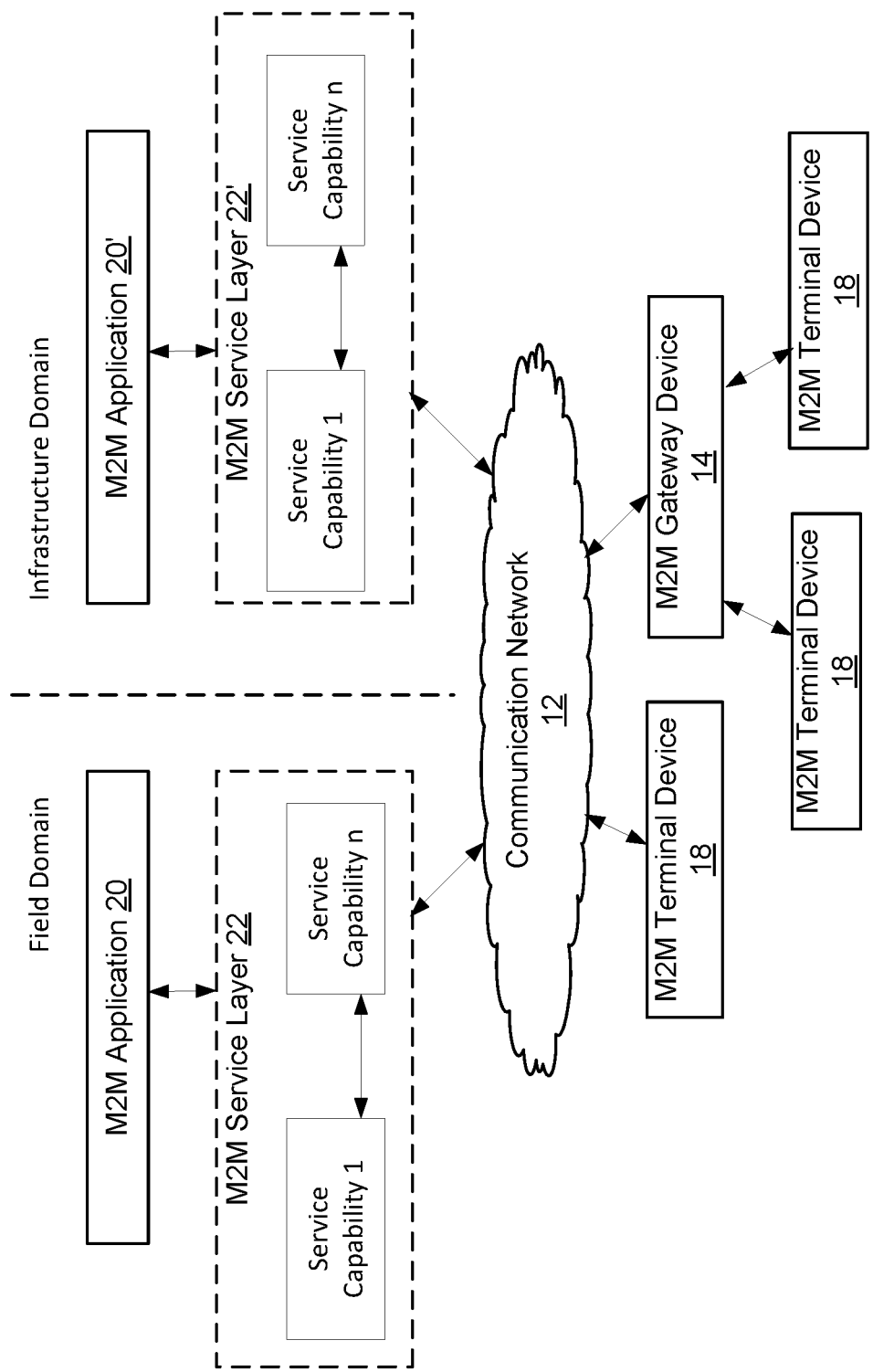
FIG. 42B illustrates an exemplary architecture that may be used within the M2M/IoT communications system illustrated in FIG. 42A.

Referring to FIG. 42B, the illustrated M2M service layer 22 in the field domain provides services for the M2M application 20 (e.g., AE 170 or device 110), M2M gateway devices 14, and M2M terminal devices 18, and the communication network 12. It will be understood that the M2M service layer 22 may communicate with any number of M2M applications, M2M gateway devices 14, M2M terminal devices 18, and communication networks 12 as desired. The M2M service layer 22 may be implemented by one or more servers, computers, or the like. The M2M service layer 22 provides service capabilities that apply to M2M terminal devices 18, M2M gateway devices 14 and M2M applications 20. The functions of the M2M service layer 22 may be implemented in a variety of ways, for example as a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12' in the infrastructure domain. M2M service layer 22' also provides services for the M2M gateway devices 14 and M2M terminal devices 18 in the field domain. It will be understood that the M2M service layer 22' may communicate with any number of M2M applications, M2M gateway devices and M2M terminal devices. The M2M service layer 22' may interact with a service layer by a different service provider. The M2M service layer 22' may be implemented by one or more servers, computers, virtual machines (e.g., cloud/computer/storage farms, etc.) or the like.

Referring also to FIG. 42B, the M2M service layer 22 and 22' provide a core set of service delivery capabilities that diverse applications and verticals may leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layer 22 and 22' also enables M2M applications 20 and 20' to communicate through various networks 12 and 12' in connection with the services that the service layer 22 and 22' provide.

In some examples, M2M applications 20 and 20' may include desired applications that communicate using automated IoT device configuration using user profile, as disclosed herein. The M2M applications 20 and 20' may include applications in various industries such as, without limitation, transportation, health and wellness, connected home, energy management, asset tracking, and security and surveillance. As mentioned above, the M2M service layer, running across the devices, gateways, and other servers of the system, supports functions such as, for example, data collection, device management, security, billing, location tracking/geofencing, device/service discovery, and legacy systems integration, and provides these functions as services to the M2M applications 20 and 20'.

The method, systems, and apparatuses of automated IoT device configuration using user profile of the present application may be implemented as part of a service layer. The service layer is a middleware layer that supports value-added service capabilities through a set of application programming interfaces (APIs) and underlying networking interfaces. An M2M entity (e.g., an M2M functional entity such as a device, gateway, or service/platform that is implemented on hardware) may provide an application or service. Both ETSI M2M and oneM2M use a service layer that may include the methods, systems, and apparatuses automated IoT device configuration using user profile of the present application. The oneM2M service layer supports a set of Common Service Functions (CSFs) (i.e., service capabilities). An instantiation of a set of one or more particular types of CSFs is referred to as a Common Services Entity (CSE), which may be hosted on different types of network nodes (e.g., infrastructure node, middle node, application-specific node). Further, the methods, systems, and apparatuses of automated IoT device configuration using user profile of the present application may be implemented as part of an M2M network that uses a Service Oriented Architecture (SOA) or a resource-oriented architecture (ROA) to access services such as the methods, systems, and apparatuses of automated IoT device configuration using user profile of the present application.

As disclosed herein, the service layer may be a functional layer within a network service architecture. Service layers are typically situated above the application protocol layer such as HTTP, CoAP or MQTT and provide value added services to client applications. The service layer also provides an interface to core networks at a lower resource layer, such as for example, a control layer and transport/access layer. The service layer supports multiple categories of (service) capabilities or functionalities including a service definition, service runtime enablement, policy management, access control, and service clustering. Recently, several industry standards bodies, e.g., oneM2M, have been developing M2M service layers to address the challenges associated with the integration of M2M types of devices and applications into deployments such as the Internet/Web, cellular, enterprise, and home networks. A M2M service layer may provide applications or various devices with access to a collection of or a set of the above mentioned capabilities or functionalities, supported by the service layer, which may be referred to as a CSE or SCL. A few examples include but are not limited to security, charging, data management, device management, discovery, provisioning, and connectivity management which may be commonly used by various applications. These capabilities or functionalities are made available to such various applications via APIs which make use of message formats, resource structures and resource representations defined by the M2M service layer. The CSE or SCL is a functional entity that may be implemented by hardware or software and that provides (service) capabilities or functionalities exposed to various applications or devices (i.e., functional interfaces between such functional entities) in order for them to use such capabilities or functionalities.

Figure 42C:
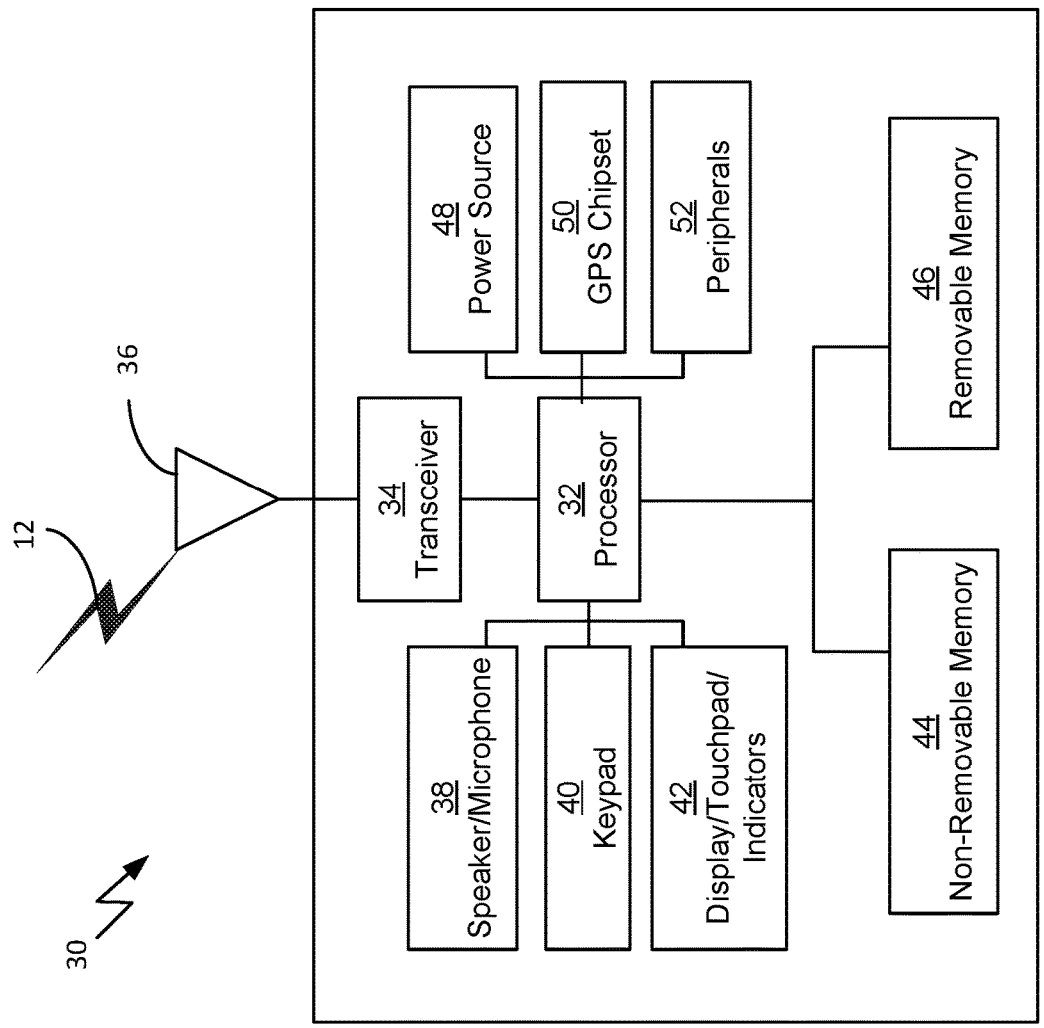
FIG. 42C illustrates an exemplary M2M/IoT terminal or gateway device that may be used within the communications system illustrated in FIG. 42A.

FIG. 42C is a system diagram of an example M2M device 30, such as an M2M terminal device 18 (which may include AE 170 or device 110) or an M2M gateway device 14 (which may include one or more components of FIG. 13), for example. As shown in FIG. 42C, the M2M device 30 may include a processor 32, a transceiver 34, a transmit/receive element 36, a speaker/microphone 38, a keypad 40, a display/touchpad 42, non-removable memory 44, removable memory 46, a power source 48, a global positioning system (GPS) chipset 50, and other peripherals 52. It will be appreciated that the M2M device 30 may include any sub-combination of the foregoing elements while remaining consistent with the disclosed subject matter. M2M device 30 (e.g., device 110, AUM-C 111, AUM-S 112, MN-CSE 171, IN-CSE 172, AE 170, and others) may be an exemplary implementation that performs the disclosed systems and methods for automated IoT device configuration using user profile. This node may be a node that implements data protection for mobile IoT users, e.g., in relation to the methods described in reference to FIG. 19, FIG. 21, FIG. 27-FIG. 28, FIG. 30-FIG. 31, and FIG. 33-FIG. 38 or the data structures of FIG. 18, FIG. 20, FIG. 22, FIG. 32, or FIG. 29, Table 2-Table 12, Code Examples 1-2, or in a claim.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 32 may perform signal coding, data processing, power control, input/output processing, or any other functionality that enables the M2M device 30 to operate in a wireless environment. The processor 32 may be coupled with the transceiver 34, which may be coupled with the transmit/receive element 36. While FIG. 42C depicts the processor 32 and the transceiver 34 as separate components, it will be appreciated that the processor 32 and the transceiver 34 may be integrated together in an electronic package or chip. The processor 32 may perform application-layer programs (e.g., browsers) or radio access-layer (RAN) programs or communications. The processor 32 may perform security operations such as authentication, security key agreement, or cryptographic operations, such as at the access-layer or application layer for example.

The transmit/receive element 36 may be configured to transmit signals to, or receive signals from, an M2M service platform 22. For example, the transmit/receive element 36 may be an antenna configured to transmit or receive RF signals. The transmit/receive element 36 may support various networks and air interfaces, such as WLAN, WPAN, cellular, and the like. In an example, the transmit/receive element 36 may be an emitter/detector configured to transmit or receive IR, UV, or visible light signals, for example. In yet another example, the transmit/receive element 36 may be configured to transmit and receive both RF and light signals. It will be appreciated that the transmit/receive element 36 may be configured to transmit or receive any combination of wireless or wired signals.

In addition, although the transmit/receive element 36 is depicted in FIG. 42C as a single element, the M2M device 30 may include any number of transmit/receive elements 36. More specifically, the M2M device 30 may employ MIMO technology. Thus, in an example, the M2M device 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the M2M device 30 may have multi-mode capabilities. Thus, the transceiver 34 may include multiple transceivers for enabling the M2M device 30 to communicate via multiple RATs, such as UTRA and IEEE 802.11, for example.

The processor 32 may access information from, and store data in, any type of suitable memory, such as the non-removable memory 44 or the removable memory 46. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other examples, the processor 32 may access information from, and store data in, memory that is not physically located on the M2M device 30, such as on a server or a home computer. The processor 32 may be configured to control lighting patterns, images, or colors on the display or indicators 42 in response to whether the automated IoT device configuration using user profile in some of the examples described herein are successful or unsuccessful (e.g., updating or authorizing different AUM-Cs, etc.), or otherwise indicate a status of automated IoT device configuration using user profile and associated components. The control lighting patterns, images, or colors on the display or indicators 42 may be reflective of the status of any of the method flows or components in the FIG.'S illustrated or discussed herein (e.g., FIG. 8-FIG. 10 and FIG. 12-FIG. 13, FIG. 19, FIG. 21, FIG. 27-FIG. 28, FIG. 30-FIG. 31, and FIG. 33-FIG. 38, etc.). Disclosed herein are messages and procedures of automated IoT device configuration using user profile. The messages and procedures may be extended to provide interface/API for users to request automated IoT device configuration using user profile via an input source (e.g., speaker/microphone 38, keypad 40, or display/touchpad 42). In an addition example, there may be a request, configure, or query of automated IoT device configuration using user profile information, among other things that may be displayed on display 42.

The processor 32 may receive power from the power source 48, and may be configured to distribute or control the power to the other components in the M2M device 30. The power source 48 may be any suitable device for powering the M2M device 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled with the GPS chipset 50, which is configured to provide location information (e.g., longitude and latitude) regarding the current location of the M2M device 30 (e.g., a mobile device on the person of the user or a device proximate to the user, such as a scale or other sensor). It will be appreciated that the M2M device 30 may acquire location information by way of any suitable location-determination method while remaining consistent with information disclosed herein.

The processor 32 may further be coupled with other peripherals 52, which may include one or more software or hardware modules that provide additional features, functionality or wired or wireless connectivity. For example, the peripherals 52 may include various sensors such as an accelerometer, biometrics (e.g., fingerprint) sensors, an e-compass, a satellite transceiver, a sensor, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The transmit/receive elements 36 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The transmit/receive elements 36 may connect to other components, modules, or systems of such apparatuses or devices via one or more interconnect interfaces, such as an interconnect interface that may comprise one of the peripherals 52.

Figure 42D:
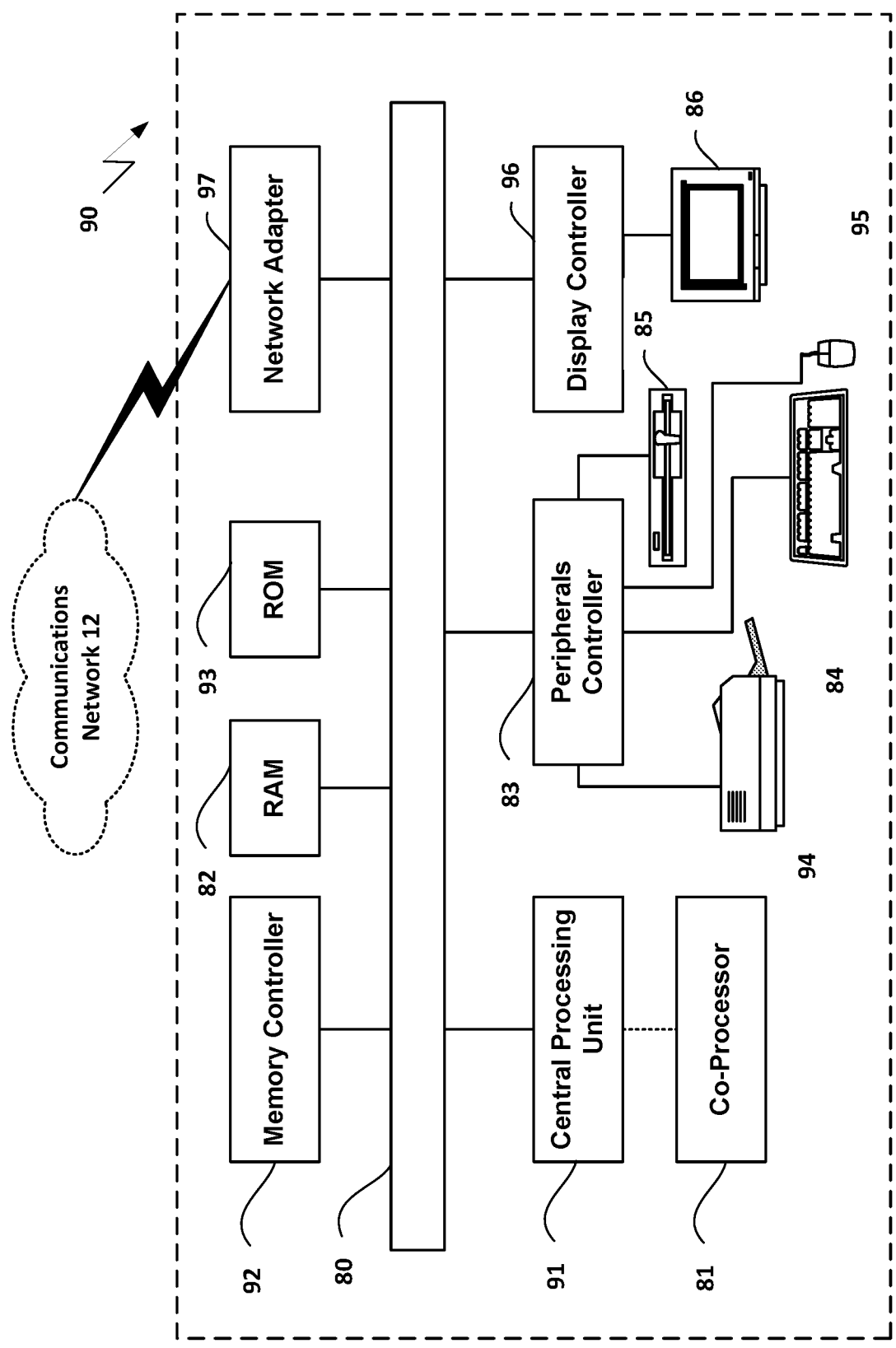
FIG. 42D illustrates an exemplary computing system in which aspects of the communication system of FIG. 42A.

FIG. 42D is a block diagram of an exemplary computing system 90 on which, for example, the M2M service platform 22 of FIG. 42A and FIG. 42B may be implemented. Computing system 90 (e.g., M2M terminal device 18 or M2M gateway device 14) may comprise a computer or server and may be controlled primarily by computer readable instructions by whatever means such instructions are stored or accessed. Such computer readable instructions may be executed within central processing unit (CPU) 91 to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 or coprocessor 81 may receive, generate, and process data related to the disclosed systems and methods for automated IoT device configuration using user profile, such as receiving management message for the automated IoT device configuration using user profile.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory devices coupled with system bus 80 include random access memory (RAM) 82 and read only memory (ROM) 93. Such memories include circuitry that allows information to be stored and retrieved. ROMs 93 generally include stored data that cannot easily be modified. Data stored in RAM 82 may be read or changed by CPU 91 or other hardware devices. Access to RAM 82 or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may include peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may include network adaptor 97 that may be used to connect computing system 90 to an external communications network, such as network 12 of FIG. 42A and FIG. 42B.

It is understood that any or all of the systems, methods and processes described herein may be embodied in the form of computer executable instructions (e.g., program code) stored on a computer-readable storage medium which instructions, when executed by a machine, such as a computer, server, M2M terminal device, M2M gateway device, or the like, perform or implement the systems, methods and processes described herein. Specifically, any of the steps, operations or functions described above may be implemented in the form of such computer executable instructions. Computer readable storage media include both volatile and nonvolatile, removable and non-removable media implemented in any method or technology for storage of information, but such computer readable storage media do not include signals per se. As evident from the herein description, storage media should be construed to be statutory subject matter. Computer readable storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other physical medium which may be used to store the desired information and which may be accessed by a computer. A computer-readable storage medium may have a computer program stored thereon, the computer program may be loadable into a data-processing unit and adapted to cause the data-processing unit to execute method steps associated with automated IoT device configuration using user profile when the computer program is run by the data-processing unit.

In describing preferred methods, systems, or apparatuses of the subject matter of the present disclosure—automated IoT device configuration using user profile, which may include data protection for mobile IoT users—as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to effectuate the methods described herein. As used herein, the terms "apparatus," "network apparatus," "node," "device," "network node," or the like may be used interchangeably. In addition, the use of the word "or" is generally used inclusively unless otherwise provided herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art (e.g., skipping steps, combining steps, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims.

Methods, systems, and apparatuses, among other things, as described herein may provide for means for automated IoT device or service layer configuration using user profile or secure ways to support user data privacy and security when data is imported and exported between gateways or servers. A Service Layer may be configured with a Service Layer profile of a user (e.g., user profile) which may include a user's preferred IoT device settings and based on a user entering a particular location and the available IoT devices in that location, the Service Layer using these preferred settings within the user profile may automatically configure (e.g., on the user's behalf) one or more IoT devices with these preferred settings. An apparatus may be operated by instructions that include: receiving an indication of location information of a device, wherein the location information comprises a current location of the device or forecasted location of the device; and creating a user profile for managing features of one more devices at the location associated with the location information. An apparatus may be operated by instructions that include: sending request to create an entry for obtaining a user profile associated with a first user; obtaining a response based on the request, the response comprising a service layer identifier of an application entity; and based on the response, creating the user profile associated with the first user. An apparatus (for example in the hotel use case) may be operated by instructions that include: obtaining a service layer profile of a user, wherein the service layer profile is associated with a user, and wherein the service layer profile includes a plurality of settings for one or more Internet of Things (IoT) devices (e.g., particular unique devices or model types of devices); based on the user being within a threshold location (e.g., with a certain radius of a GPS coordinate or address—such as 20 meters) and a first IoT device of the one or more IoT devices being available (e.g., powered on, error free, or not being used or reserved to be used) within the threshold location, obtaining a first setting from the service layer profile; and automatically configuring the one or more IoT devices with the first setting from the service layer profile. The automatic configuration may be responsive to obtaining the service layer profile (e.g., creating the service layer profile) or the current (or forecasted) location of the user into the new local. All combinations in this and the below paragraphs (including the removal or addition of steps) are contemplated in a manner that is consistent with the other portions of the detailed description.

In addition, methods, systems, and apparatuses, among other things, as described herein may provide for means for automated IoT device configuration using user profile or secure ways to support user data privacy and security when data is imported and exported between gateways or servers. A method, system, computer readable storage medium, or apparatus has means for receiving an indication of location information of a device, wherein the location information may include a current location of the device or forecasted location of the device; and creating a user profile for managing features of one more devices at the location associated with the location information. The device may be a mobile device associated with the user which may help track the location of the user. The forecasted location may include a reserved facility or vehicle. The reserved facility may include a hotel, office, manufacturing plant, etc. The reserved vehicle may include an airplane or an autonomous automobile. A method, system, computer readable storage medium, or apparatus has means for sending request to create an entry for obtaining a user profile associated with a first user; obtaining a response based on the request, the response may include a service layer identifier of an application entity; and based on the response, creating the user profile associated with the first user. The apparatus may be a user device. A method, system, computer readable storage medium, or apparatus has means for receiving a request to discover devices associated with a user profile for a common local location of user; based on the request, determining whether first information about the devices is already within the user profile of the apparatus; based on determining that the user profile does not include first information about the devices, sending a message to retrieve information from the devices associated with the user profile for the common local location of user; obtaining (e.g., receiving) the retrieved information; and based on the retrieved information, creating the user profile for the devices for the common local location of the user. The common local location of the user may be a home of the user, a vehicle of the user (e.g., may want to auto configure climate control, radio stations, or seats), work office of the user, work conference room of a user, a frequently visited store (e.g., may want auto configure displays, payment, or ordering), a frequently visited fitness center (e.g., may want to auto configure fitness machines or reservation systems for machines/courts), or another place where a significant or most amount of time is spent (e.g., greater than 20% of a day or ranked the most (or top 3) out of a plurality of locations). The common local location of the user may be defined by a frequency of use of a device at a previous location (e.g., number of times used within an hour, day, week, or month greater than a threshold frequency). The use may be defined by how much a user profile associated with the user is used to execute commands or the like on the device at the previous location. The method, system, computer readable storage medium, or apparatus has means for sending a response to the request that may include the created user profile. The apparatus may be a server. In an example, location of a user may be determined by a mobile device on the person of a user (e.g., a mobile phone or watch), external sensors (e.g., a camera on a wall at a location), or the like. The camera may communicate with a facial recognition system that may assist in determining the location of the user without the user carrying a mobile device. A previous location may include a common local location or another location that fits certain triggers such as a threshold recency of use (e.g., 30 minutes). The location of the user may be determined by obtain location information from a user device (e.g., mobile phone) or devices that senses the user's presence at a location, such as camera with facial recognition, or the like. All combinations in this and the below paragraphs (including the removal or addition of steps) are contemplated in a manner that is consistent with the other portions of the detailed description.

Further associated with subject matter disclosed above, methods, systems, and apparatuses, among other things, as described herein may provide for means for automated IoT device configuration using user profile or secure ways to support user data privacy and security when data is imported and exported between gateways or servers temporarily. A method, system, computer readable storage medium, or apparatus has means for receiving a request to discover devices associated with a service layer profile for a previous location of a user; based on the request, determining whether first information about the devices is already within the service layer profile of the apparatus; based on determining that the service layer profile does not include the first information about the devices, sending a message to retrieve information from the devices associated with the service layer profile for the previous location of the user; obtaining the retrieved information; based on the retrieved information, creating the service layer profile for the devices for the location of the user; and automatically configuring the devices with one or more settings from the created service layer profile. A method, system, computer readable storage medium, or apparatus has means for establishing (e.g., by a second apparatus) a temporary user account for a user of an application entity, the application entity residing on a first apparatus; establishing a secure connection with a third apparatus, the third apparatus being a home gateway or server for the user; receiving, from the third apparatus via the secure connection, a set of selected profile data, the set of selected profile data being derived from a user profile of the user, the user profile of the user residing on the third apparatus; and configuring, in accordance with the set of selected profile data, one or more Internet-of-things devices for use by the user. A method, system, computer readable storage medium, or apparatus has means for incorporating the set of selected profile information with a generic user profile. The set of selected profile data may be an aliased user profile. A method, system, computer readable storage medium, or apparatus has means for establishing the secure connection with the third apparatus that may include receiving, from the first apparatus, a key provisioned by the user to second apparatus and the third apparatus. A method, system, computer readable storage medium, or apparatus has means for obtaining, from the first apparatus, consent for the integration of the set of selected profile data into the temporary user account. A method, system, computer readable storage medium, or apparatus has means for maintaining a set of data erasure policies for the temporary user account; and erasing the temporary user account upon satisfaction of a data erasure criterion, the data erasure criterion being part of the set of data erasure policies. The data erasure criterion may be a detected deliberate action of the user. The data erasure criterion may be an expiration of a scheduled stay by the user in a vicinity of the second apparatus, or a cancellation of the scheduled stay. A method, system, computer readable storage medium, or apparatus has means for accepting, from the first apparatus (for example), changes to the set of data erasure policies. A method, system, computer readable storage medium, or apparatus has means for instructing the one or more Internet-of-things to erase data associated with the set of selected profile data. All combinations in this paragraph (including the removal or addition of steps) are contemplated in a manner that is consistent with the other portions of the detailed description.

Further associated with subject matter disclosed above, Methods, systems, and apparatuses, among other things, as described herein may provide for means for automated IoT device configuration using user profile or secure ways to support user data privacy and security when data is imported and exported between gateways or servers temporarily. A method, system, computer readable storage medium, or apparatus has means for acting (e.g., by a third apparatus) as a home gateway or server for a user; receiving, via a second apparatus from a first apparatus, a request to create a set of selected profile data from a user profile of the user, wherein the first apparatus implements an application entity in use by the user, and wherein the second apparatus is a foreign gateway or server; establishing, with the second apparatus, a secure connection; creating, based on the user profile of the user, the set of selected profile data; and sending, to the second apparatus via the secure connection, the set of selected profile data. The set of selected profile data is an aliased user profile. Establishing the secure connection with the third apparatus may include receiving, from the first apparatus, a key provisioned by the user to second apparatus and the third apparatus. Creating the set of selected profile data may include using an extended attribute based access control policy. All combinations in this paragraph (including the removal or addition of steps) are contemplated in a manner that is consistent with the other portions of the detailed description.

Further associated with subject matter disclosed above, Methods, systems, and apparatuses, among other things, as described herein may provide for means for automated IoT device configuration using user profile or secure ways to support user data privacy and security when data is imported and exported between gateways or servers temporarily. A method, system, computer readable storage medium, or apparatus has means for implementing (e.g., by a first apparatus) an application entity in use by a user; establishing a temporary user account on a second apparatus, the second apparatus being a foreign gateway or server; discovering a third apparatus, the third apparatus being a home gateway or server for the user; and sending, to the third apparatus, a request to create a set of selected profile data from a user profile of the user. The set of selected profile data may be an aliased user profile. The method, system, computer readable storage medium, or apparatus has means for provisioning, to the second apparatus and the third apparatus, a key for use in establishing a secure connection between the second apparatus and the third apparatus. The method, system, computer readable storage medium, or apparatus has means for providing, to the second apparatus, consent for the integration of the set of selected profile data into the temporary user account. The method, system, computer readable storage medium, or apparatus has means for configuring a set of data erasure policies for the temporary user account. The method, system, computer readable storage medium, or apparatus has means for triggering erasure of the temporary user account. All combinations in this paragraph (including the removal or addition of steps) are contemplated in a manner that is consistent with the other portions of the detailed description.

What is claimed:

1. An apparatus comprising:
    a processor; and
    a memory coupled with the processor, the memory comprising executable instructions that when executed by the processor cause the apparatus to operate as a first internet of things (IoT) server of a communications network, cause the first IoT server to provide a service for enabling secure importing of user profile data from a second IoT server, the processor configured to implement the service by effectuating operations comprising:
        receiving a request associated with a user, wherein the request is to import profile data of the user for one or more devices in a home of the user;
        sending a request to a second IoT server connected with the one or more devices to import profile data associated with the one or more devices in the home of the user;
        receiving a response from the second IoT server, the response comprising aliased profile data of the user for the one or more devices, wherein the second IoT server substitutes personally identifiable information within the profile data of the user with non-personally identifiable alias information;
        identifying one or more devices in the received profile data of the user that match one or more types of available devices connected with the first IoT server;
        sending a notification asking for consent to store the profile data of the user and apply it to the one or more devices, wherein the stored profile data of the user is encrypted based on a password received from the user, wherein the service receives a temporary key from the user, wherein the first IoT server uses the temporary key to establish trust with a second server for importing profile data of the user;
        receiving consent authorized by the user;
        storing the aliased profile of the user;
        sending a request to configure the one or more devices with information from the stored aliased profile data of the user;
        detecting a trigger erasure condition for the profile data of the user;
        erasing the stored aliased profile data of the user; and
        sending a request to reset the one or more devices.

2. The apparatus of claim 1, wherein the first internet of things (IoT) server is connected with IoT devices in a foreign location.

3. The apparatus of claim 2, wherein the foreign location is a hotel.

4. The apparatus of claim 1, wherein the foreign location of the user is defined by a threshold frequency of use of the foreign location.

5. A method comprising:
    receiving a request associated with a user, wherein the request is to import profile data of the user for one or more devices in a home of the user;
    sending a request to a second IoT server connected with the one or more devices to import profile data associated with the one or more devices in the home of the user;
    receiving a response from the second IoT server, the response comprising aliased profile data of the user for the one or more devices, wherein the second IoT server substitutes personally identifiable information within the profile data of the user with non-personally identifiable alias information;
    identifying one or more devices in the received profile data of the user that match one or more types of available devices connected with a first IoT server;
    sending a notification asking for consent to store the profile data of the user and apply it to the one or more devices, wherein the stored profile data of the user is encrypted based on a password received from the user, wherein the service receives a temporary key from the user, wherein the first IoT server uses the temporary key to establish trust with a second server for importing profile data of the user;

receiving consent authorized by the user;
storing the aliased profile of the user;
sending a request to configure the one or more devices with information from the stored aliased profile data of the user;
detecting a trigger erasure condition for the profile data of the user;
erasing the stored aliased profile data of the user; and
sending a request to reset the one or more devices.

6. The method of claim 5, wherein the apparatus is the first IoT server.

7. The method of claim 5, wherein the first IoT server is connected with IoT devices in a foreign location.

8. The method of claim 7, wherein the foreign location is a hotel.

9. A computer readable storage medium that is not a signal storing computer executable instructions that when executed by a computing device cause said computing device to effectuate operations comprising:

receiving a request associated with a user, wherein the request is to import profile data of the user for one or more devices in a home of the user;
sending a request to a second IoT server connected with the one or more devices to import profile data associated with the one or more devices in the home of the user;
receiving a response from the second IoT server, the response comprising aliased profile data of the user for the one or more devices, wherein the second IoT server substitutes personally identifiable information within the profile data of the user with non-personally identifiable alias information;
identifying one or more devices in the received profile data of the user that match one or more types of available devices connected with a first IoT server;
sending a notification asking for consent to store the profile data of the user and apply it to the one or more devices, wherein the stored profile data of the user is encrypted based on a password received from the user, wherein the service receives a temporary key from the user, wherein the first IoT server uses the temporary key to establish trust with a second server for importing profile data of the user;
receiving consent authorized by the user;
storing the aliased profile of the user;
sending a request to configure the one or more devices with information from the stored aliased profile data of the user;
detecting a trigger erasure condition for the profile data of the user;
erasing the stored aliased profile data of the user; and
sending a request to reset the one or more devices.

10. The computer readable storage medium of claim 9, wherein the apparatus is the first IoT server.

11. The computer readable storage medium of claim 9, wherein the first IoT server is connected with IoT devices in a foreign location.

12. The computer readable storage medium of claim 9, wherein the previous location of the user is an office of the user.

13. The computer readable storage medium of claim 9, wherein the foreign location is a hotel.

* * * * *